US012176967B2

(12) United States Patent
Mamola et al.

(10) Patent No.: US 12,176,967 B2
(45) **Date of Patent: *Dec. 24, 2024**

(54) SCALABLE MULTIUSER AUDIO SYSTEM AND METHOD

(71) Applicant: SHURE ACQUISITION HOLDINGS, INC., Niles, IL (US)

(72) Inventors: Robert Mamola, Oak Park, IL (US); Bryan W. Zancho, McHenry, IL (US); Jiang Chang, Hoffman Estates, IL (US); Honghui Xu, Buffalo Grove, IL (US); Michael Joseph Goodson, Union, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,324

(22) Filed: Jun. 15, 2023

(65) Prior Publication Data

US 2023/0327707 A1 Oct. 12, 2023

Related U.S. Application Data

(63) Continuation of application No. 17/854,823, filed on Jun. 30, 2022.

(Continued)

(51) Int. Cl.

*H04B 5/72* (2024.01)

*H04R 1/10* (2006.01)

(52) U.S. Cl.

CPC ............. *H04B 5/72* (2024.01); *H04R 1/1016* (2013.01); *H04R 2420/07* (2013.01)

(58) Field of Classification Search

CPC ...... H04B 5/0031; H04B 5/72; H04R 1/1016; H04R 2420/07

See application file for complete search history.

(56) References Cited

U.S. PATENT DOCUMENTS 6,870,889 B1 3/2005 Sugiura
7,424,119 B2 9/2008 Reichel (Continued)

FOREIGN PATENT DOCUMENTS

AT 551776 T 4/2012
AU 2003252601 B2 1/2008

(Continued)

OTHER PUBLICATIONS

U.S. Appl. No. 17/854,823, filed Jun. 30, 2022, Not published, Pending.

(Continued)

*Primary Examiner* — Eugene Yun

(74) *Attorney, Agent, or Firm* — Banner & Witcoff, Ltd.

(57) ABSTRACT

Described are systems, methods, apparatuses, and computer program products for wireless in-ear-monitoring (IEM) of audio. A system includes transmitter(s) configured to map orthogonal sub-carriers of a digital signal to narrowband receivers to form receiver-allocated audio channels, modulate the digital signal, and transmit the signal as an ultra-high frequency (UHF) analog carrier wave comprising the orthogonal sub-carriers to the nearby receiver. A narrowband receiver is configured to demodulate and sample the sub-carriers allocated to the receiver. Sub-carriers can be positioned orthogonal to one another in adjacent sub-bands of the frequency domain and beacon symbols and pilot signals can be iteratively provided in the same portion of the frequency domain for each channel. The receiver can use non-data-aided and data-aided approaches for synchronization of the time domain and frequency domain waveforms of the received signal to the transmitted signal prior to sampling the allocated sub-carriers.

20 Claims, 22 Drawing Sheets

Related U.S. Application Data

(60) Provisional application No. 63/217,477, filed on Jul. 1, 2021.

(56) References Cited

U.S. PATENT DOCUMENTS

| | | | |
|---|---|---|---|
| 7,693,289 | B2 | 4/2010 | Stathem et al. |
| 8,045,728 | B2 | 10/2011 | Wada et al. |
| 8,077,646 | B1 | 12/2011 | Cendrillon et al. |
| 8,155,593 | B2 | 4/2012 | Fehr |
| 8,190,427 | B2 | 5/2012 | Peissig et al. |
| 8,223,881 | B2 | 7/2012 | Meyer et al. |
| 8,497,940 | B2 | 7/2013 | Green et al. |
| 8,554,145 | B2 | 10/2013 | Fehr |
| 8,670,380 | B2 | 3/2014 | Green, III et al. |
| 9,271,081 | B2 | 2/2016 | Corteel et al. |
| 9,525,458 | B2 | 12/2016 | Schmidt et al. |
| 9,894,445 | B2 | 2/2018 | Feldt |
| 9,916,835 | B2 | 3/2018 | Frey et al. |
| 10,177,867 | B2 | 1/2019 | Fair et al. |
| 10,225,409 | B2 | 3/2019 | Sakurai et al. |
| 10,263,720 | B2 | 4/2019 | Fair et al. |
| 10,334,377 | B2 | 6/2019 | Green, III et al. |
| 10,362,379 | B2 | 7/2019 | Georgi et al. |
| 10,375,134 | B2 | 8/2019 | Cauduro Dias De Paiva et al. |
| 10,609,464 | B2 | 3/2020 | Georgi et al. |
| 10,686,897 | B2 | 6/2020 | Werner et al. |
| 2004/0106398 | A1 | 6/2004 | Statham et al. |
| 2005/0047610 | A1 | 3/2005 | Reichel |
| 2009/0012783 | A1 | 1/2009 | Klein |
| 2009/0046803 | A1 | 2/2009 | Meyer et al. |
| 2010/0142721 | A1 | 6/2010 | Wada et al. |
| 2010/0189273 | A1 | 7/2010 | Statham et al. |
| 2010/0204995 | A1 | 8/2010 | Peissig et al. |
| 2011/0044193 | A1 | 2/2011 | Forenza et al. |
| 2011/0299457 | A1 | 12/2011 | Green et al. |
| 2012/0120313 | A1 | 5/2012 | Green et al. |
| 2012/0165031 | A1 | 6/2012 | Fehr |
| 2012/0179462 | A1 | 7/2012 | Klein |
| 2012/0224713 | A1 | 9/2012 | Schmidt et al. |
| 2014/0226830 | A1 | 8/2014 | Feldt |
| 2016/0078880 | A1 | 3/2016 | Avendano et al. |
| 2016/0211935 | A1 | 7/2016 | Fair et al. |
| 2016/0217796 | A1 | 7/2016 | Frey et al. |
| 2017/0244769 | A1 | 8/2017 | Cauduro et al. |
| 2017/0374164 | A1 | 12/2017 | Werner et al. |
| 2018/0198918 | A1 | 7/2018 | Sakurai et al. |
| 2018/0367878 | A1 | 12/2018 | Georgi et al. |
| 2019/0141440 | A1 | 5/2019 | Georgi et al. |
| 2019/0385376 | A1 | 12/2019 | Kim et al. |
| 2021/0359411 | A1 | 11/2021 | Hwang et al. |
| 2023/0006712 | A1 * | 1/2023 | Mamola ............... H04R 1/1016 |
| 2023/0006782 | A1 | 1/2023 | Montreuil et al. |

FOREIGN PATENT DOCUMENTS

| | | | |
|---|---|---|---|
| AU | 2004205095 | B2 | 11/2008 |
| AU | 2005334879 | B2 | 11/2009 |
| BR | PI1105524 | A2 | 9/2015 |
| CA | 2616305 | A1 | 2/2007 |
| CA | 2477024 | C | 12/2009 |
| CA | 2444166 | C | 4/2012 |
| CA | 2922488 | A1 | 3/2015 |
| CA | 2986193 | C | 11/2019 |
| CN | 1294556 | C | 1/2007 |
| CN | 101048939 | A | 10/2007 |
| CN | 101228810 | B | 6/2011 |
| CN | 102468875 | A | 5/2012 |
| CN | 1507185 | B | 6/2012 |
| CN | 102457298 | B | 12/2014 |
| CN | 107112025 | A | 8/2017 |
| CN | 108370400 | A | 8/2018 |
| CN | 103987009 | B | 11/2018 |
| CN | 105706016 | B | 7/2019 |
| DE | 102004052296 | A1 | 5/2006 |
| DE | 102005015647 | A1 | 10/2006 |
| DE | 102009043007 | A1 | 4/2011 |
| DE | 102005054258 | B4 | 10/2015 |
| DE | 102016101023 | A1 | 7/2016 |
| DE | 102015210873 | A1 | 12/2016 |
| DE | 112015004185 | T5 | 6/2017 |
| DE | 102017103462 | A1 | 8/2017 |
| DE | 102016106105 | A1 | 10/2017 |
| DE | 102017113482 | A1 | 12/2017 |
| EP | 1511350 | A3 | 1/2009 |
| EP | 2453761 | A2 | 5/2012 |
| EP | 1813026 | B1 | 6/2012 |
| EP | 1869765 | B8 | 9/2012 |
| EP | 1406224 | B1 | 7/2015 |
| EP | 3044646 | A4 | 5/2017 |
| EP | 2442467 | A3 | 10/2017 |
| EP | 2501155 | B1 | 1/2018 |
| EP | 3308556 | A1 | 4/2018 |
| EP | 3440846 | B1 | 6/2020 |
| EP | 3425892 | B1 | 1/2021 |
| FI | 124716 | B | 12/2014 |
| HK | 1069664 | A1 | 5/2005 |
| JP | 2008-518535 | A | 5/2008 |
| JP | 4137176 | B2 | 8/2008 |
| JP | 4329898 | B2 | 9/2009 |
| JP | 4442726 | B2 | 3/2010 |
| JP | 2010-532879 | A | 10/2010 |
| JP | 2014-232331 | A | 12/2014 |
| JP | 5884235 | B2 | 3/2016 |
| JP | 5927595 | B2 | 6/2016 |
| JP | 6515104 | B2 | 5/2019 |
| JP | 6628816 | B2 | 1/2020 |
| JP | 6725162 | B2 | 7/2020 |
| KR | 10-2008-0049707 | A | 6/2008 |
| KR | 10-1016492 | B1 | 2/2011 |
| KR | 10-1461141 | B1 | 11/2014 |
| KR | 10-2100064 | B1 | 4/2020 |
| MX | PA03009037 | A | 11/2004 |
| MX | 2011007789 | A | 4/2012 |
| MX | 2011012206 | A | 7/2012 |
| SG | 109533 | A1 | 3/2005 |
| TW | I249146 | B | 2/2006 |
| TW | I265449 | B | 11/2006 |
| TW | I463817 | B | 12/2014 |
| TW | I503005 | B | 10/2015 |
| TW | I539825 | B | 6/2016 |
| WO | 2003/069816 | | 8/2003 |
| WO | 03069816 | A2 | 8/2003 |
| WO | 2005/054997 | | 6/2005 |
| WO | 2005054997 | A2 | 6/2005 |
| WO | 2006/045605 | A2 | 5/2006 |
| WO | 2006/105940 | A1 | 10/2006 |
| WO | 2007/013180 | A1 | 2/2007 |
| WO | 2009/008998 | A1 | 1/2009 |
| WO | 2011/006916 | A2 | 1/2011 |
| WO | 2012/025580 | A1 | 3/2012 |
| WO | 2015/038776 | A1 | 3/2015 |
| WO | 2016/040885 | A1 | 3/2016 |
| WO | 2016/202804 | A1 | 12/2016 |
| WO | 2017/149842 | A1 | 9/2017 |
| WO | 2017/174589 | A1 | 10/2017 |

OTHER PUBLICATIONS

International Search Report and Written Opinion for PCT/US2022/035777 (ISA/EP) dated Oct. 25, 2022 (13 pages).

Oct. 25, 2022—(WO) International Search Report and Written Opinion—App PCT/US2022/035777.

* cited by examiner

SCALABLE MULTIUSER AUDIO SYSTEM AND METHOD

CROSS-REFERENCE TO RELATED APPLICATIONS

This application is a continuation of U.S. Non-Provisional patent application Ser. No. 17/854,823, filed Jun. 30, 2022 and entitled "Scalable Multiuser Audio System and Method," which claims priority to, and the benefit of, U.S. Provisional Application Ser. No. 63/217,477, filed Jul. 1, 2021 and entitled "Scalable Multiuser Audio System and Method," the entire disclosures of each of which are hereby incorporated herein by reference in their entireties for all purposes.

TECHNOLOGICAL FIELD

Embodiments of the present disclosure relate generally to in-ear-monitor systems, and more particularly to orthogonal sub-carrier spacing in the frequency-time domain of a carrier wave for ultra-low latency transmission of audio to receivers of in-ear-monitor systems and methods of synchronizing and demodulating the carrier wave by in-ear-monitor receivers.

BACKGROUND

In audio production systems, audio is often captured by microphone or audio pick-up, mixed or modulated by audio mixers, and provided to users by an air interface between a transmitter or multi-antenna array and one or more receivers coupled to one or more in-ear-monitors. Wireless audio transmitters, wireless audio receivers, wireless microphones, and other wireless communication devices include antennas for transmitting and receiving radio frequency (RF) signals which contain digital or analog signals, such as modulated audio signals, data signals, and/or control signals. Users of wireless communication devices include stage performers, singers, actors, news reporters, and the like.

A wireless audio receiver may be able to receive RF signals from one or more wireless audio transmitters over one or more channels and corresponding frequencies. For example, a wireless audio receiver may have a single receiver channel so that the receiver is able to wirelessly communicate with one wireless audio transmitter at a corresponding frequency. As another example, a wireless audio receiver may have multiple receiver channels, where each channel can wirelessly communicate with a corresponding wireless audio transmitter at a respective frequency.

Wireless audio transmitters typically transmit analog audio signals to receivers for in-ear-monitor systems, and wireless audio receivers are typically configured to receive analog audio signals. Analog systems are often affected by noise during transmission and require hardware that is less flexible and consume more power. Also, analog systems typically require a dedicated frequency sub-band be allocated to each receiver, and dynamic re-allocation of sub-bands to different receivers is typically not possible or results in an unacceptable delay in audio transmission in that sub-band. Further, analog systems are typically not efficiently user scalable meaning that as additional users are added to the IEM system, additional sub-bands must be allocated to the receivers for those additional users, which increases the bandwidth on which the IEM system is operating. As such, there is a need for audio in-ear-monitoring systems that are more user scalable.

BRIEF SUMMARY

Various embodiments illustrated herein disclose wireless audio monitoring systems, receivers, transmitters, and associated methods for achieving increased efficiency of spectrum use and bandwidth utilization that scales in proportion to the number of unique audio channels in the system. In some embodiments, a system can include one or more transmitters and one or more receivers configured to receive audio signals from the one or more transmitters. In some embodiments, the one or more receivers can be in communication with one or more in-ear-monitors (IEMs). The IEMs can be configured to be disposed about, within, or partially within an ear of a user and configured to generate audio waves based on information received form the receiver.

According to some embodiments, a transceiver, such as a transmitting transceiver ("transmitter"), can be provided that is configured to enable low latency audio playback by in-ear monitors positioned in an interferer laden environment. In some embodiments, a transmitter can be configured to transmit a signal, carrier wave, or the like towards one or more receivers. In some embodiments, the signal or carrier wave may be an ultra-high frequency signal in a narrow bandwidth of spectrum. In some embodiments, the carrier wave comprises a time domain and a frequency domain, or a time-frequency domain, that can be subdivided across the time domain and across the frequency domain. Receivers can be assigned one or more sub-carriers of the carrier wave across the time domain and/or the frequency domain. Sub-carriers in the time-frequency domain can be orthogonal such that content of each audio channel is collocated in a narrow bandwidth of spectrum with a signal so that it can be decoded using a narrowband receiver. In some embodiments, a portion of the sub-carrier may overlap with a portion of an adjacent sub-carrier. In some embodiments, symbols may be assigned to each sub-carrier such that the receiver can interpret each sub-carrier and map the sub-carriers in the time and frequency domains to carry out channel estimation.

In some embodiments, the transmitter can be configured to co-locate audio channels in a narrow bandwidth of spectrum with a signal designated so that it can be decoded using a receiver, such as a narrowband receiver, without interference from adjacent signal energy. In some embodiments, the transmitter may be configured for mono-directional communication or bi-directional communication. In some embodiments, the transmitter may be configured for downlink communication with receiver(s) only. In some embodiments, the transmitter may be configured for downlink communication with receiver(s) and also configured for receiving communications, such as raw audio from a microphone or instrument, from receiver(s).

In some embodiments, the transmitter may be configured to receive audio information, such as analog audio signals, digital audio signals, an audio bitstream, audio packets, or the like, e.g., from an instrument, a microphone, an audio mixer, and/or the like. In some embodiments, the transmitter can be configured to receive raw audio from one or more microphones and/or one or more instruments and associated with one or more in-ear-monitor users. In some embodiments, the transmitter may comprise means, such as a processor, a memory storing computer program instructions, a digital-to-analog converter (DAC), a combining module, a modulator, an antenna, a digital signal processor, and/or the like. In some embodiments, the transmitter may be configured to transmit a carrier wave towards one or more receivers in an interferer laden environment. In some embodiments, the transmitter may be configured to associate one or more sub-carriers of the carrier wave to receivers in the interferer laden environment. In some embodiments, the transmitter may be configured to generate a user-customized audio mix based upon user preferences, such as a loudness of audio from the user's microphone and/or the user's instrument(s) relative to a loudness of audio from other microphone(s) and/or other instrument(s) in the interferer laden environment. Said otherwise, the user may prefer to hear only the audio from their own microphone and/or instrument(s) or may prefer to hear all captured audio, e.g., with a slight emphasis on the audio from their microphone and/or instrument(s).

The transmitter may receive user-customized audio or may generate the user-customized audio based upon raw audio from the various microphones and/or instruments in the interferer laden environment. In some embodiments, the transmitter may generate the user-customized audio based upon known and/or pre-set user preferences. The transmitter may therefore comprise an audio mixing system, such as a mixing board or the like. In some embodiments, the transmitter can be configured to generate user-customized audio that is specific for each in-ear-monitor of a pair of in-ear-monitors associated with (used by) the user. For example, a user may prefer to hear only their vocals, captured by the user's microphone, in a first ear, and a mixture of the user's instrumental audio, captured by a microphone positioned near the user's instrument or an audio pickup coupled to or integrated into the user's instrument, in a second ear. Continuing this example of a user preference for in-ear-monitor audio playback, the transmitter may transmit two streams of audio associated with the user's two in-ear-monitors. In some embodiments, the transmitter may transmit both streams of audio to a single receiver worn by the user and coupled to the user's two in-ear-monitors. In some embodiments, the user may need to wear a first receiver coupled to the first in-ear-monitor and a second receiver coupled to the second in-ear-monitor. In some embodiments, the transmitter may be configured to allocate a portion of the carrier wave to respective receivers associated with the respective in-ear-monitors such that each receiver can demodulate and playback the correct audio based upon the distinct sub-carrier allocation of each receiver.

In some embodiments, the transmitter may be configured to associate various portions (e.g., sub-carriers, resource units, signal blocks, etc.) of the carrier wave to different receivers, e.g., body-worn receivers associated with different users. In some embodiments, one or more sub-carriers may be allocated to, or associated with, a single receiver at any one point in a time domain and/or a frequency domain of the carrier wave. In some embodiments, the sub-carrier allocations may be known by the receivers and/or communicated with the carrier wave to the receivers. In some embodiments, the sub-carriers may be allocated orthogonally within the frequency and time domain in order to reduce sub-carrier spacing and improve spectral efficiency.

According to another embodiment, an apparatus is provided for facilitating multi-user audio monitoring. In some embodiments, the apparatus can comprise means, such as a processor and a memory storing computer program instructions, for causing the apparatus at least to subdivide a frequency-time domain of a carrier wave in a radio frequency band into a plurality of sub-carrier allocations associated with a plurality of in-ear-monitors, wherein respective sub-carrier allocations are orthogonal in the frequency-time domain to other sub-carrier allocations of the plurality of sub-carrier allocations. In some embodiments, the apparatus can further comprise means for causing the apparatus at least to modulate the plurality of sub-carrier allocations according to a plurality of modulation schemes such that respective sub-carrier allocations are individually modulated. In some embodiments, the apparatus can further comprise means for causing the apparatus at least to generate, based at least on the plurality of modulation schemes, demodulation information for demodulating the plurality of sub-carrier allocations of the frequency-domain spectrum. In some embodiments, the apparatus can further comprise means for causing the apparatus at least to cause transmission of the carrier wave, the carrier wave comprising the demodulation information.

In some embodiments, the apparatus can further comprise means, such as the processor and memory storing computer program instructions, for causing the apparatus at least to scramble the carrier wave using one or more of: block coding, block coding with error correction, selected mapping, convolutional encoding, selected list mapping, partial transmit sequence, interleaving, tone reservation, or tone injection.

In some embodiments, the apparatus can further comprise means, such as the processor and memory storing computer program instructions, for causing the apparatus at least to modulate the carrier wave using one or more of: inverse fast Fourier transform conversion, upsampling, peak windowing, envelope scaling, or clipping and filtering.

According to another embodiment, a method can be carried out, such as by an apparatus described herein, to facilitate multi-user audio monitoring. In some embodiments, the method can comprise subdividing a frequency-time domain of a carrier wave in a radio frequency band into a plurality of sub-carrier allocations associated with a plurality of in-ear-monitors, wherein respective sub-carrier allocations are orthogonal in the frequency-time domain to other sub-carrier allocations of the plurality of sub-carrier allocations. In some embodiments, the method can further comprise modulating the plurality of sub-carrier allocations according to a plurality of modulation schemes such that respective sub-carrier allocations are individually modulated. In some embodiments, the method can further comprise generating, based at least on the plurality of modulation schemes, demodulation information for demodulating the plurality of sub-carrier allocations of the frequency-domain spectrum. In some embodiments, the method can further comprise causing transmission of the carrier wave, the carrier wave comprising the demodulation information.

In some embodiments, the method can further comprise scrambling the carrier wave using one or more of: block coding, block coding with error correction, selected mapping, convolutional encoding, selected list mapping, partial transmit sequence, interleaving, tone reservation, or tone injection.

In some embodiments, the method can further comprise modulating the carrier wave using one or more of: inverse fast Fourier transform conversion, upsampling, peak windowing, envelope scaling, or clipping and filtering.

In some embodiments, the interferer laden environment may be a concert venue, a stadium, a recording studio, or the like. However, the described transmitter and the described receiver may be used in many other environments.

According to some embodiments, an audio managing device can be provided that is configured to enable low latency audio playback by in-ear monitors positioned in an interferer laden environment. In some embodiments, the audio monitoring device can comprise a transceiver, such as a receiving transceiver ("receiver"), configured to be in short-range wireless communication with one or more external transmitters, the receiver being configured to be in operable communication with in-ear-monitors. In some embodiments, the receiver is configured to receive, in a radio frequency band, a carrier wave carrying audio for playback by the in-ear-monitors, the carrier wave being subdivided into a plurality of sub-carriers orthogonally spaced in a frequency-time domain of the carrier wave, respective sub-carriers of the carrier wave being individually modulated according respective modulation schemes of a plurality of modulation schemes.

In some embodiments, the receiver is configured to demodulate at least one sub-carrier of the plurality of sub-carriers using at least one of: one or more characteristics of the carrier wave or demodulation information received with the carrier wave. In some embodiments, the one or more characteristics of the carrier wave comprises one or more cyclic prefixes operable to identify a first or last point of the carrier wave. In some embodiments, the one or more characteristics of the carrier wave comprise a framing bit, a time slot within a frame of the carrier wave, a syncword, a phase, a waveform shape, a frequency, or an amplitude. In some embodiments, the receiver is further configured to cause one or more in-ear-monitors to generate sound waves based at least upon the demodulated at least one sub-carrier.

In some embodiments, an audio playback latency of the sound waves generated by the one or more in-ear-monitors is a difference between a capture time when original sound waves are captured by an audio capture device, the original sound waves being encoded within the at least one sub-carrier, and a playback time when the one or more in-ear-monitors are caused to generate the sound waves. In some embodiments, the audio playback latency is less than or equal to about 20 ms, about 19 ms, about 18 ms, about 17 ms, about 16 ms, about 15 ms, about 14 ms, about 13 ms, about 12 ms, about 11 ms, about 10 ms, about 9 ms, about 8 ms, about 7 ms, about 6 ms, or about 5 ms, inclusive of all values and ranges therebetween.

In some embodiments, the audio playback latency can comprise an air interface latency defined as the time between transmission of the carrier wave towards the receiver and playback of the audio by one or more associated in-ear-monitors or the like. In some embodiments, the air interface latency can be less than or equal to about 15 ms, about 14 ms, about 13 ms, about 12 ms, about 11 ms, about 10 ms, about 9 ms, about 8 ms, about 7 ms, about 6 ms, about 5 ms, about 4 ms, about 3 ms, about 2 ms, or about 1 ms, inclusive of all values and ranges therebetween.

In some embodiments, the carrier wave further comprises the demodulation information, the demodulation information being operable for demodulation of the plurality of sub-carriers. In some embodiments, the demodulation information comprises one or more pilots, pilot signals, pilot sub-carriers, or pilot frames at known positions in the frequency-time domain of the carrier wave, wherein said receiver is configured to determine waveform deformation based upon at least the one or more pilots, pilot signals, pilot sub-carriers, or pilot frames. In some embodiments, the demodulation information comprises one or more beacon frames carrying waveform shape information, beacon interval information, or a contention window value, wherein said receiver is configured to determine frequency distortion based upon at least the one or more beacon frames.

In some embodiments, said demodulation that the receiver is configured to carry out on the at least one sub-carrier comprises at least one of: least squares (LS) based frequency domain pilot aided channel estimation, minimum mean square error (MMSE) based frequency domain pilot aided channel estimation, channel frequency response channel estimation, or parametric model-based channel estimation. In some embodiments, the receiver is configured to correct the carrier wave to compensate for one or more of: sampling clock offsets, imbalances due to mismatches between an in-phase signal path of the carrier wave and a quadrature signal path of the carrier wave, power fluctuations, phase noise, an integer-sub-carrier frequency offset, a fractional-sub-carrier frequency offset, or carrier frequency offset nonlinearities.

In some embodiments, the carrier wave received by the receiver is signal scrambled using one or more of: block coding, block coding with error correction, selected mapping, convolutional encoding, selected list mapping, partial transmit sequence, interleaving, tone reservation, or tone injection. In some embodiments, the carrier wave is modulated, before receipt by the receiver, using one or more of: inverse fast Fourier transform conversion, upsampling, peak windowing, envelope scaling, or clipping and filtering.

According to another embodiment, a method can be carried out by a device, such as those described herein, for enabling low latency audio playback by in-ear monitors positioned in an interferer laden environment. In some embodiments, the method comprises receiving, in a radio frequency band, a carrier wave carrying audio for playback by one or more in-ear-monitors, the carrier wave being subdivided into a plurality of sub-carriers orthogonally spaced in a frequency-time domain of the carrier wave, respective sub-carriers of the carrier wave being individually modulated according to respective modulation schemes of a plurality of modulation schemes. In some embodiments, the method can further comprise demodulating at least one sub-carrier of the plurality of sub-carriers using at least one of: one or more characteristics of the carrier wave or demodulation information provided with the carrier wave. In some embodiments, the one or more characteristics of the carrier wave comprises one or more cyclic prefixes operable to identify a first or last point of the carrier wave. In some embodiments, the one or more characteristics of the carrier wave comprise a framing bit, a time slot within a frame of the carrier wave, a syncword, a phase, a waveform shape, a frequency, or an amplitude.

In some embodiments, the method can further comprise causing one or more in-ear-monitors to generate sound waves based at least upon the demodulated at least one sub-carrier.

In some embodiments, an audio playback latency of the sound waves generated by the one or more in-ear-monitors is a difference between a capture time when original sound waves are captured by an audio capture device, the original sound waves being encoded within the at least one sub-carrier, and a playback time when the one or more in-ear-monitors are caused to generate the sound waves. In some embodiments, the audio playback latency is less than or equal to about 20 ms, about 19 ms, about 18 ms, about 17 ms, about 16 ms, about 15 ms, about 14 ms, about 13 ms, about 12 ms, about 11 ms, about 10 ms, about 9 ms, about 8 ms, about 7 ms, about 6 ms, or about 5 ms, inclusive of all values and ranges therebetween.

In some embodiments, the audio playback latency can comprise an air interface latency defined as the time between transmission of the carrier wave towards the receiver and playback of the audio by one or more associated in-ear-monitors or the like. In some embodiments, the air interface latency can be less than or equal to about 15 ms, about 14 ms, about 13 ms, about 12 ms, about 11 ms, about 10 ms, about 9 ms, about 8 ms, about 7 ms, about 6 ms, about 5 ms, about 4 ms, about 3 ms, about 2 ms, or about 1 ms, inclusive of all values and ranges therebetween.

In some embodiments, the carrier wave further comprises the demodulation information, the demodulation information being operable for demodulation of the plurality of sub-carriers. In some embodiments, the demodulation information comprises one or more pilots, pilot signals, pilot sub-carriers, or pilot frames at known positions in the frequency-time domain of the carrier wave, wherein said receiver is configured to determine waveform deformation based upon at least the one or more pilots, pilot signals, pilot sub-carriers, or pilot frames. In some embodiments, the demodulation information comprises one or more beacon frames carrying waveform shape information, beacon interval information, or a contention window value, wherein said receiver is configured to determine frequency distortion based upon at least the one or more beacon frames. In some embodiments, said demodulating comprises one or more of: least squares (LS) based frequency domain pilot aided channel estimation, minimum mean square error (MMSE) based frequency domain pilot aided channel estimation, channel frequency response channel estimation, or parametric model-based channel estimation.

According to some embodiments, an audio managing device can be provided that is configured to enable low latency audio playback by in-ear monitors positioned in an interferer laden environment. In some embodiments, the audio monitoring device comprises a narrowband receiver configured to be in short-range wireless communication with one or more external transmitters, the narrowband receiver being configured to be in operable communication with in-ear-monitors, wherein the narrowband receiver is configured to demodulate sub-bands having a bandwidth of less than or equal to about 1 MHz. In some embodiments, the narrowband receiver is configured to receive a frequency modulated analog signal comprising audio information, receive, in a radio frequency band, a carrier wave carrying audio for playback by the in-ear-monitors, the carrier wave being subdivided into a plurality of sub-carriers orthogonally spaced in a frequency-time domain of the carrier wave, respective sub-carriers of the carrier wave being individually modulated according respective modulation schemes of a plurality of modulation schemes, and demodulate at least one sub-carrier of the plurality of sub-carriers using at least one of: one or more characteristics of the carrier wave or demodulation information received with the carrier wave.

In some embodiments, the one or more characteristics of the carrier wave comprises one or more cyclic prefixes operable to identify a first or last point of the carrier wave. In some embodiments, the one or more characteristics of the carrier wave comprise a framing bit, a time slot within a frame of the carrier wave, a syncword, a phase, a waveform shape, a frequency, or an amplitude. In some embodiments, the narrowband receiver is further configured to cause one or more in-ear-monitors to generate sound waves based at least upon the demodulated at least one sub-carrier. In some embodiments, an audio playback latency of the sound waves generated by the one or more in-ear-monitors is a difference between a capture time when original sound waves are captured by an audio capture device, the original sound waves being encoded within the at least one sub-carrier, and a playback time when the one or more in-ear-monitors are caused to generate the sound waves. In some embodiments, the audio playback latency is less than or equal to about 15 ms, less than or equal to about 10 ms, or less than or equal to about 5 ms. In some embodiments, the carrier wave further comprises the demodulation information, the demodulation information being operable for demodulation of the plurality of sub-carriers. In some embodiments, the demodulation information comprises one or more pilot signals at known positions in the frequency-time domain of the carrier wave, wherein said narrowband receiver is configured to determine waveform deformation based upon at least the one or more pilot signals. In some embodiments, the demodulation information comprises one or more beacon frames carrying waveform shape information, beacon interval information, or a contention window value, wherein said narrowband receiver is configured to determine frequency distortion based upon at least the one or more beacon frames. In some embodiments, the demodulation that the narrowband receiver is configured to carry out on the at least one sub-carrier comprises at least one of: least squares (LS) based frequency domain pilot aided channel estimation, minimum mean square error (MMSE) based frequency domain pilot aided channel estimation, channel frequency response channel estimation, or parametric model-based channel estimation. In some embodiments, the narrowband receiver is configured to correct the carrier wave to compensate for one or more of: sampling clock offsets, imbalances due to mismatches between an in-phase signal path of the carrier wave and a quadrature signal path of the carrier wave, power fluctuations, phase noise, an integer-sub-carrier frequency offset, a fractional-sub-carrier frequency offset, or carrier frequency offset nonlinearities. In some embodiments, the carrier wave received by the narrowband receiver is signal scrambled using one or more of: block coding, block coding with error correction, selected mapping, convolutional encoding, selected list mapping, partial transmit sequence, interleaving, tone reservation, or tone injection. In some embodiments, the carrier wave is modulated, before receipt by the narrowband receiver, using one or more of: inverse fast Fourier transform conversion, upsampling, peak windowing, envelope scaling, or clipping and filtering.

According to another embodiment, a method can be carried out to facilitate or enable low latency audio playback by in-ear monitors positioned in an interferer laden environment. In some embodiments, the method can comprise receiving, at a narrowband receiver, in a radio frequency band, a carrier wave carrying audio for playback by one or more in-ear-monitors, the narrowband receiver being configured to receive analog frequency modulated signals carrying audio and modulated digital signals carrying audio and synchronization information, the narrowband receiver being configured to demodulate modulated digital signal sub-bands having a bandwidth of less than or equal to about 1 MHz, the carrier wave being subdivided into a plurality of sub-carriers orthogonally spaced in a frequency-time domain of the carrier wave, respective sub-carriers of the carrier wave being individually modulated according to respective modulation schemes of a plurality of modulation schemes, and demodulating, by the narrowband receiver at least one sub-carrier of the plurality of sub-carriers using at least one of: one or more characteristics of the carrier wave or demodulation information provided with the carrier wave.

In some embodiments, the one or more characteristics of the carrier wave comprises one or more cyclic prefixes operable to identify a first or last point of the carrier wave. In some embodiments, the one or more characteristics of the carrier wave comprise a framing bit, a time slot within a frame of the carrier wave, a syncword, a phase, a waveform shape, a frequency, or an amplitude. In some embodiments, the method can further comprise causing one or more in-ear-monitors to generate sound waves based at least upon the demodulated at least one sub-carrier. In some embodiments, an audio playback latency of the sound waves generated by the one or more in-ear-monitors is a difference between a capture time when original sound waves are captured by an audio capture device, the original sound waves being encoded within the at least one sub-carrier, and a playback time when the one or more in-ear-monitors are caused to generate the sound waves. In some embodiments, the latency is less than or equal to about 15 ms, less than or equal to about 10 ms, or less than or equal to about 5 ms. In some embodiments, the carrier wave further comprises the demodulation information, the demodulation information being operable for demodulation of the plurality of sub-carriers. In some embodiments, the demodulation information comprises one or more pilot signals at known positions in the frequency-time domain of the carrier wave, wherein said receiver is configured to determine waveform deformation based upon at least the one or more pilot signals. In some embodiments, the demodulation information comprises one or more beacon frames carrying waveform shape information, beacon interval information, or a contention window value, wherein said receiver is configured to determine frequency distortion based upon at least the one or more beacon frames. In some embodiments, the demodulating comprises one or more of: least squares (LS) based frequency domain pilot aided channel estimation, minimum mean square error (MMSE) based frequency domain pilot aided channel estimation, channel frequency response channel estimation, or parametric model-based channel estimation.

According to another embodiment, an apparatus can be provided for multi-user audio monitoring. In some embodiments, the apparatus can comprise a processor and a memory storing computer program instructions. In some embodiments, the memory and the computer program instructions are configured to, along with the processor, cause the apparatus at least to subdivide a frequency-time domain of a carrier wave in a radio frequency band into a plurality of sub-carrier allocations associated with a plurality of in-ear-monitors, wherein respective sub-carrier allocations are orthogonal in the frequency-time domain to other sub-carrier allocations of the plurality of sub-carrier allocations, modulate the plurality of sub-carrier allocations according to a plurality of modulation schemes such that respective sub-carrier allocations are individually modulated, generate, based at least on the plurality of modulation schemes, demodulation information for demodulating the plurality of sub-carrier allocations of the frequency-domain spectrum, and cause transmission of the carrier wave towards one or more narrowband receivers, the carrier wave carrying the demodulation information and audio for the one or more narrowband receivers associated with one or more of the plurality of in-ear-monitors.

In some embodiments, the memory and the computer program instructions are configured to, along with the processor, cause the apparatus at least to scramble the carrier wave using one or more of: block coding, block coding with error correction, selected mapping, convolutional encoding, selected list mapping, partial transmit sequence, interleaving, tone reservation, or tone injection. In some embodiments, the memory and the computer program instructions are configured to, along with the processor, cause the apparatus at least to modulate the carrier wave using one or more of: inverse fast Fourier transform conversion, upsampling, peak windowing, envelope scaling, or clipping and filtering.

According to another embodiment, an audio managing device can be provided that is configured to enable low latency audio playback by in-ear-monitors positioned in an interferer laden environment. In some embodiments, the audio monitoring device may comprise: a narrowband receiver configured to: receive one or more of: signals having a narrow spectral range, and/or signals having a wider spectral range and comprising plural narrow sub-bands. In some embodiments, the narrowband receiver may be configured to receive one or more of: digital signals having a narrow spectral range, analog signals having a narrow spectral range, and/or digital signals having a wider spectral range and comprising plural narrow sub-bands. In some embodiments, the narrowband receiver may be configured to receive digital signals having a narrow spectral range, analog signals having a narrow spectral range, and digital signals having a wider spectral range and comprising plural narrow sub-bands. In some embodiments, signals, whether occupying a narrow spectral range or a wider spectral range, whether digital or analog, may be received in parallel or in series, and may be stored, sampled, frequency demodulated, amplitude demodulated, offset corrected, phase shifted, descrambled, or otherwise processed by the narrowband receiver. In some embodiments, digital signals and/or analog signals may be processed in parallel or in series, by one or plural processing circuitry of the narrowband receiver. In some embodiments, the narrowband receiver may comprise processing circuitry configured to process modulated digital signals comprising sub-carriers positioned orthogonally in a frequency domain of the modulated digital signal. In some embodiments, the narrowband receiver may comprise processing circuitry configured to process or frequency demodulate analog signals, such as frequency modulated (FM) analog signals. In some embodiments, analog signals may comprise audio information. In some embodiments, modulated digital signals may comprise audio payload subcarriers and one or more of: demodulation information, synchronization information, or the like.

In some embodiments, the narrow spectral range is less than or equal to about 1 MHz, less than or equal to about 800 kHz, less than or equal to about 600 kHz, less than or equal to about 400 kHz, or less than or equal to about 200 kHz. In some embodiments, the wider spectral range is greater than or equal to about 600 kHz, greater than or equal to about 800 kHz, greater than or equal to about 1 MHz, greater than or equal to about 2 MHz, greater than or equal to about 3 MHz, greater than or equal to about 4 MHz, or greater than or equal to about 5 MHz. In some embodiments, the narrowband receiver is configured to be programmed during each instance of use for receiving one or more of signals having a narrow spectral range, and/or signals having a wider spectral range and comprising plural narrow sub-bands. In some embodiments, the narrowband receiver is configured to receive configuration information indicating the narrowband receiver is to expect to receive the signals having a narrow spectral range or the signals having a wider spectral range and comprising plural narrow sub-bands. In some embodiments, the narrowband receiver is configured to, in an instance in which the narrowband receiver receives a signal comprising plural narrow sub-bands, demodulate only a portion of said plural narrow sub-bands. In some embodiments, the portion of said plural narrow sub-bands occupy a total spectral range of less than or equal to about 1 MHz, less than or equal to about 800 kHz, less than or equal to about 600 kHz, less than or equal to about 400 kHz, or less than or equal to about 200 kHz. In some embodiments, the portion of said plural narrow sub-bands are positioned orthogonally in a frequency domain of the signal. In some embodiments, the signal comprises demodulation information, and the narrowband receiver is configured to demodulate the portion of said plural narrow sub-bands using at least said demodulation information. In some embodiments, said demodulation information comprises one or more beacon signals or one or more pilot sub-carriers.

According to another embodiment, a method can be carried out for enabling low latency audio playback by in-ear monitors positioned in an interferer laden environment, the method comprising: receiving, at a narrowband receiver in operable communication with the in-ear-monitors, a signal carrying audio for playback by the in-ear-monitors. In some embodiments, the narrowband receiver is configured to receive signals having a narrow spectral range and/or signals having a wider spectral range and comprising plural narrow sub-bands. In some embodiments, the narrowband receiver may be configured to receive digital signals having a narrow spectral range, analog signals having a narrow spectral range, and/or digital signals having a wider spectral range and comprising plural narrow sub-bands. In some embodiments, the narrowband receiver may be configured to receive digital signals having a narrow spectral range, analog signals having a narrow spectral range, and digital signals having a wider spectral range and comprising plural narrow sub-bands. In some embodiments, signals, whether occupying a narrow spectral range or a wider spectral range, whether digital or analog, may be received in parallel or in series, and may be stored, sampled, frequency demodulated, amplitude demodulated, offset corrected, phase shifted, descrambled, or otherwise processed by the narrowband receiver. In some embodiments, digital signals and/or analog signals may be processed in parallel or in series, by one or plural processing circuitry of the narrowband receiver. In some embodiments, the narrowband receiver may comprise processing circuitry configured to process modulated digital signals comprising sub-carriers positioned orthogonally in a frequency domain of the modulated digital signal. In some embodiments, the narrowband receiver may comprise processing circuitry configured to process or frequency demodulate signals, such as frequency modulated (FM) analog signals. In some embodiments, signals, whether analog or digital, may comprise audio information. In some embodiments, modulated signals, such as modulated digital signals, may comprise audio payload subcarriers and one or more of: demodulation information, synchronization information, and/or the like.

In some embodiments, the narrow spectral range is less than or equal to about 1 MHz, less than or equal to about 800 kHz, less than or equal to about 600 kHz, less than or equal to about 400 kHz, or less than or equal to about 200 kHz. In some embodiments, the wider spectral range is greater than or equal to about 600 kHz, greater than or equal to about 800 kHz, greater than or equal to about 1 MHz, greater than or equal to about 2 MHz, greater than or equal to about 3 MHz, greater than or equal to about 4 MHz, or greater than or equal to about 5 MHz. In some embodiments, the method can further comprise programming the narrowband receiver to receive one or more of the digital signals having a narrow spectral range, the analog signals having a narrow spectral range, the digital signals having a wider spectral range and comprising plural narrow sub-bands, or the analog signals having a wider spectral range and comprising plural narrow sub-bands. In some embodiments, the method can further comprise receiving, at the narrowband receiver, configuration information indicating the narrowband receiver is to expect to receive one or more of digital signals having a narrow spectral range, analog signals having a narrow spectral range, digital signals having a wider spectral range and comprising plural narrow sub-bands, and/or analog signals having a wider spectral range and comprising plural narrow sub-bands. In some embodiments, the method can further comprise, in an instance in which the narrowband receiver receives a signal comprising plural narrow sub-bands, demodulating only a portion of said plural narrow sub-bands. In some embodiments, the portion of said plural narrow sub-bands occupy a total spectral range of less than or equal to about 1 MHz, less than or equal to about 800 kHz, less than or equal to about 600 kHz, less than or equal to about 400 kHz, or less than or equal to about 200 kHz. In some embodiments, the portion of said plural narrow sub-bands are positioned orthogonally in a frequency domain of the signal. In some embodiments, the signal comprises demodulation information. In some embodiments, said method can further comprise: demodulating, using the narrowband receiver, the portion of said plural narrow sub-bands using at least said demodulation information. In some embodiments, said demodulation information comprises one or more beacon signals or one or more pilot sub-carriers.

According to another embodiment, an audio managing device can be provided that is configured to enable low latency audio playback by in-ear monitors positioned in an interferer laden environment. In some embodiments, the audio monitoring device may comprise: a receiver configured to be in short-range wireless communication with one or more external transmitters, the receiver being configured to be in operable communication with in-ear-monitors. In some embodiments, the receiver may be a narrowband receiver is configured to demodulate sub-bands having an aggregate bandwidth of less than or equal to about 1 MHz. The narrowband receiver of an example embodiment may be configured to receive and demodulate a single narrowband signal carrying the audio for playback by the in-ear-monitors, such as a signal having only a single sub-band. In some embodiments, the receiver is configured to: receive, in a radio frequency band, a carrier wave carrying audio for playback by the in-ear-monitors, the carrier wave being subdivided into a plurality of sub-carriers orthogonally spaced in a frequency-time domain of the carrier wave, respective sub-carriers of the carrier wave being individually modulated according respective modulation schemes of a plurality of modulation schemes, and demodulate at least one sub-carrier of the plurality of sub-carriers using at least one of: one or more characteristics of the carrier wave or demodulation information received with the carrier wave.

In some embodiments, the receiver is further configured to receive a frequency modulated analog signal comprising audio information. In some embodiments, the one or more characteristics of the carrier wave comprises one or more cyclic prefixes operable to identify a first or last point of the carrier wave. In some embodiments, the one or more characteristics of the carrier wave comprise a framing bit, a time slot within a frame of the carrier wave, a syncword, a phase, a waveform shape, a frequency, or an amplitude. In some embodiments, the receiver is further configured to cause one or more in-ear-monitors to generate sound waves based at least upon the demodulated at least one sub-carrier. In some embodiments, an audio playback latency of the sound waves generated by the one or more in-ear-monitors is a difference between a capture time when original sound waves are captured by an audio capture device, the original sound waves being encoded within the at least one sub-carrier, and a playback time when the one or more in-ear-monitors are caused to generate the sound waves. In some embodiments, the audio playback latency is less than or equal to about 15 ms, less than or equal to about 10 ms, or less than or equal to about 5 ms. In some embodiments, the carrier wave further comprises the demodulation information, the demodulation information being operable for demodulation of the plurality of sub-carriers. In some embodiments, the demodulation information comprises one or more pilot signals at known positions in the frequency-time domain of the carrier wave, wherein said receiver is configured to determine waveform deformation based upon at least the one or more pilot signals. In some embodiments, the demodulation information comprises one or more beacon frames carrying waveform shape information, beacon interval information, or a contention window value. In some embodiments, said receiver is configured to determine frequency distortion based upon at least the one or more beacon frames. In some embodiments, the demodulation that the receiver is configured to carry out on the at least one sub-carrier comprises at least one of: least squares (LS) based frequency domain pilot aided channel estimation, minimum mean square error (MMSE) based frequency domain pilot aided channel estimation, channel frequency response channel estimation, or parametric model-based channel estimation. In some embodiments, the receiver is configured to correct the carrier wave to compensate for one or more of: sampling clock offsets, imbalances due to mismatches between an in-phase signal path of the carrier wave and a quadrature signal path of the carrier wave, power fluctuations, phase noise, an integer-sub-carrier frequency offset, a fractional-sub-carrier frequency offset, or carrier frequency offset nonlinearities. In some embodiments, the carrier wave received by the receiver is signal scrambled using one or more of: block coding, block coding with error correction, selected mapping, convolutional encoding, selected list mapping, partial transmit sequence, interleaving, tone reservation, or tone injection. In some embodiments, the carrier wave is modulated, before receipt by the receiver, using one or more of: inverse fast Fourier transform conversion, upsampling, peak windowing, envelope scaling, or clipping and filtering.

According to another embodiment, a method can be carried out for enabling low latency audio playback by in-ear monitors positioned in an interferer laden environment. In some embodiments, the method may comprise: receiving, at a receiver, in a radio frequency band, a carrier wave carrying audio for playback by one or more in-ear-monitors. In some embodiments, the receiver can be or comprise a narrowband receiver configured to demodulate modulated digital signal sub-bands having an aggregate bandwidth of less than or equal to about 1 MHz. In some embodiments, the carrier wave can be subdivided into a plurality of sub-carriers orthogonally spaced in a frequency-time domain of the carrier wave. In some embodiments, respective sub-carriers of the carrier wave can be individually modulated according to respective modulation schemes of a plurality of modulation schemes. In some embodiments, the method can further comprise demodulating, by the receiver at least one sub-carrier of the plurality of sub-carriers using at least one of: one or more characteristics of the carrier wave or demodulation information provided with the carrier wave.

In some embodiments, the receiver is configured to receive analog frequency modulated signals and further configured to receive modulated digital signals. In some embodiments, the one or more characteristics of the carrier wave comprises one or more cyclic prefixes operable to identify a first or last point of the carrier wave. In some embodiments, the one or more characteristics of the carrier wave comprise a framing bit, a time slot within a frame of the carrier wave, a syncword, a phase, a waveform shape, a frequency, or an amplitude. In some embodiments, the method may further comprise: causing one or more in-ear-monitors to generate sound waves based at least upon the demodulated at least one sub-carrier. In some embodiments, an audio playback latency of the sound waves generated by the one or more in-ear-monitors is a difference between a capture time when original sound waves are captured by an audio capture device, the original sound waves being encoded within the at least one sub-carrier, and a playback time when the one or more in-ear-monitors are caused to generate the sound waves. In some embodiments, the latency is less than or equal to about 15 ms, less than or equal to about 10 ms, or less than or equal to about 5 ms. In some embodiments, the carrier wave further comprises the demodulation information, the demodulation information being operable for demodulation of the plurality of sub-carriers. In some embodiments, the demodulation information comprises one or more pilot signals at known positions in the frequency-time domain of the carrier wave, wherein said receiver is configured to determine waveform deformation based upon at least the one or more pilot signals. In some embodiments, the demodulation information comprises one or more beacon frames carrying waveform shape information, beacon interval information, or a contention window value, wherein said receiver is configured to determine frequency distortion based upon at least the one or more beacon frames. In some embodiments, the demodulating comprises one or more of: least squares (LS) based frequency domain pilot aided channel estimation, minimum mean square error (MMSE) based frequency domain pilot aided channel estimation, channel frequency response channel estimation, or parametric model-based channel estimation.

According to another embodiment, an apparatus can be provided for multi-user audio monitoring, the apparatus comprising: a processor; and a memory storing computer program instructions. In some embodiments, the memory and the computer program instructions are configured to, along with the processor, cause the apparatus at least to: subdivide a frequency-time domain of a carrier wave in a radio frequency band into a plurality of sub-carrier allocations associated with a plurality of in-ear-monitors, wherein respective sub-carrier allocations are orthogonal in the frequency-time domain to other sub-carrier allocations of the plurality of sub-carrier allocations, modulate the plurality of sub-carrier allocations according to a plurality of modulation schemes such that respective sub-carrier allocations are individually modulated, generate, based at least on the plurality of modulation schemes, demodulation information for demodulating the plurality of sub-carrier allocations of the frequency-domain spectrum, and cause transmission of the carrier wave towards one or more narrowband receivers, the carrier wave carrying the demodulation information and audio for the one or more narrowband receivers associated with one or more of the plurality of in-ear-monitors.

In some embodiments, the memory and the computer program instructions are configured to, along with the processor, cause the apparatus at least to: scramble the carrier wave using one or more of: block coding, block coding with error correction, selected mapping, convolutional encoding, selected list mapping, partial transmit sequence, interleaving, tone reservation, or tone injection. In some embodiments, the memory and the computer program instructions are configured to, along with the processor, cause the apparatus at least to: modulate the carrier wave using one or more of: inverse fast Fourier transform conversion, upsampling, peak windowing, envelope scaling, or clipping and filtering.

According to some embodiments, an audio monitoring device can be provided that is configured to enable low latency audio communication by audio devices, such as in-ear-monitors or transmitters, e.g., microphones, positioned in an interferer laden environment. In some embodiments, the audio monitoring device can comprise a transmitter configured to be in operable communication with one or more audio capture devices and one or more external receivers. In some embodiments, the transmitter can be configured to provide, to the one or more external receivers, a first audio signal carrying audio captured by the one or more audio capture devices and synchronization information. In some embodiments, the audio monitoring device can further comprise a receiver configured to be in operable communication with one or more external transmitters and one or more audio devices. In some embodiments, the receiver can be configured to receive, in a radio frequency band, a second audio signal carrying audio for communication by the one or more audio devices. In some embodiments, the second audio signal can be subdivided into a plurality of sub-carriers orthogonally spaced in a frequency-time domain of the carrier wave. In some embodiments, respective sub-carriers of the second audio signal can be individually modulated according respective modulation schemes of a plurality of modulation schemes. In some embodiments, the receiver can be further configured to demodulate at least one sub-carrier of the plurality of sub-carriers using at least one of: one or more characteristics of the second audio signal or demodulation information received with the second audio signal.

According to another embodiment, a method for enabling low latency audio communication by audio devices, such as in-ear monitors or transmitters, e.g., microphones, positioned in an interferer laden environment can be carried out, the method comprising providing, via a transmitter configured to be in operable communication with one or more audio capture devices and one or more external receivers, to the one or more external receivers, a first audio signal carrying audio captured by the one or more audio capture devices and synchronization information. In some embodiments, the method can further comprise receiving, in a radio frequency band, a second audio signal carrying audio for communication by the one or more audio devices. In some embodiments, the second audio signal can be subdivided into a plurality of sub-carriers orthogonally spaced in a frequency-time domain of the carrier wave. In some embodiments, respective sub-carriers of the second audio signal can be individually modulated according to respective modulation schemes of a plurality of modulation schemes. In some embodiments, the method can further comprise demodulating at least one sub-carrier of the plurality of sub-carriers using at least one of: one or more characteristics of the second audio signal or demodulation information received with the second audio signal.

According to another embodiment, an apparatus for multi-user audio monitoring can be provided, the apparatus comprising a processor and a memory storing instructions that, when executed by the apparatus to perform at least: subdividing a frequency-time domain of a carrier wave in a radio frequency band into a plurality of sub-carrier allocations associated with a plurality of in-ear monitors (IEMs), wherein respective sub-carrier allocations are orthogonal in the frequency-time domain to other sub-carrier allocations of the plurality of sub-carrier allocations; modulating the plurality of sub-carrier allocations according to a plurality of modulation schemes such that respective sub-carrier allocations are individually modulated; generating, based at least on the plurality of modulation schemes, demodulation information for demodulating the plurality of sub-carrier allocations of the frequency-domain spectrum; scrambling the carrier wave using one or more of: block coding, block coding with error correction, selected mapping, convolutional encoding, selected list mapping, partial transmit sequence, interleaving, tone reservation, or tone injection; and causing transmission of the carrier wave towards one or more receivers, the carrier wave carrying the demodulation information and audio for the one or more receivers associated with one or more of the plurality of IEMs.

In some embodiments, respective of the plurality of sub-carrier allocations in the frequency-time domain are mapped to respective audio channels for the plurality of IEMs. In some embodiments, the carrier wave carrying the audio for the one or more receivers associated with the one or more of the plurality of IEMs includes different audio mixes for different IEMs of the plurality of IEMs. In some embodiments, the demodulation information comprises one or more pilot signals at known positions in the frequency-time domain of the carrier wave, wherein the receiver is configured to determine waveform deformation based upon at least the one or more pilot signals. In some embodiments, the demodulation information comprises one or more beacon frames carrying waveform shape information, beacon interval information, or a contention window value, wherein the receiver is configured to determine frequency distortion based upon at least the one or more beacon frames.

In some embodiments, the instructions, when executed by the processor, further cause the apparatus to perform at least: modulating the carrier wave using one or more of: inverse fast Fourier transform conversion, upsampling, peak windowing, envelope scaling, or clipping and filtering. In some embodiments, the carrier wave is scrambled using block coding or convolutional encoding. In some embodiments, the plurality of sub-carrier allocations are allocated to respective of a plurality of narrow sub-bands, and wherein the carrier wave transmitted towards the one or more receivers has a bandwidth that comprises the plurality of narrow sub-bands. In some embodiments, the plurality of narrow sub-bands have a sub-band bandwidth of less than or equal to about 1 MHz, less than or equal to about 800 kHz, less than or equal to about 600 kHz, less than or equal to about 400 kHz, or less than or equal to about 200 kHz. In some embodiments, the apparatus can further comprise one of: an audio channel allocation module, an audio encoder, a digital audio modulator, an audio transmitter, an audio transceiver, an antenna, an antenna combiner, a baseband device, an access point, a base station, a rack mount, a mixing board, an analog-to-digital converter, a digital-to-analog converter, or a digital audio filtering unit.

According to another embodiment, a method of multi-use audio monitoring can be carried out, the method comprising: subdividing a frequency-time domain of a carrier wave in a radio frequency band into a plurality of sub-carrier allocations associated with a plurality of in-ear-monitors, wherein respective sub-carrier allocations are orthogonal in the frequency-time domain to other sub-carrier allocations of the plurality of sub-carrier allocations; modulating the plurality of sub-carrier allocations according to a plurality of modulation schemes such that respective sub-carrier allocations are individually modulated; generating, based at least on the plurality of modulation schemes, demodulation information for demodulating the plurality of sub-carrier allocations of the frequency-domain spectrum; scrambling the carrier wave using one or more of: block coding, block coding with error correction, selected mapping, convolutional encoding, selected list mapping, partial transmit sequence, interleaving, tone reservation, or tone injection; and causing transmission of the carrier wave towards one or more receivers, the carrier wave carrying the demodulation information and audio for the one or more receivers associated with one or more of the plurality of in-ear-monitors.

In some embodiments, respective of the plurality of sub-carrier allocations in the frequency-time domain are mapped to respective audio channels for the plurality of IEMs. In some embodiments, the carrier wave carrying the audio for the one or more receivers associated with the one or more of the plurality of IEMs includes different audio mixes for different IEMs of the plurality of IEMs. In some embodiments, the demodulation information comprises one or more pilot signals at known positions in the frequency-time domain of the carrier wave, wherein the receiver is configured to determine waveform deformation based upon at least the one or more pilot signals. In some embodiments, the demodulation information comprises one or more beacon frames carrying waveform shape information, beacon interval information, or a contention window value, wherein the receiver is configured to determine frequency distortion based upon at least the one or more beacon frames.

In some embodiments, the method can further comprise: modulating the carrier wave using one or more of: inverse fast Fourier transform conversion, upsampling, peak windowing, envelope scaling, or clipping and filtering. In some embodiments, the carrier wave is scrambled using block coding or convolutional encoding. In some embodiments, the plurality of sub-carrier allocations are allocated to respective of a plurality of narrow sub-bands, and wherein the carrier wave transmitted towards the one or more receivers has a bandwidth that comprises the plurality of narrow sub-bands. In some embodiments, the plurality of narrow sub-bands have a sub-band bandwidth of less than or equal to about 1 MHz, less than or equal to about 800 kHz, less than or equal to about 600 kHz, less than or equal to about 400 kHz, or less than or equal to about 200 kHz. In some embodiments, the method is carried out by an audio monitoring device comprising one of: an audio channel allocation module, an audio encoder, a digital audio modulator, an audio transmitter, an audio transceiver, an antenna, an antenna combiner, a baseband device, an access point, a base station, a rack mount, a mixing board, an analog-to-digital converter, a digital-to-analog converter, or a digital audio filtering unit.

BRIEF DESCRIPTION OF THE DRAWINGS

The description of the illustrative embodiments can be read in conjunction with the accompanying figures. It will be appreciated that, for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1A:
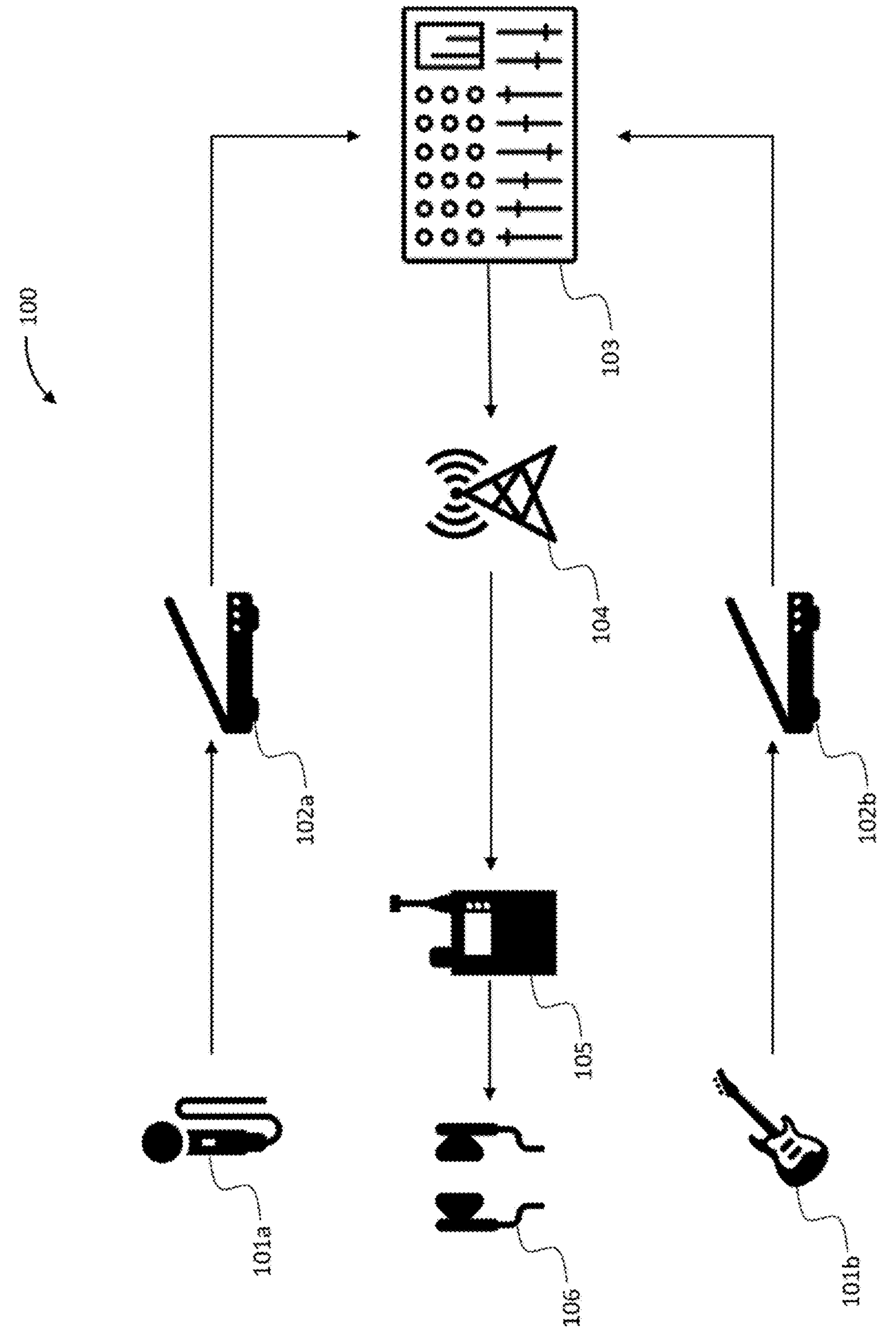
FIG. 1A illustrates an example audio monitoring system, according to an embodiment of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including, but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

As used herein, the terms "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the other computing device or may be received indirectly via one or more computing devices, such as, for example, one or more servers, relays, routers, network access points, base stations, and/or the like.

As used herein, the term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term "computing device" refers to a specialized, centralized device, network, or system, comprising at least a processor and a memory device including computer program code, and configured to provide guidance or direction related to the charge transactions carried out in one or more charging networks.

As used herein, the terms "about," "substantially," and "approximately" generally mean plus or minus 10% of the value stated, e.g., about 250 μm would include 225 μm to 275 μm, about 1,000 μm would include 900 μm to 1,100 μm.

Musicians, singers, performers, conference speakers, and others often use in-ear-monitors (IEMs) to be able to hear the audio captured by their microphone, instrument, or the like, in real-time or near real-time. Users of such IEMs are typically mobile in such an environment during use of the IEM and therefore the audio must be received wirelessly at the IEM system. Since the user speaking or singing into the microphone, for example, generates audio that must be transmitted to a sound board or the like and then transmitted back to the user's IEM such that the audio from the microphone can be played back in the user's IEM, a lag between audio capture and audio playback occurs, which is described herein as latency or audio latency. As described herein, the term "low latency" may refer to latencies of about 15 ms or less. As described herein, the term "ultra low latency" may refer to latencies of about 5 ms or less.

Figure 2:
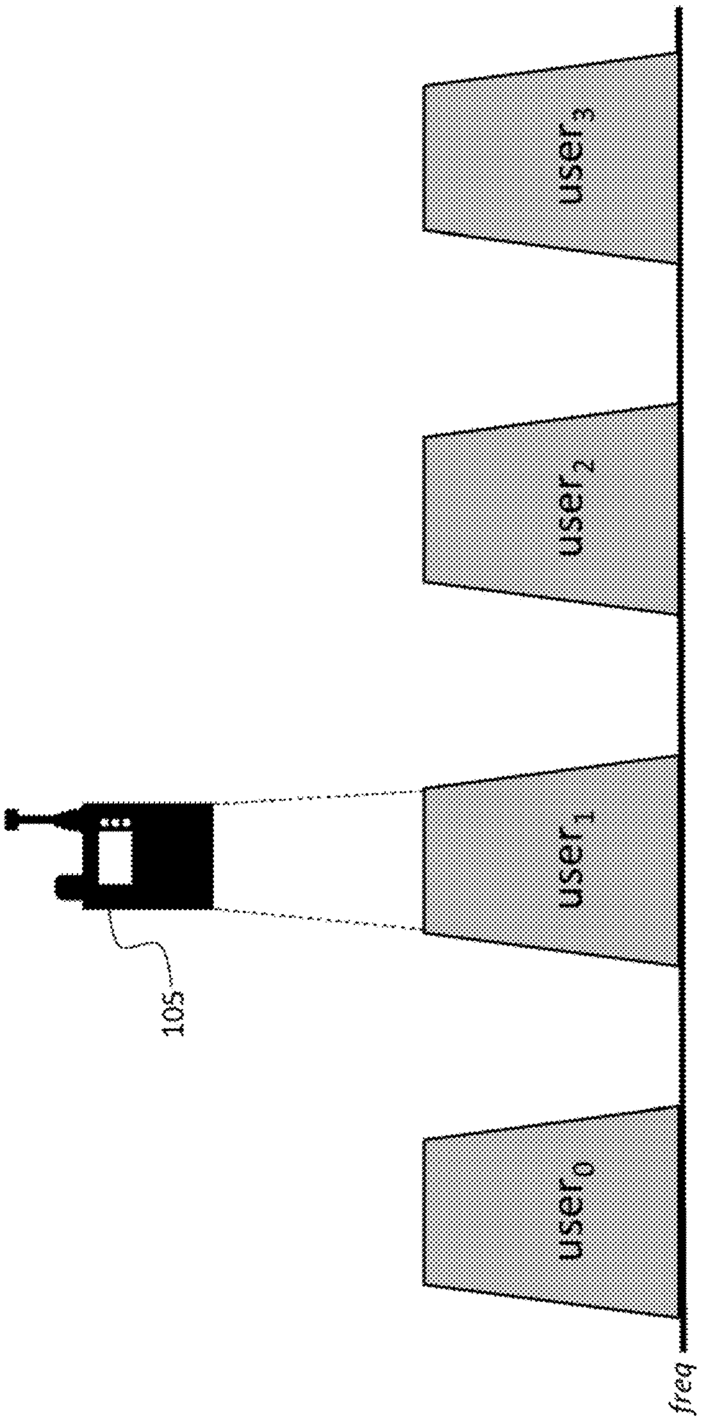
FIG. 2 illustrates an example allocation of sub-carriers in a frequency domain of a carrier wave, according to an embodiment of the present disclosure.

Environments where IEMs are commonly used (e.g., stages, convention centers, outdoor pavilions, etc.) tend to be interferer laden, which means that audio for playback by a user's IEM typically picks up noise and distortion from such interferers in the environments during transmission to the receiver associated with the IEM. Since the user of the IEM is typically mobile within the interferer laden environment, the audio must typically be transmitted to the user's IEM system wirelessly, which means that the type and magnitude of signal interference on a transmitted carrier wave within the interferer laden environment is typically not static. As such, Applicant has found that analog audio playback systems often require that each user be associated with a distinct and different frequency within a frequency band or sub-band, as illustrated in FIG. 2, and the analog signal associated with just that user's audio mixture be transmitted back to the user's IEM receiver. However, in order to avoid interference or intermodulation of the sub-carrier by adjacent sub-carriers, Applicant has found that such IEM systems typically require sufficient spacing of sub-carriers within the carrier wave, leading to spectral inefficiency.

Digital audio playback systems may be able to increase spectral efficiency by not requiring the same sub-carrier spacing within the frequency domain, however, Applicant has determined that digital audio playback systems tend to exhibit unacceptable latency, e.g., in part because of the additional synchronization and demodulation information that needs to be transmitted with audio, which occupies spectrum in the time and frequency domain and reduces the rate of audio payload units across the time domain of the carrier wave and/or diminishes available spectrum.

As such, there is a need for a digital IEM audio playback system which has sufficient spectral efficiency, is user scalable while accounting for the diminishing availability of spectrum, and which achieves a sufficiently short latency between audio capture and audio playback at the user's IEM.

Provided herein are wireless audio monitoring systems, receivers, transmitters, and associated methods for achieving increased efficiency of spectrum use and bandwidth utilization that scales in proportion to the number of unique audio channels in the system. In some embodiments, a system can include one or more transmitters and one or more receivers configured to receive audio signals from the one or more transmitters. In some embodiments, the one or more receivers can be in communication with one or more IEMs. The IEMs can be configured to be disposed about, within, or partially within an ear of a user and configured to generate audio waves based on information received form the receiver. The one or more transmitters can be configured to transmit a signal or carrier wave carrying subcarriers positioned orthogonally in sub-bands of the frequency domain of the signal or carrier wave. The signal or carrier wave transmitted by the one or more transmitters can be a relatively wideband signal occupying a relatively larger range of the frequency domain with audio payload subcarriers, synchronization information subcarriers, beacon symbols, pilot subcarriers, and/or the like being transmitted in the orthogonally positioned sub-bands. The one or more receivers can be configured to 'listen to' or demodulate and process only a portion of the wideband signal or carrier wave, meaning that the one or more receivers are configured to be tuned to particular sub-band(s) of the spectrum occupied by the signal or carrier wave. As such, the one or more transmitters can map an audio channel associated with a particular receiver to the respective subcarriers in the particular sub-band(s) of the spectrum to which the particular receiver is tuned. Without wishing to be bound by any particular theory, the scalability of such a narrowband approach may stem from at least the orthogonality of subcarriers in the frequency domain, meaning that more subcarriers per unit of time may be transmitted without increasing the total bandwidth of the signal or carrier wave. In some embodiments, the increase in subcarriers per unit of time may lead to more users or audio mixes being transmitted towards receivers, while receivers may be still configured to capture, listen to, or sample, the same or similar narrowband subset of the total signal bandwidth. However, implication of such a user scalable narrowband approach may be that non-payload overhead cannot or should not be shared between the narrowband receivers. As such, according to some embodiments, each narrowband portion of the signal or carrier wave to which the particular receiver is tuned must allocate its own overhead in the time domain. Without wishing to be bound by any particular theory, the static allocation of sub-band(s) to respective receivers and the orthogonality of subcarriers in the frequency domain may increase user scalability, but the increase in overhead may lead to decreases in latency. As such, various approaches for non-data-aided and data-aided synchronization are described herein that reduce the burden of increased overhead on latency.

FIG. 1A illustrates a system 100 for wireless audio monitoring, according to an example embodiment. In some embodiments, the system 100 can comprise a sound wave capture device 101*a* configured to capture sound waves generated by a user, such as speech, vocalizations, singing, sound waves generated by an instrument, or the like. In some embodiments, the sound wave capture device 101*a* may be a microphone or the like.

The system 100 can further comprise a first uplink transmitter 102*a* in operable communication with the sound wave capture device 101*a*. In some embodiments, the first uplink transmitter 102*a* can be in wired communication with the sound wave capture device 101*a*. In some embodiments, the first uplink transmitter 102*a* can be in wireless communication with the sound wave capture device 101*a*. In some embodiments, the first uplink transmitter 102*a* can be configured to receive, from the sound wave capture device 101*a*, an analog audio signal, and to generate digital audio therefrom. In some embodiments, the first uplink transmitter 102*a* can be configured to receive the analog audio signal and transmit the analog audio signal along for audio mixing.

The system 100 can further comprise an audio processor 103 configured to receive, from the first uplink transmitter 102*a*, an analog audio signal or digital audio. The audio processor 103 can comprise a sound board, a mixing console, an audio mixer, a mixing desk, a sound mixer, a soundboard, or the like. In some embodiments, the audio processor 103 can combine audio from the sound wave capture device 101*a* with audio from other sound wave capture devices or the like to generate a user-customized audio mixture. The mixed audio can be generated by modifying each audio signal (digital or analog) to control or enhance loudness, frequency content, dynamics, panoramic position, and other audio characteristics for each audio signal before combining the audio signals into a user-customized audio mixture.

The system 100 can further comprise other audio sources, such as an instrument 101*b* with a built-in or mounted pickup, and a second uplink transmitter 102*b* configured to receive, from the instrument 101*b*, analog or digital audio signals. The second uplink transmitter 102*b* may be configured to transmit the analog or digital audio signals to the audio processor 103. In some embodiments, the second uplink transmitter 102*b* may be configured to convert analog audio signals to digital audio signals before transmitting the digital audio signals to the audio processor 103.

In some embodiments, the audio processor 103 may be configured to receive audio signals directly from the sound wave capture device 101*a* and/or the instrument 101*b*, in which case the system 100 may not include or comprise the first and/or second uplink transmitter 102*a*, 102*b*.

In some embodiments, the audio processor 103 may be configured to generate plural audio channels associated with plural users of the system 100, and to subdivide a carrier wave into sub-carriers allocated by audio channel to carry user-customized audio for audio playback. In some embodiments, plural audio channels can comprise or be mapped to one or more of the same sub-carriers carrying audio, whereby the mapping to sub-carriers can create the user-customized audio for audio playback.

However, in other embodiments, the system 100 can further comprise a downlink transmitter 104 configured to receive the plural audio channels associated with plural users of the system 100 from the audio processor 103, the downlink transmitter 104 being further configured to subdivide the carrier wave into sub-carriers allocated by audio channel to carry the user-customized audio for audio playback.

In some embodiments, the downlink transmitter 104 can comprise an antenna combiner, a wireless monitor transmitter, a wireless transmitter, a dual wireless transmitter, a stationary RF transmitter, a digital IEM/IFB wireless transmitter, an AW+ band transmitter, an ultra-high frequency (UHF) transmitter, or the like. As described herein and defined by the International Telecommunication Union, a "low frequency" signal or carrier wave may refer to a signal or carrier wave having a frequency between 30 kHz and 300 kHz, a "medium frequency" signal or carrier wave may refer to a signal or carrier wave having a frequency between 300 kHz and 3 MHz, a "high frequency" signal or carrier wave may refer to a signal or carrier wave having a frequency between 3 MHz and 30 MHz, a "very high frequency" signal or carrier wave may refer to a signal or carrier wave having a frequency between 30 MHz and 300 MHz, and a "ultra-high frequency" signal or carrier wave may refer to a signal or carrier wave having a frequency above about 300 MHz. In some embodiments, the downlink transmitter 104 can be configured to transmit the carrier wave to a receiver 105, such as an IEM receiver, a wireless bodypack receiver, a multi-frequency belt-pack IFB receiver, a hardwired personal monitor bodypack, a wireless RF receiver, or the like. In some embodiments, the user-customized audio mixture may comprise the audio captured by the sound wave capture device 101*a* and audio captured from the instrument 101*b*, such that the user-customized audio mixture can be carried by the carrier wave and allocated for only the receiver 105. However, in some embodiments, such as when the user may prefer to hear different audio in each ear, a different audio mixture in each ear, or different users want to hear the audio captured by the sound wave capture device 101*a* and the audio captured by the instrument 101*b*, for example, one or more portions of the frequency and time domain of the carrier wave may be allocated for the receiver 105 while other portions of the frequency and time domain of the carrier wave may be allocated for other receivers (not shown).

Whether carried out by the audio processor 103 or the downlink transmitter 104, according to some embodiments, audio channels associated with the receiver 105 are formed by one or more sub-carriers that are allocated to the channel and positioned orthogonally within the frequency and time domain of the carrier wave to other audio channels associated with the other receivers. In some embodiments, different resource units of sub-carriers can be allocated to, or associated with, different users and respective receivers. In some embodiments, the orthogonal division of the frequency domain leads to increased efficiency of spectrum use for the same transmission of payload audio, thereby debottlenecking the system 100 and allowing for additional sub-carriers or resource units to be allocated to additional audio channels such that the system 100 is scalable to include additional users without requiring additional spectrum outside the sub-band currently being used.

According to some embodiments, the downlink transmitter 104 can be configured to enable low latency audio playback by in-ear monitors positioned in an interferer laden environment. In some embodiments, the downlink transmitter 104 can be configured to transmit a signal, carrier wave, or the like towards one or more receivers. In some embodiments, the signal or carrier wave may be an ultra-high frequency signal in a narrow bandwidth of spectrum. In some embodiments, the signal or carrier wave may be an ultra-high frequency signal occupying a relatively wide bandwidth of the frequency domain, where audio channels are mapped to sub-carriers in a relatively narrow sub-band of spectrum relative to the total signal or carrier wave. In some embodiments, the carrier wave comprises a time domain and a frequency domain, or a time-frequency domain, that can be subdivided across the time domain and across the frequency domain. The receiver 105 can be assigned one or more sub-carriers of the carrier wave across the time domain and/or the frequency domain. Sub-carriers in the time-frequency domain can be orthogonal such that content of each audio channel is collocated in a narrow bandwidth of spectrum with a signal so that it can be decoded using a narrowband receiver.

In some embodiments, the downlink transmitter 104 can be configured to co-locate audio channels in one or more adjacent sub-bands of spectrum. In some embodiments, the downlink transmitter 104 can be configured to map one or more audio channels to one or more subcarriers in one or more orthogonal sub-bands of spectrum, across a relatively wide band (e.g., greater than about 1 MHz, greater than about 2 MHz, greater than about 3 MHz, greater than about 4 MHz, greater than about 5 MHz, or greater than about 6 MHz, inclusive of all values and ranges therebetween) of spectrum. In some embodiments, the downlink transmitter 104 can be configured to map one or more audio channels to one or more subcarriers in one or more orthogonal sub-bands of spectrum, across a relatively narrow band (e.g., less than about 1 MHz, less than about 900 kHz, less than about 800 kHz, less than about 700 kHz, less than about 600 kHz, less than about 500 kHz, less than about 400 kHz, less than about 300 kHz, less than about 200 kHz, or less than about 100 kHz, inclusive of all values and ranges therebetween). In some embodiments, the downlink transmitter 104 can be configured to map an audio channel to one or more subcarrier from a first sub-band and one or more subcarrier from a second sub-band. In some embodiments, the downlink transmitter 104 may be configured to map an audio channel to plural subcarriers from one or more sub-bands within a relatively narrow band (e.g., less than about 400 kHz, less than about 400 kHz, less than about 300 kHz, or less than about 200 kHz, inclusive of all values and ranges therebetween) of spectrum.

In some embodiments, the downlink transmitter 104 can be configured to co-locate audio channels in a narrow bandwidth of spectrum with a signal designated so that it can be decoded using the receiver 105, such as a narrowband receiver, without interference from adjacent signal energy. In some embodiments, the downlink transmitter 104 may be configured for mono-directional communication or bi-directional communication. In some embodiments, the downlink transmitter 104 may be configured for downlink communication with receiver(s) only. In some embodiments, the downlink transmitter 104 may be configured for downlink communication with the receiver 105 and also configured for receiving communications, such as raw audio from audio sources (e.g., 101*a*, 101*b*) or uplink transmitters (e.g., 102*a*, 102*b*).

In some embodiments, the downlink transmitter 104 may receive audio information, such as analog audio signals, digital audio, an audio bitstream, audio packets, or the like. In some embodiments, the downlink transmitter 104 can be configured to receive raw audio from one or more microphones and/or one or more instruments and associated with one or more in-ear-monitor users. In some embodiments, the downlink transmitter 104 may comprise means, such as a processor, a memory storing computer program instructions, a digital-to-analog converter (DAC), a combining module, a modulator, an antenna, a digital signal processor, and/or the like. In some embodiments, the downlink transmitter 104 may be configured to transmit a carrier wave towards the receiver 105 and the other receivers in an interferer laden environment. In some embodiments, the downlink transmitter 104 may be configured to associate one or more sub-carriers of the carrier wave to receivers in the interferer laden environment. In some embodiments, the downlink transmitter 104 may be configured to generate a user-customized audio mix based upon user preferences, such as a loudness of audio from the user's microphone and/or the user's instrument(s) relative to a loudness of audio from other microphone(s) and/or other instrument(s) in the interferer laden environment. Said otherwise, the user may prefer to hear only the audio from their own microphone and/or instrument(s) or may prefer to hear all captured audio, e.g., with a slight emphasis on the audio from their microphone and/or instrument(s).

In some embodiments, the downlink transmitter 104 may receive user-customized audio or may generate the user-customized audio based upon raw audio from the various microphones and/or instruments in the interferer laden environment. In some embodiments, the downlink transmitter 104 may generate the user-customized audio based upon known and/or pre-set user preferences. In some embodiments, the downlink transmitter 104 may therefore comprise an audio mixing system, such as a mixing board or the like. In some embodiments, the downlink transmitter 104 can be configured to generate user-customized audio that is specific for each in-ear-monitor of a pair of in-ear-monitors associated with (used by) the user. For example, a user may prefer to hear their vocals, captured by the user's microphone, and/or the user's instrumental audio, captured by a microphone positioned near the user's instrument or an audio pickup coupled to or integrated into the user's instrument as part of a mono mix or a stereo mix. Continuing this example of a user preference for in-ear-monitor audio playback, a monitor engineer or audio engineer can create a mono mix or a stereo mix for the user, which is transmitted by the downlink transmitter 104 as two or more mono mixes (e.g., mix 1 might be the band or other audio, mix 2 might be vocals or instrumental audio, mix 3, if needed, might be the other of vocals or instrumental audio) to the receiver 105 worn by the user. In some embodiments, the downlink transmitter 104 may transmit the mono mixes of audio to a single receiver (105) worn by the user and coupled to the user's one or more in-ear-monitors 106. In some embodiments, the receiver 105 may then combine the one or more mixes (e.g., mix 1, mix 2, and optionally, mix 3) to achieve the user's preferred stereo mix or select a mono mix for playback in the in-ear-monitors 106. In some embodiments, the downlink transmitter 104 may be configured to allocate a portion of the carrier wave to respective receivers associated with the respective in-ear-monitors such that each receiver can demodulate and playback the correct audio based upon the distinct sub-carrier allocation of each receiver.

In some embodiments, the downlink transmitter 104 may be configured to associate various portions (sub-carriers) of the carrier wave to different receivers worn by different users. In some embodiments, one or more sub-carriers may be allocated to, or associated with, a single receiver at any one point in a time domain and/or a frequency domain of the carrier wave. In some embodiments, the sub-carrier allocations may be known by the receivers and/or communicated with the carrier wave to the receivers. In some embodiments, the sub-carriers may be allocated orthogonally within the frequency and time domain in order to reduce sub-carrier spacing and improve spectral efficiency.

In some embodiments, the downlink transmitter 104 can comprise means, such as a processor and a memory storing computer program instructions, for causing the downlink transmitter 104 at least to subdivide a frequency-time domain of a carrier wave in a radio frequency band into a plurality of sub-carrier allocations associated with a plurality of in-ear-monitors, wherein respective sub-carrier allocations are orthogonal in the frequency-time domain to other sub-carrier allocations of the plurality of sub-carrier allocations. In some embodiments, the downlink transmitter 104 can further comprise means for causing the apparatus at least to modulate the plurality of sub-carrier allocations according to a plurality of modulation schemes such that respective sub-carrier allocations are individually modulated. In some embodiments, the downlink transmitter 104 can further comprise means for causing the downlink transmitter 104 at least to generate, based at least on the plurality of modulation schemes, demodulation information for demodulating the plurality of sub-carrier allocations of the frequency-domain spectrum. In some embodiments, the downlink transmitter 104 can further comprise means for causing the downlink transmitter 104 at least to cause transmission of the carrier wave, the carrier wave comprising the demodulation information.

In some embodiments, the downlink transmitter 104 can further comprise means, such as the processor and memory storing computer program instructions, for causing the downlink transmitter 104 at least to scramble the carrier wave using one or more of: block coding, block coding with error correction, convolutional encoding, selected mapping, selected list mapping, partial transmit sequence, interleaving, tone reservation, or tone injection.

In some embodiments, the downlink transmitter 104 can further comprise means, such as the processor and memory storing computer program instructions, for causing the downlink transmitter 104 at least to modulate the carrier wave using one or more of: inverse fast Fourier transform conversion, upsampling, peak windowing, envelope scaling, or clipping and filtering.

In some embodiments, the interferer laden environment may be a concert venue, a stadium, a recording studio, or the like. However, the downlink transmitter 104 and the receiver 105 may be used in many other environments.

In some embodiments, the receiver 105 can be configured to be in short-range wireless communication with one or more external transmitters such as the downlink transmitter 104. In some embodiments, the receiver 105 is configured to be in operable communication with in-ear-monitors 106. In some embodiments, the receiver 105 is configured to receive, in a radio frequency band, a carrier wave carrying audio for playback by the in-ear-monitors 106, the carrier wave being subdivided into a plurality of sub-carriers orthogonally spaced in a frequency-time domain of the carrier wave, respective sub-carriers of the carrier wave being individually modulated according to respective modulation schemes of a plurality of modulation schemes. In some embodiments, the receiver 105 is configured to demodulate at least one sub-carrier of the plurality of sub-carriers using at least one of: one or more characteristics of the carrier wave or demodulation information received with the carrier wave. In some embodiments, the one or more characteristics of the carrier wave comprises one or more cyclic prefixes operable to identify a first or last point of the carrier wave. In some embodiments, the one or more characteristics of the carrier wave comprise a framing bit, a time slot within a frame of the carrier wave, a syncword, a phase, a waveform shape, a frequency, or an amplitude. In some embodiments, the receiver 105 is further configured to cause one or more in-ear-monitors to generate sound waves based at least upon the demodulated at least one sub-carrier. In some embodiments, an audio playback latency of the sound waves generated by the one or more in-ear-monitors is a difference between a capture time when original sound waves are captured by an audio capture device, the original sound waves being encoded within the at least one sub-carrier, and a playback time when the one or more in-ear-monitors are caused to generate the sound waves. In some embodiments, the audio playback latency is less than or equal to about 20 ms, about 19 ms, about 18 ms, about 17 ms, about 16 ms, about 15 ms, about 14 ms, about 13 ms, about 12 ms, about 11 ms, about 10 ms, about 9 ms, about 8 ms, about 7 ms, about 6 ms, or about 5 ms, inclusive of all values and ranges therebetween.

In some embodiments, the audio playback latency can comprise an air interface latency defined as the time between transmission of the carrier wave towards the receiver 105 and playback of the audio by one or more associated in-ear-monitors 106. In some embodiments, the air interface latency can be less than or equal to about 15 ms, about 14 ms, about 13 ms, about 12 ms, about 11 ms, about 10 ms, about 9 ms, about 8 ms, about 7 ms, about 6 ms, about 5 ms, about 4 ms, about 3 ms, about 2 ms, or about 1 ms, inclusive of all values and ranges therebetween.

In some embodiments, the carrier wave further comprises the demodulation information, the demodulation information being operable for demodulation of the plurality of sub-carriers. In some embodiments, the demodulation information comprises one or more pilots, pilot signals, pilot sub-carriers, or pilot frames at known positions in the frequency-time domain of the carrier wave, wherein the receiver 105 is configured to determine waveform deformation based upon at least the one or more pilots, pilot signals, pilot sub-carriers, or pilot frames. In some embodiments, the demodulation information comprises one or more beacon frames carrying waveform shape information, beacon interval information, or a contention window value, wherein the receiver 105 is configured to determine frequency distortion based upon at least the one or more beacon frames. In some embodiments, said demodulation that the receiver 105 is configured to carry out on the at least one sub-carrier comprises at least one of: least squares (LS) based frequency domain pilot aided channel estimation, minimum mean square error (MMSE) based frequency domain pilot aided channel estimation, channel frequency response channel estimation, or parametric model-based channel estimation. In some embodiments, the receiver 105 is configured to correct the carrier wave to compensate for one or more of: sampling clock offsets, imbalances due to mismatches between an in-phase signal path of the carrier wave and a quadrature signal path of the carrier wave, power fluctuations, phase noise, an integer-sub-carrier frequency offset, a fractional-sub-carrier frequency offset, or carrier frequency offset nonlinearities.

In some embodiments, the carrier wave received by the receiver 105 is signal scrambled using one or more of: block coding, block coding with error correction, selected mapping, convolutional encoding, selected list mapping, partial transmit sequence, interleaving, tone reservation, or tone injection. In some embodiments, the carrier wave is modulated, before receipt by the receiver 105, using one or more of: inverse fast Fourier transform conversion, upsampling, peak windowing, envelope scaling, or clipping and filtering.

IEMs 106 are typically worn over a user's ears or partially disposed within the user's ears. IEMs 106 typically comprise a balanced armature driver, a planar magnetic driver, an electrostatic driver, a micro-electromagnetic system (MEMS) driver, or the like. In some embodiments, the IEM(s) is(are) in wired connection with the receiver 105 worn by the user.

In some embodiments, the system can comprise digital IEMs 106 while the downlink transmitter 104 transmits analog FM signal and the receiver 105 is configured for analog to digital conversion. In some embodiments, the signal or carrier wave is an ultra-high frequency (UHF) signal.

In some embodiments, the receiver 105 worn by the user can be configured to receive and process a modulated audio signal (e.g., orthogonal frequency-division multiplexed or orthogonal frequency-division multiple access modulated signal), and can also be configured to receive and process an analog FM signal, such that the same receiver 105 may receive and process digital signals, modulated signals, analog signals, and the like. Any or all of these signals may be UHF signals.

Figure 1B:
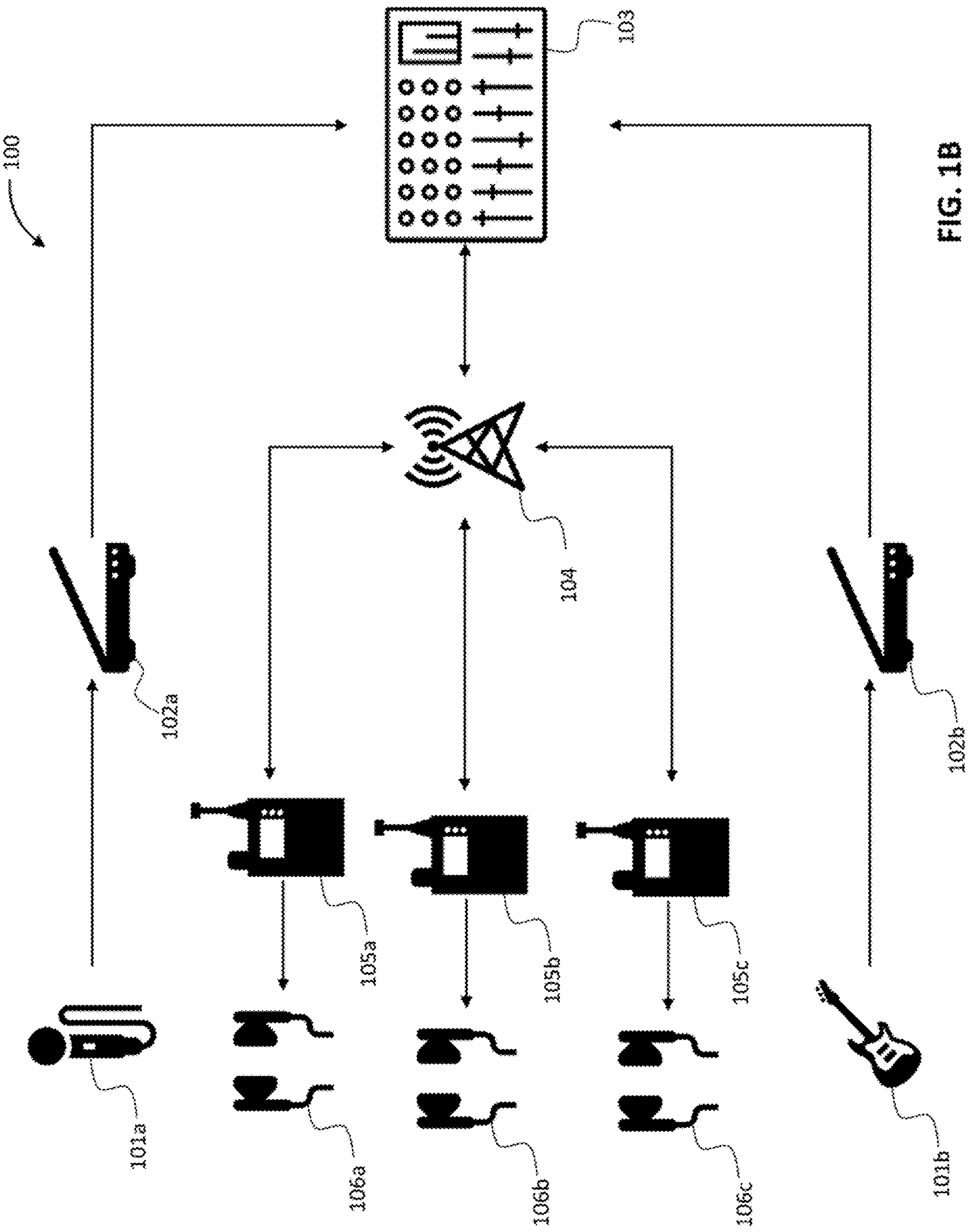
FIG. 1B illustrates an example audio monitoring system, according to an embodiment of the present disclosure.

Referring now to FIG. 1B, an alternative embodiment of the system 100 for wireless audio monitoring is illustrated. According to the embodiment, the system 100 comprises a downlink transmitter 104 in operable communication with the audio processor 103. In some embodiments, the system 100 can further comprise a plurality of receivers 105*a*, 105*b*, 105*c* in wireless communication with the downlink transmitter 104. In some embodiments, one or more of the plurality of receivers 105*a*, 105*b*, 105*c* can be associated with a first user while one or more others of the plurality of receivers 105*a*, 105*b*, 105*c* can be associated with a second user. In some embodiments, the downlink transmitter 104 can transmit and/or receive synchronization information, demodulation information, pilot subcarriers, beacon symbols, and/or the like to and/or from one or more of the plurality of receivers 105*a*, 105*b*, 105*c*. In some embodiments, subcarriers of a signal or carrier wave can be allocated orthogonally in a frequency domain of the signal or carrier wave by the audio processor 103 and/or the downlink transmitter. In some embodiments, first downlink synchronization information, such as synchronization subcarriers, pilot subcarriers, beacon frames, and/or the like may be transmitted in a particular subcarrier during a first time period, followed by a guard interval during a second time period, followed by one or more uplink or downlink audio payload subcarriers during a third time period, followed by a guard interval during a fourth time period, followed by second downlink synchronization information during a fifth time period, followed by a guard interval during a sixth time period, followed by one or more uplink or downlink audio payload subcarriers during a seventh time period. According to other embodiments, an allocation scheme for the system 100 can comprise any other suitable order, number, variability, ratio, directionality, or duration of synchronization information subcarriers, guard intervals, uplink audio payload subcarriers, and/or downlink audio payload subcarriers, or the like. Select examples of such allocation schemes can be found in FIGS. 6-12, and in particular the bi-directional allocation schemes of FIGS. 11 and 12.

In some embodiments, each of the plurality of receivers 105*a*, 105*b*, 105*c* can be in wired or wireless communication with one or more of a plurality of in-ear-monitors 106*a*, 106*b*, 106*c*. In some embodiments, one or more of the plurality of receivers 105*a*, 105*b*, 105*c* may be configured to communicate directly with the audio processor 103. In some embodiments, the audio processor 103 can be configured to generate a wideband signal comprising plural audio payload subcarriers mapped to a distinct and different audio channel for each of the plurality of receivers 105*a*, 105*b*, 105*c*.

Figure 1C:
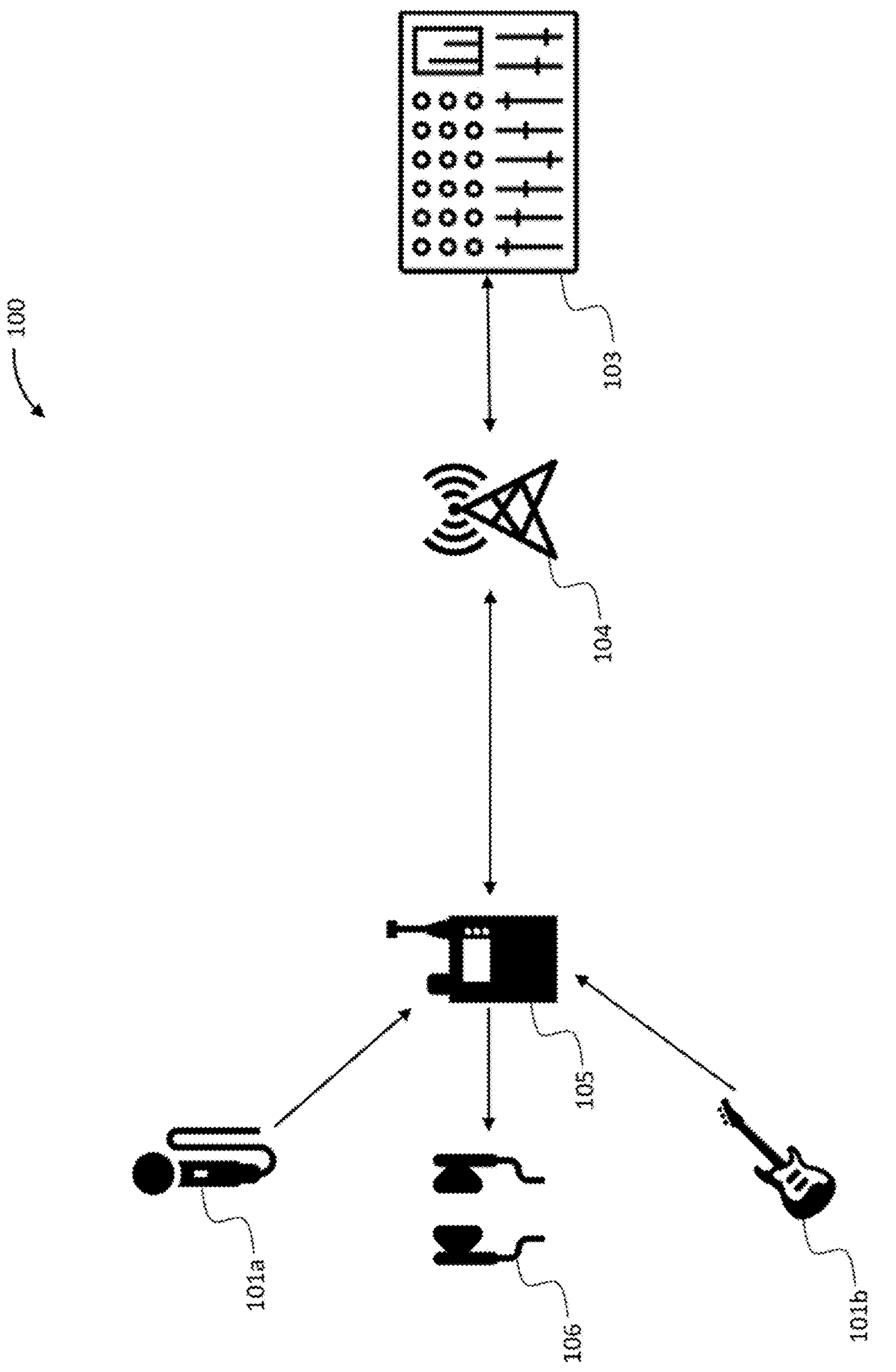
FIG. 1C illustrates an example audio monitoring system, according to an embodiment of the present disclosure.

Referring now to FIG. 1C, an alternative embodiment of the system 100 for wireless audio monitoring is illustrated. According to the embodiment, the receiver 105 may further comprise a transmitter. In some embodiments, the receiver 105 can receive audio from the sound wave capture device 101*a* and/or the instrument 101*b*. In some embodiments, the audio may be received from the sound wave capture device 101*a* and/or the instrument 101*b*, or the like, as raw audio carried or communicated in an analog signal or as digitized audio information carried on a digital signal, and/or the like. In some embodiments, the receiver 105 can be configured to receive analog audio signals and convert the analog audio signals to digital audio signals. In some embodiments, the receiver 105 can be configured to generate a new audio signal, such as a digital audio signal comprising subcarriers in a particular sub-band of a frequency domain of the new audio signal. In some embodiments, subcarriers can be located orthogonally in the frequency domain. In some embodiments, the sub-band of the frequency domain can comprise two or more orthogonally positioned subcarriers at various points in the time domain. In some embodiments, the receiver 105 may form the new audio signal by encoding audio information as audio payload subcarriers positioned orthogonally in the frequency domain, with synchronization information (e.g., beacon symbols, pilot subcarriers, and/or the like) being communicated at regular or irregular intervals in the time domain.

In some embodiments, the downlink transmitter 104 can further comprise a receiver or a receiver array comprising a plurality of receivers. In some embodiments, a receiver of the downlink transmitter 104 can be configured to receive, from the receiver 105, the new audio signal. In some embodiments, a receiver of the downlink transmitter 104 can be configured to receive audio signals, whether digital or analog, from one or more other receivers (not shown) associated with other audio generating equipment (not shown), such as other microphones or instruments.

Figure 11:
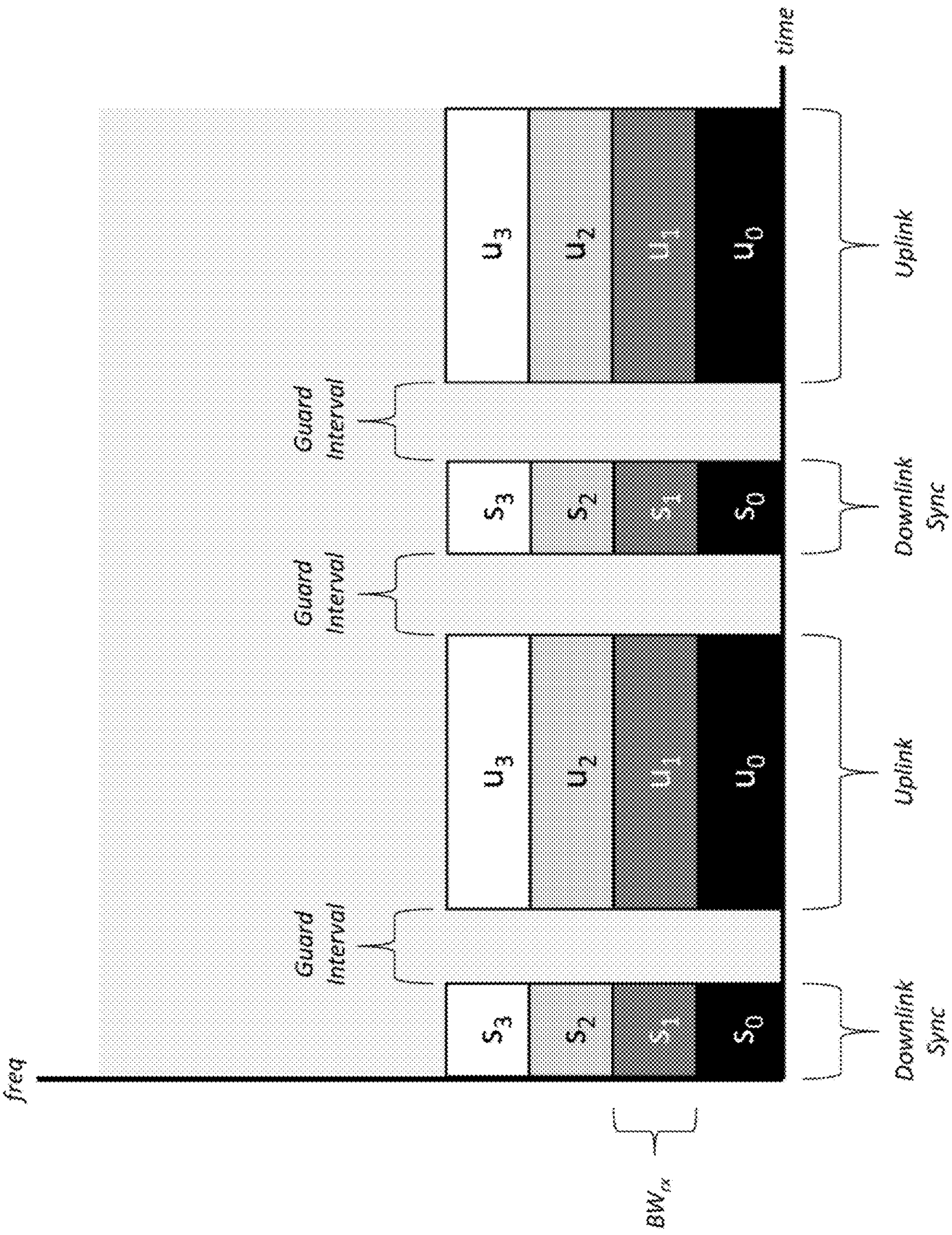
FIG. 11 illustrates an example allocation of sub-carriers in a frequency and time domain of a carrier wave, according to an embodiment of the present disclosure.

In some embodiments, the downlink transmitter 104 can be configured to transmit the new audio signal, whether digital or analog, to the audio processor 103. In some embodiments, the audio processor 103 can be configured to demodulate the new audio signal, create a user-specific mono or stereo mix, and encode the mono or stereo mix into an audio signal, whether audio or digital, for downlink direction transmission, such as described elsewhere herein. An example of such a bidirectional digital audio signal process is illustrated in FIG. 11 and discussed below in more detail.

In some embodiments, the audio processor 103 can comprise a sound board, a mixing console, an audio mixer, a mixing desk, a sound mixer, a soundboard, or the like. In some embodiments, the audio processor 103 can combine audio from the sound wave capture device 101*a* with audio from other sound wave capture devices or the like to generate a user-customized audio mixture. The mixed audio can be generated by modifying each audio signal (digital or analog) to control or enhance loudness, frequency content, dynamics, panoramic position, and other audio characteristics for each audio signal before combining the audio signals into a user-customized audio mixture.

In some embodiments, the audio processor 103 may be configured to receive audio signals directly from the receiver 105, or directly from the sound wave capture device 101*a* and/or the instrument 101*b*.

In some embodiments, the audio processor 103 may be configured to generate plural audio channels associated with plural users of the system 100, and to subdivide a carrier wave into sub-carriers allocated by audio channel to carry user-customized audio for audio playback. In some embodiments, plural audio channels can comprise or be mapped to one or more of the same sub-carriers carrying audio, whereby the mapping to sub-carriers can create the user-customized audio for audio playback. In some embodiments, the receiver 105 can transmit synchronization information upstream to the audio processor 103 and/or the receiver of the downlink transmitter 104. In some embodiments, the audio processor 103 and/or the downlink transmitter 104 may transmit audio information, such as audio payload subcarriers mapped to an audio channel of a modulated digital signal, comprising a mono or stereo audio mix, based on the synchronization information.

Referring now to FIG. 2, one possible allocation of audio channels for plural users ($user_0$, $user_1$, $user_2$, and $user_3$) to respective sub-carriers within the frequency domain of the carrier wave is illustrated. Applicant has determined that audio monitoring systems using such an allocation of audio channels may require that signals for individual users be spaced in the frequency domain to avoid interference from adjacent users. Applicant has determined that systems such as illustrated in FIG. 2, typically use the spectrum relatively inefficiently, meaning that the payload audio carried on the carrier wave per unit of the time domain is low because of a relatively large sub-carrier spacing. Applicant has likewise found that wideband systems typically require an arbitrary allocation of fixed bandwidth frequency-time resources to users. As such, wideband systems often require the same or similar bandwidth regardless of the number of active audio devices.

Figure 3:
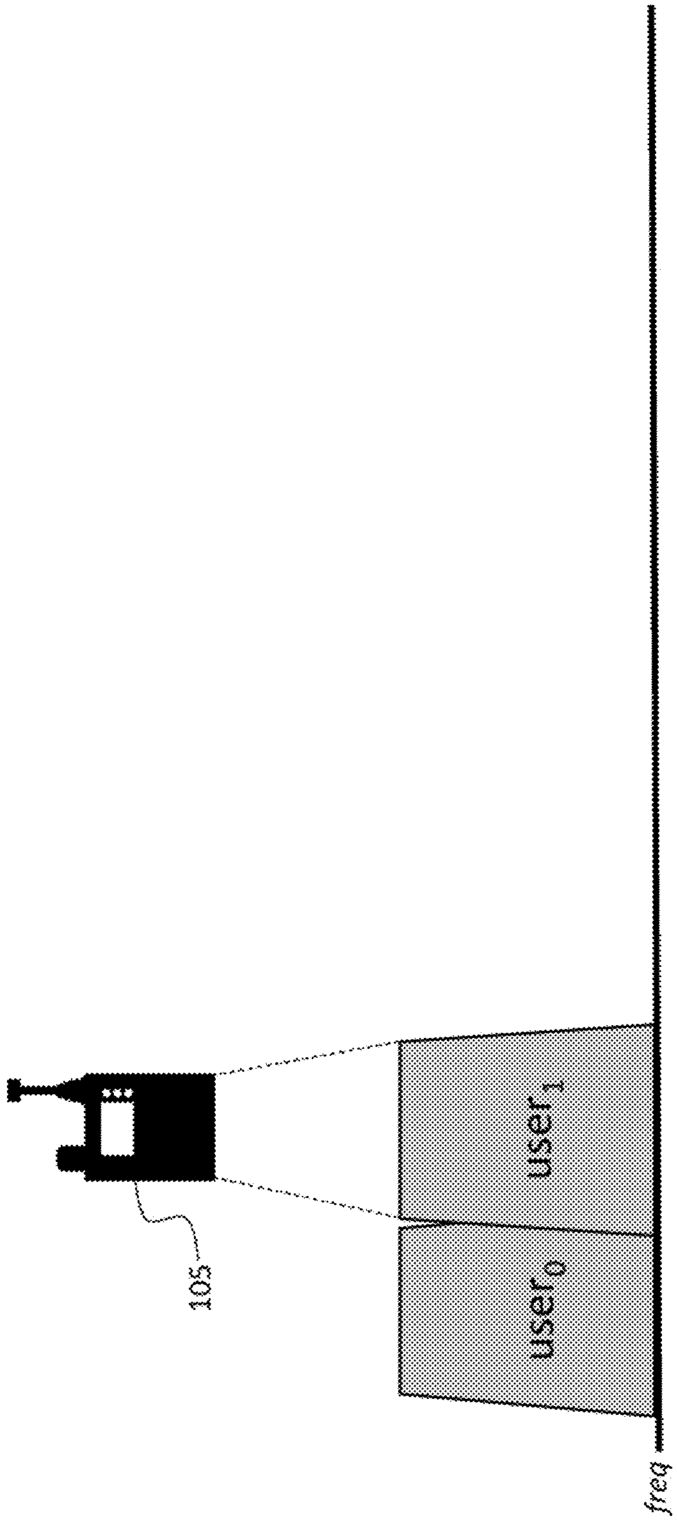
FIG. 3 illustrates an example allocation of sub-carriers in a frequency domain of a carrier wave, according to an embodiment of the present disclosure.

FIG. 3 illustrates an example allocation of audio channels for plural users ($user_0$ and $user_1$) to respective sub-carriers within the frequency domain of the carrier wave according to embodiments of the present disclosure. As illustrated, the spectrum is subdivided into a number of sub-carriers that are orthogonal to one or more other sub-carriers in the frequency domain. In some embodiments, each sub-carrier is modulated independently. Without wishing to be bound by any particular theory, because the sub-carriers are orthogonal in the frequency and/or time domain, a receiver (e.g., the receiver 105) that is time and frequency synchronized to a transmitter (e.g., the downlink transmitter 104) can recover the sub-carriers and their modulated data that are associated with that particular receiver such that the adjacent sub-carriers do not interfere with each other, by avoiding inter-sub-carrier interference and sub-carrier intermodulation.

Figure 4:
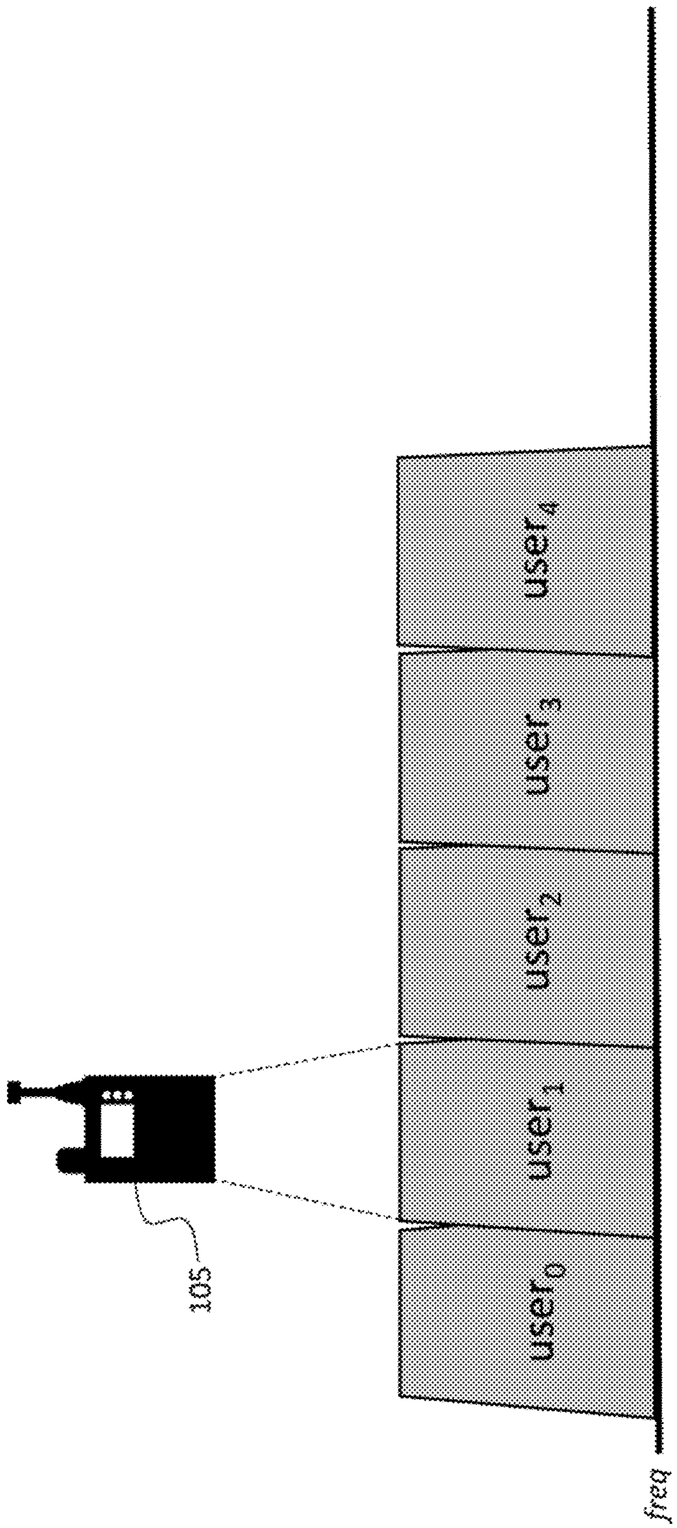
FIG. 4 illustrates an example allocation of sub-carriers in a frequency domain of a carrier wave, according to an embodiment of the present disclosure.
Figure 5:
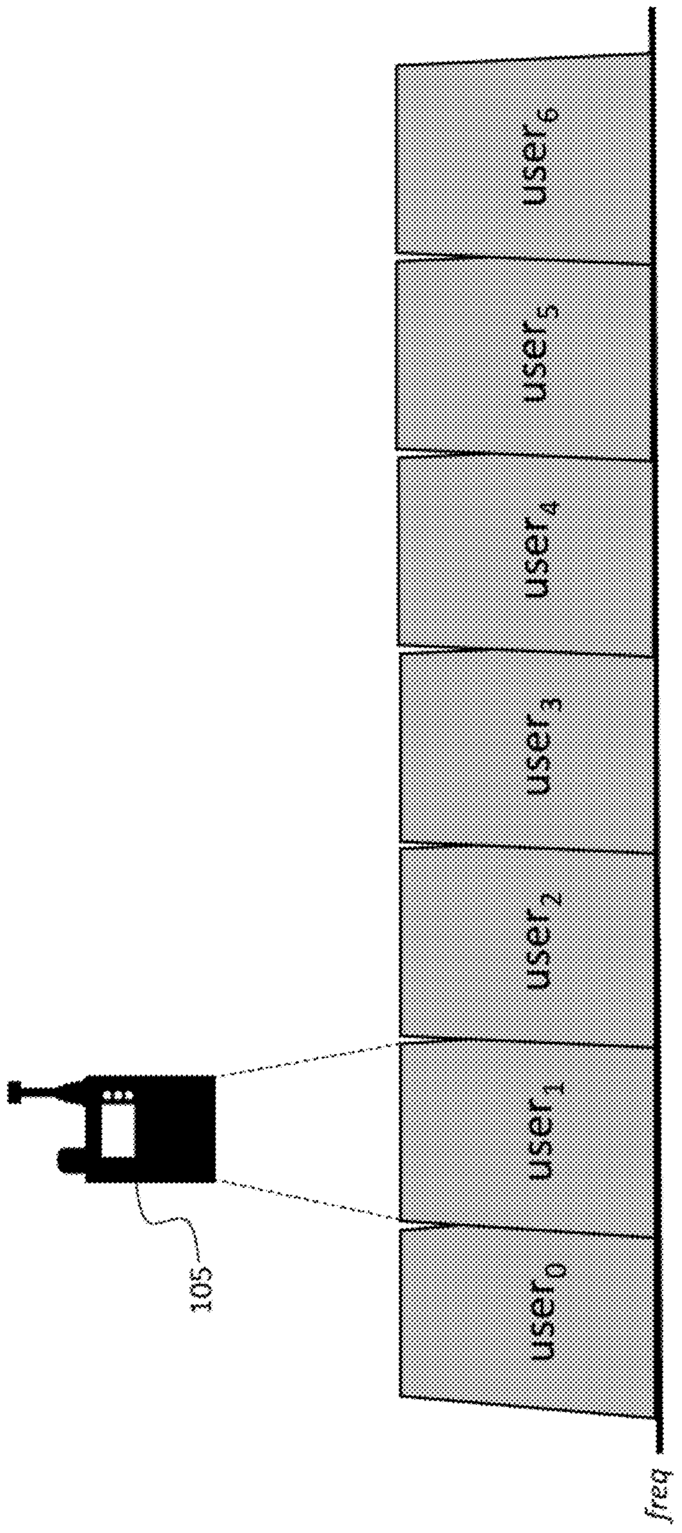
FIG. 5 illustrates an example allocation of sub-carriers in a frequency domain of a carrier wave, according to an embodiment of the present disclosure.

FIGS. 4 and 5 illustrate that, by allocating sub-carriers orthogonally across the frequency domain of the carrier wave, a larger number of audio channels can be accommodated on the same portion of the spectrum. Among other benefits of this audio channel allocation approach, the system is user scalable, with improved spectral efficiency, achieves a low latency relative to other digital audio monitoring systems, is resilient to system interference and intermodulation between audio channels, and reduces external hardware (rack gear) for combining transmissions to achieve user-customized stereo audio mixtures by implementing internal digital combining.

Thus far, the frequency domain of the carrier wave has been primarily discussed. However, spectral resources for audio playback transmissions in an IEM system may be allocated across both the frequency domain and the time domain, according to some embodiments described herein. Applicant has found that, oftentimes, when receivers are allocated to a particular frequency range of the analog signal with spacing therebetween to avoid inter-channel interference, this necessary spacing can lead to inefficient spectrum use and an IEM system that is not sufficient user scalable in light of diminishing available spectrum.

Figure 6:
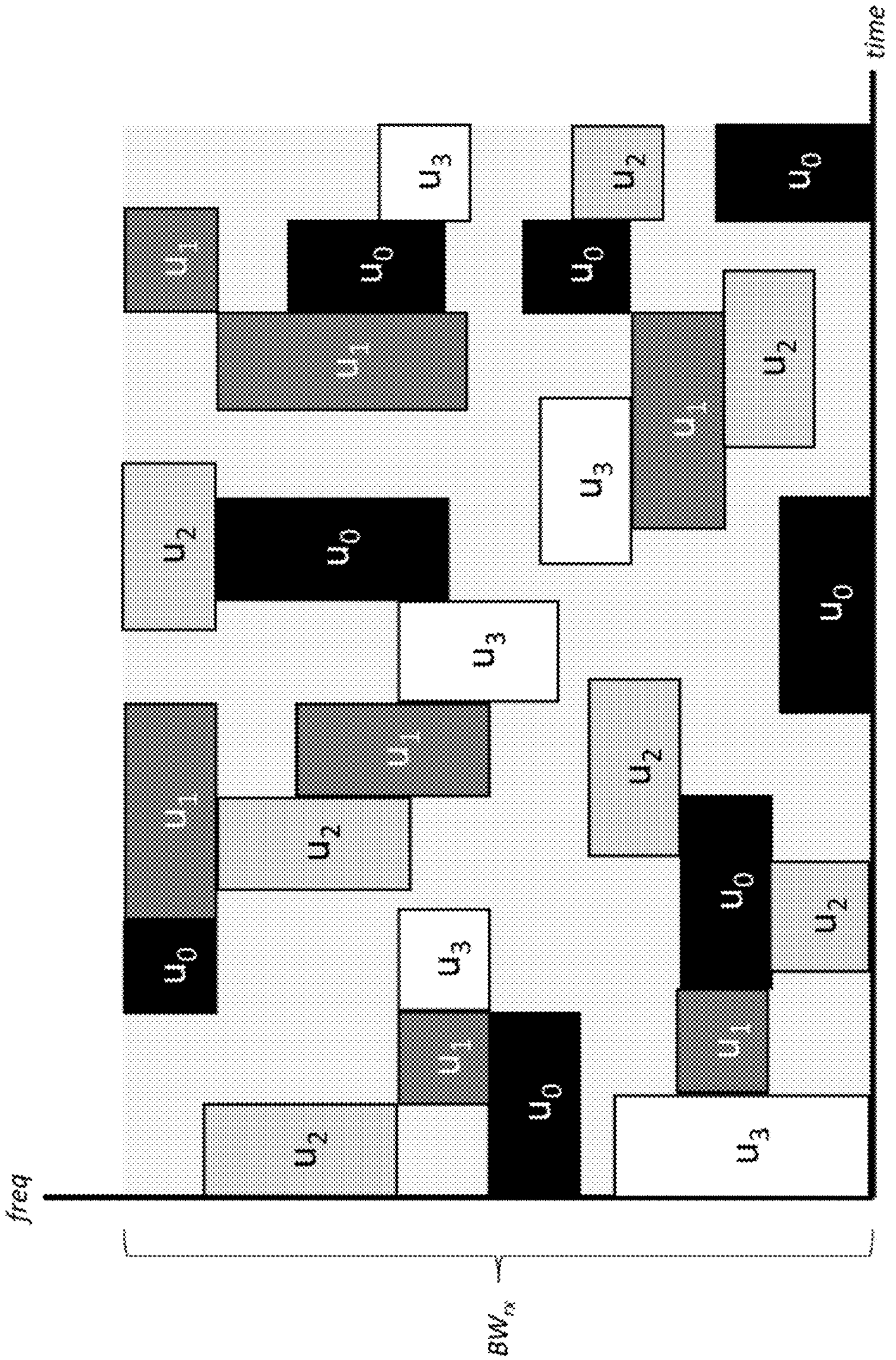
FIG. 6 illustrates an example allocation of sub-carriers in a frequency and time domain of a carrier wave, according to an embodiment of the present disclosure.

Referring now to FIG. 6, an example allocation of audio channels for plural users ($user_0$, $user_1$, $user_2$, and $user_3$) to respective sub-carriers within the time-frequency domain of the carrier wave is illustrated. Applicant has found that such allocation of audio channels for an audio monitoring system typically requires that signals for individual users be spaced in the time domain and/or spaced in the frequency domain to avoid interference from adjacent users, leading to relatively poor resource use (e.g., spectral inefficiency). As can be seen in FIG. 6, such an allocation approach typically requires that an IEM system uses the spectrum in the time and frequency domain in a relatively sparse manner, meaning that the payload audio carried on the carrier wave at each portion of the frequency domain, per unit of the time domain, is low because of a relatively large sub-carrier spacing in the time domain and in the frequency domain. Applicant has found that such wideband systems typically require an arbitrary allocation of fixed bandwidth frequency-time resources to users, and that such wideband systems often use the same or similar bandwidth regardless of the number of active audio devices. This is illustrated in FIG. 6 as $BW_{rx}$ which illustrates that, in order for a receiver to identify and demodulate the correct sub-carriers across the time-frequency domain, each receiver must receive the full bandwidth. Said otherwise, the receiver associated with a first user ($u_1$) would need to receive a larger bandwidth, e.g., about 6 MHz, in order to ensure that all allocated sub-carriers across the time-frequency domain are properly identified and demodulated such that the entire audio channel for the first user is received and can be played back for the first user. Applicant has likewise found that such an allocation approach requires the use of a wideband receiver to accommodate the larger bandwidth across which sub-carriers the audio channel for the first user, for instance, is allocated.

Figure 7:
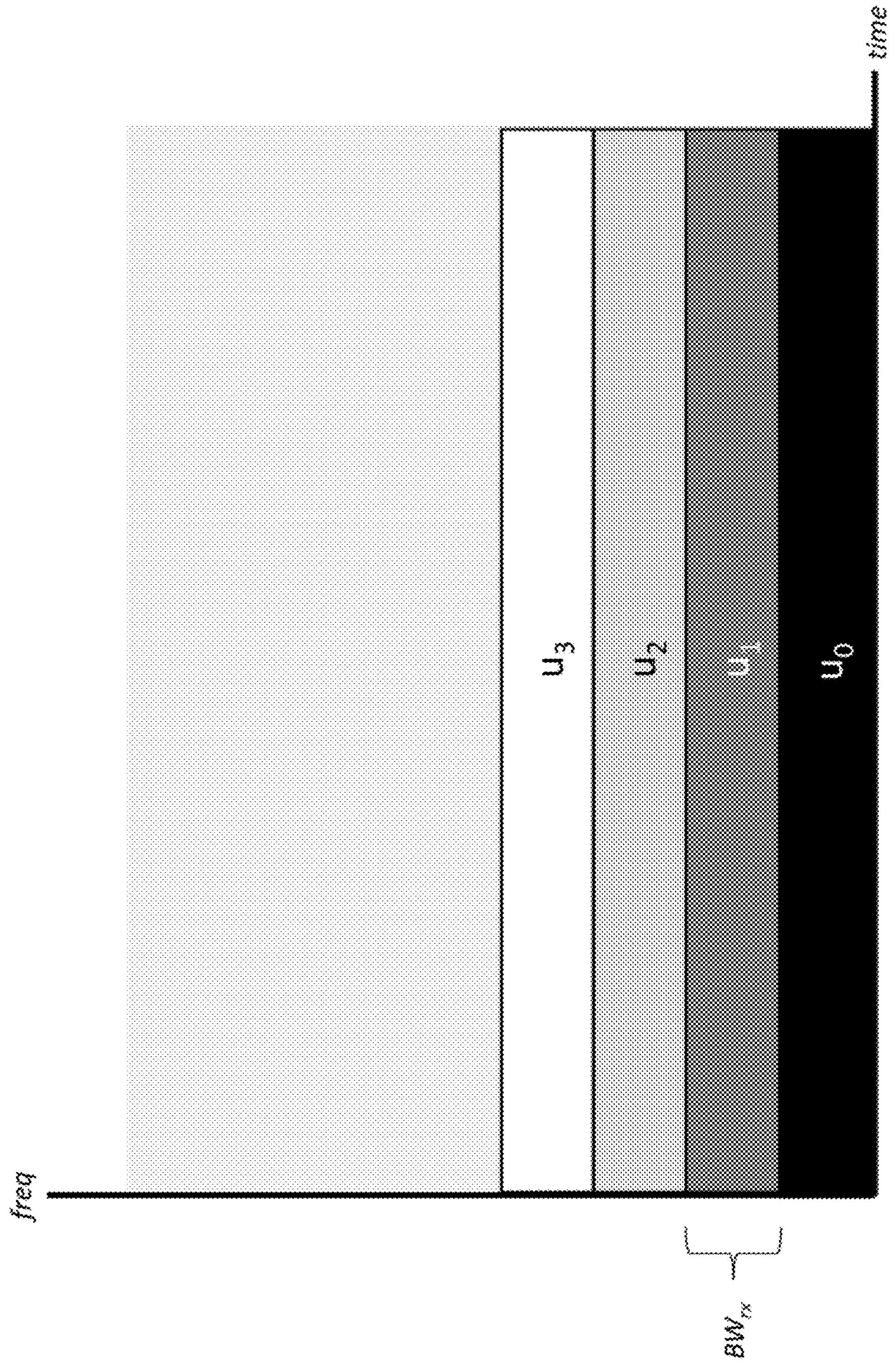
FIG. 7 illustrates an example allocation of sub-carriers in a frequency and time domain of a carrier wave, according to an embodiment of the present disclosure.

Conversely, FIG. 7 illustrates an example allocation of audio channels for plural users ($user_0$, $user_1$, $user_2$, and $user_3$) to respective sub-carriers within the frequency domain of the carrier wave according to embodiments of the present disclosure. As illustrated, the spectrum is subdivided into a number of sub-carriers that are orthogonal to one or more other sub-carriers in the frequency domain and remain stable across the time domain. In some embodiments, each sub-carrier is modulated independently. In some embodiments, because each receiver is allocated a stable sub-carrier occupying a same or similar portion of the frequency domain across the time domain of the carrier wave, the mobile receiver can be a narrowband portable receiver, e.g., a receiver configured to receive and sample or otherwise process a relatively smaller sub-band of spectrum (e.g., less than about 6 MHz, less than about 5 MHz, less than about 4 MHz, less than about 3 MHz, less than about 2 MHz, less than about 1 MHz, less than about 900 kHz, less than about 800 kHz, less than about 700 kHz, less than about 600 kHz, less than about 500 kHz, less than about 400 kHz, less than about 300 kHz, or less than about 200 kHz of bandwidth, inclusive of all values and ranges therebetween) instead of the receiver according to the allocation approach illustrated in FIG. 6, which is configured to receive and process a bandwidth of greater than about 6 MHz. Without wishing to be bound by any particular theory, because the sub-carriers are orthogonal in the frequency and/or time domain, a receiver (e.g., the receiver 105) that is time and frequency synchronized to a transmitter (e.g., the downlink transmitter 104) can recover the sub-carriers and their modulated data that are associated with that particular receiver such that the adjacent sub-carriers do not interfere with each other, by avoiding inter-sub-carrier interference and sub-carrier intermodulation.

Also, as illustrated in FIG. 7, by orthogonal allocation of sub-carriers across the frequency domain, the same audio resources may be transmitted while using a smaller portion of the sub-band of spectrum allotted for the IEM system, meaning that additional sub-carriers may be orthogonally allocated across the unused portion of the frequency domain and that additional users may be added to the IEM system without requiring additional spectrum.

Figure 8:
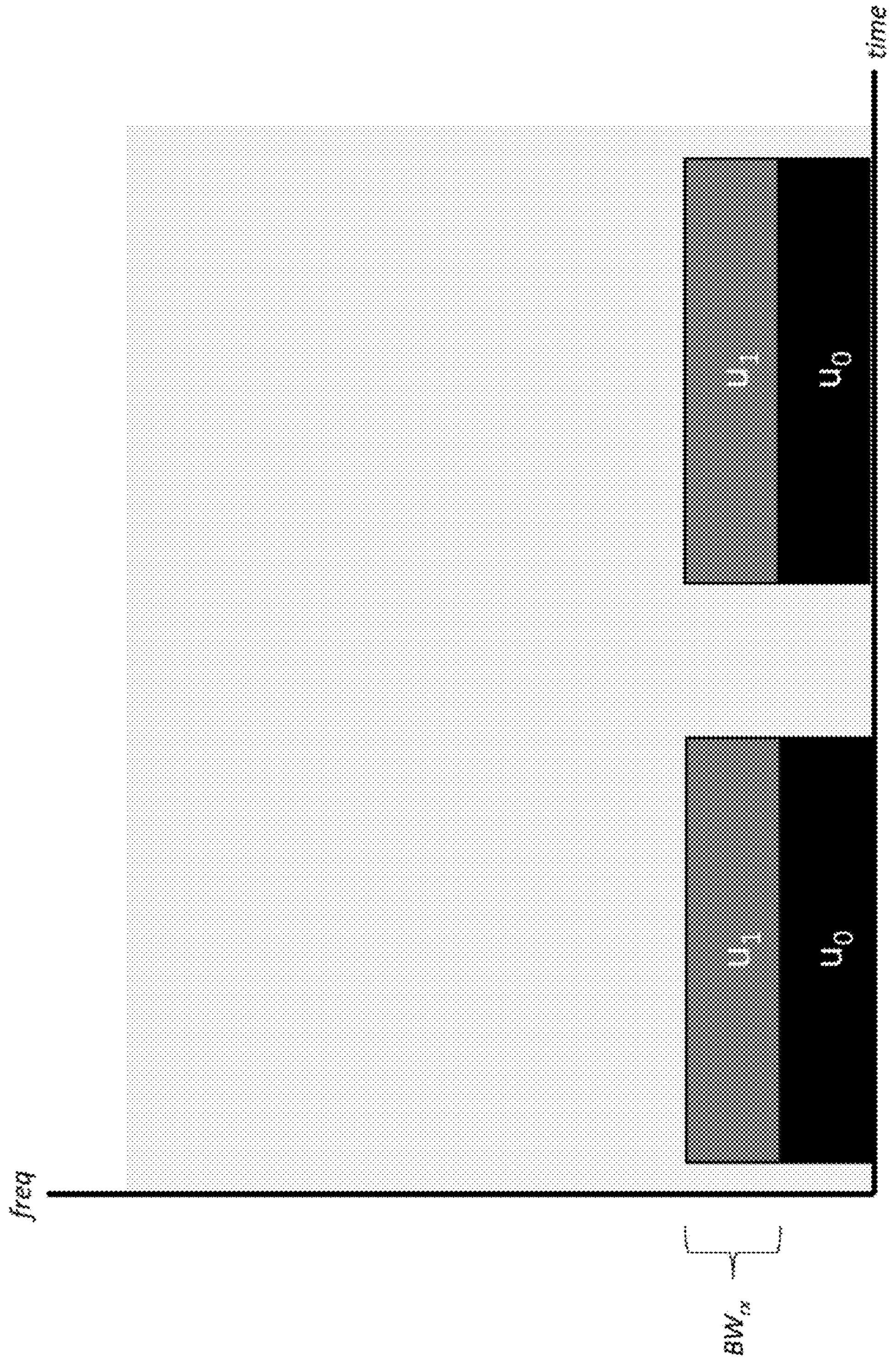
FIG. 8 illustrates an example allocation of sub-carriers in a frequency and time domain of a carrier wave, according to an embodiment of the present disclosure.
Figure 9:
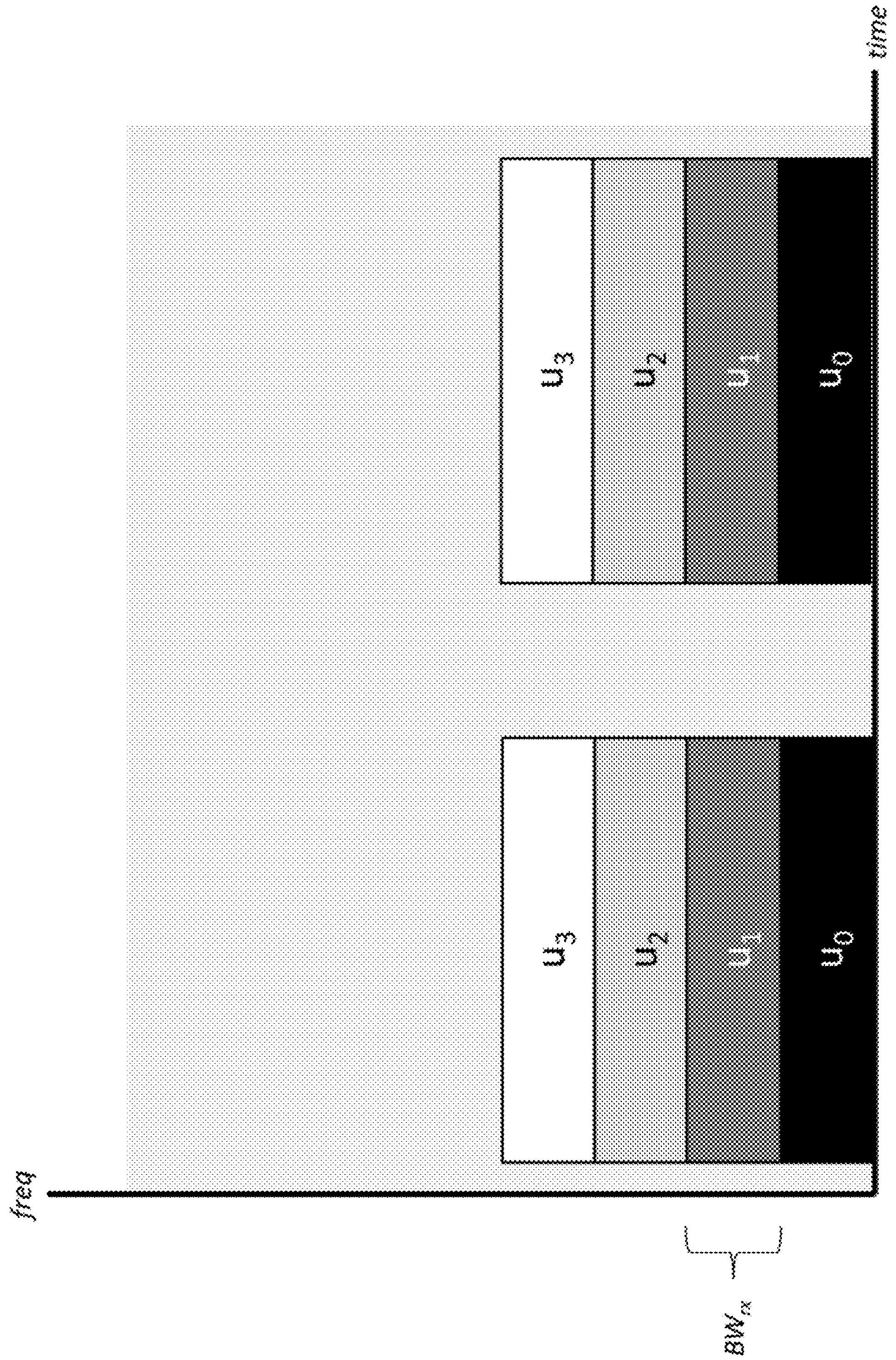
FIG. 9 illustrates an example allocation of sub-carriers in a frequency and time domain of a carrier wave, according to an embodiment of the present disclosure.

FIGS. 8 and 9 illustrate example sub-carrier allocations of the frequency domain of a carrier wave in which a portion of the spectral resource may be used for carrying other information besides the audio payload. While sub-carriers remain allocated to the same portion of the frequency domain, the time domain may be apportioned to various other information, to guard intervals, or the like.

For example, during a first portion of the time domain, synchronization information, demodulation information, and/or the like may be transmitted in the portion of the frequency domain allocated to $u_1$, for example, and then in a second portion of the time domain subsequent the first portion, the audio payload for user to can be carried in the portion of the frequency domain of the carrier wave allocated to $u_1$, followed by a third portion of the time domain subsequent the second portion in which further synchronization or demodulation information may be provided in the portion of the frequency domain allocated to $u_1$.

FIG. 8 illustrates an example of an instance in which portions of the spectrum are allocated to only two users, e.g., because only two users require audio playback during that time, while FIG. 9 may illustrate an example of an instance in which two additional users require audio playback and thus additional portions of the spectrum are allocated to the two additional users. By allocating a particular and stable portion of the frequency domain to $u_1$, for example, when $u_2$ and $u_3$ are added to the IEM system, it is likely that the portion of the spectrum (sub-carriers) associated with the audio channel of $u_1$ will not change, meaning that the $u_1$ receiver will not need to resynchronized to a new or changing sub-carrier allocation scheme. Likewise, in an instance in which one or more users no longer require audio playback, the portion of the frequency domain allocated to those users might not be used and the portion of the frequency domain associated with the remaining users may be unchanged in terms of sub-carrier allocation.

Figure 10:
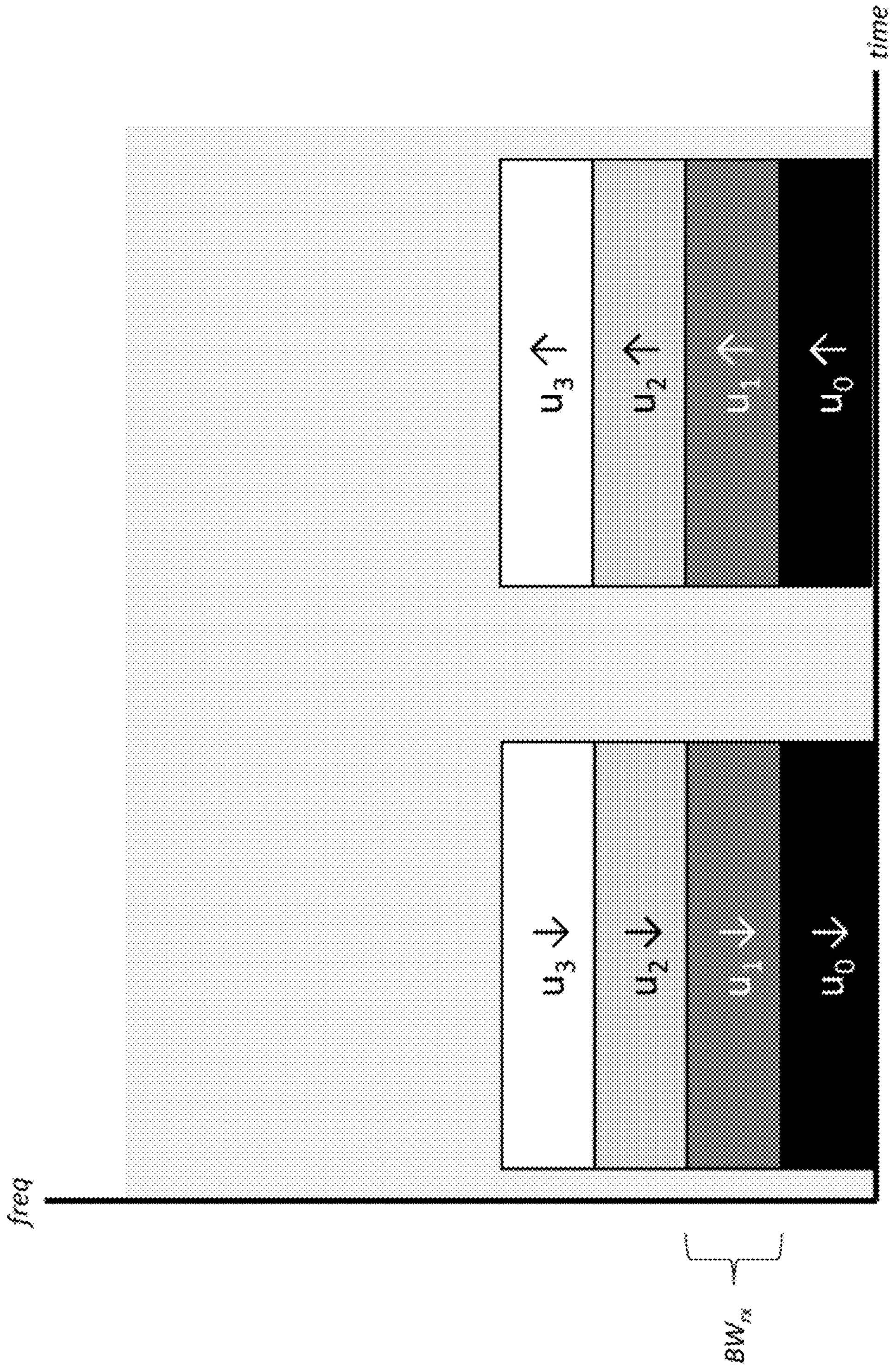
FIG. 10 illustrates an example allocation of sub-carriers in a frequency and time domain of a carrier wave, according to an embodiment of the present disclosure.

FIG. 10 illustrates an example of sub-carrier allocation across the frequency domain that can be allocated bidirectionally across the time domain. Said otherwise, during a first portion of the time domain, a portion of the frequency domain may be used for downlink direction audio transmission between a soundboard transceiver and an IEM transceiver worn by the user, e.g., to provide a stereo audio mix for playback to the user by one or more IEMs. Then, during a subsequent portion of the time domain, the same portion of the frequency domain may be used for uplink direction audio transmission between the IEM transceiver worn by the user and the soundboard transceiver, e.g., to provide audio captured by the user's wireless microphone. However, when orthogonally allocating audio channels to sub-carriers that occupy the same portion of the frequency domain, it is important to be sure that the stereo audio mix for IEM playback can be transmitted, received, and demodulated without significant interference, noise, or uncorrected signal deformation. Likewise, when receiving uplink direction audio from a user's microphone at the soundboard transceiver, for example, it is also important to correct for or avoid interference, noise, and uncorrected signal deformation.

Referring now to FIG. 11, the same user audio channel allocations are illustrated as in FIGS. 9 and 10, but now the time domain is subdivided to accommodate synchronization between transmitter and receiver and to leave guard intervals where needed in the time domain. As illustrated, the bandwidth for each channel may be similar to that in FIGS. 9 and 10, which is materially smaller than that of the approach illustrated in FIG. 6, however by subdividing the time domain and allowing for downlink synchronization sub-carriers to be transmitted, followed by a guard interval, followed by an uplink sub-carrier or uplink set of sub-carriers, and so on, the bi-directional approach may be carried out without introducing noise from direction switching in the time domain and without requiring uplink direction sub-carriers be separate from downlink direction sub-carriers in the frequency domain.

Figure 12:
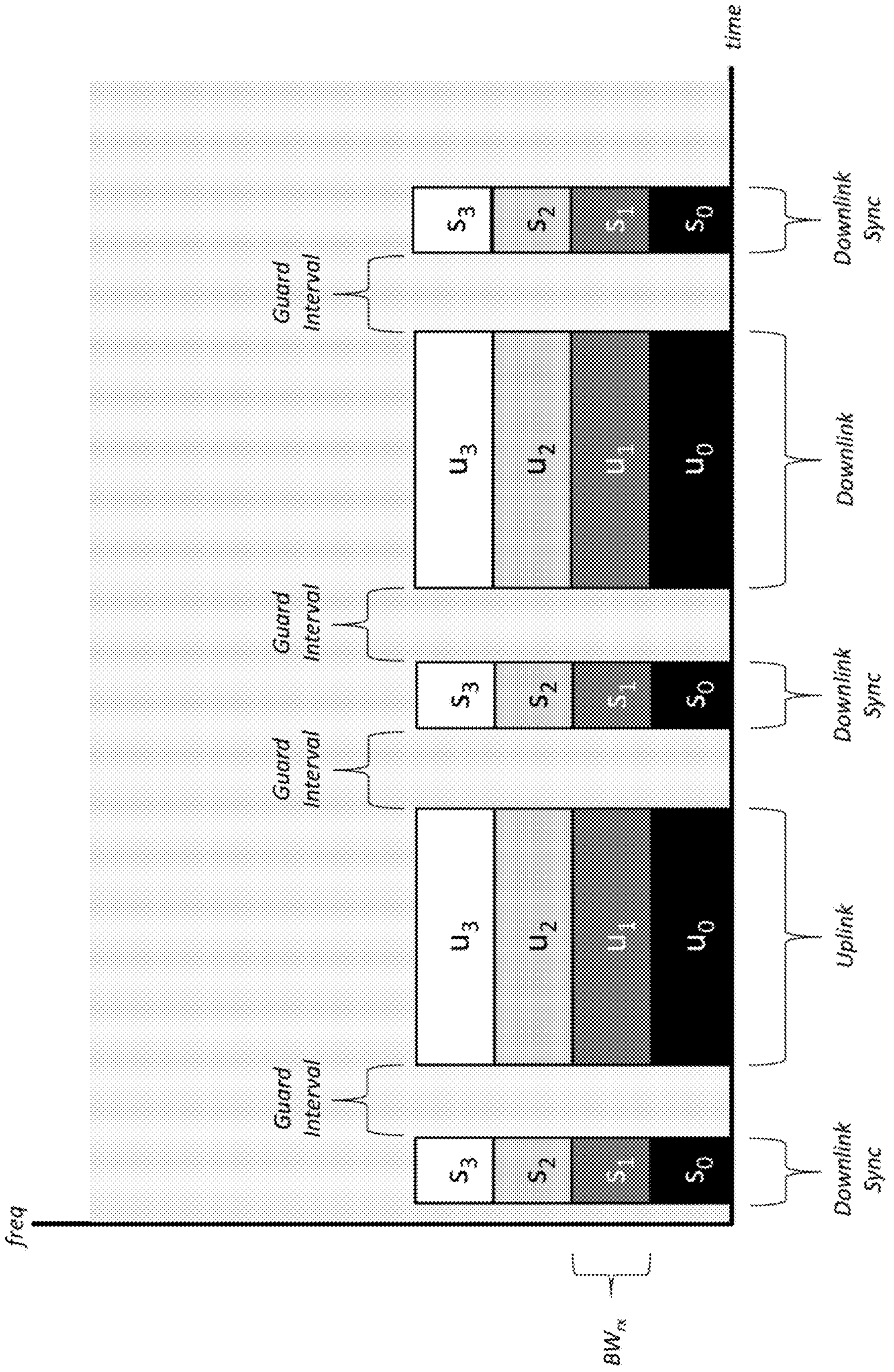
FIG. 12 illustrates an example allocation of sub-carriers in a frequency of a carrier wave for bi-directional audio transmission, according to an embodiment of the present disclosure.

Referring now to FIG. 12, an example user audio channel allocation is illustrated, with the frequency domain being subdivided into plural sub-bands having a bandwidth $BW_{rx}$ less than a total bandwidth of the total carrier wave or signal. In some embodiments, the time domain of the carrier wave or signal can be subdivided to accommodate synchronization between transmitter and receiver in the downlink direction, to leave guard intervals where needed in the time domain, and to accommodate one or both of uplink direction audio payload subcarriers or downlink direction audio payload subcarriers. As illustrated, the bandwidth for each channel may be similar to that in FIGS. 9 and 10, which is materially smaller than that of the approach illustrated in FIG. 6, however by subdividing the time domain and allowing for downlink synchronization sub-carriers to be transmitted, followed by a guard interval, followed by an uplink subcarrier or uplink set of sub-carriers, followed by further synchronization subcarriers, followed by an uplink subcarrier or uplink set of subcarriers carrying audio payload and so on, a bi-directional approach may be carried out without introducing noise from direction switching in the time domain and without requiring uplink direction subcarriers be separate from downlink direction sub-carriers in the frequency domain.

Figure 13:
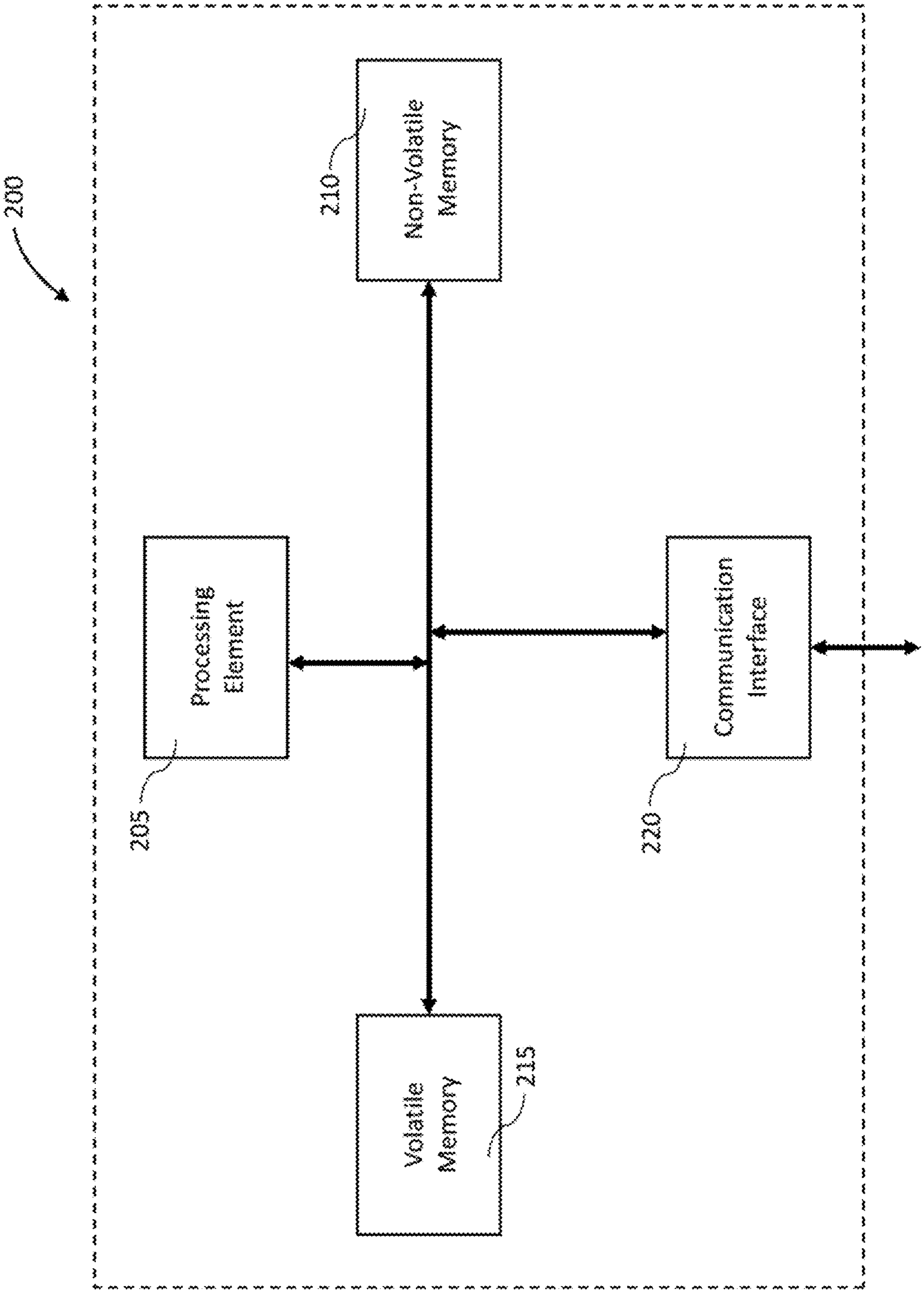
FIG. 13 illustrates a schematic of an example computing device capable of supporting and facilitating one or more aspects described herein.

FIG. 13 provides a schematic of a computing device 200 for carrying out a portion or all of at least some of the methods, approaches, steps, processes, techniques, and/or algorithms described herein, according to at least some of the embodiments of the present disclosure. In some embodiments, the computing device 200 can be similar to or the same as one or more of the uplink transmitters 102*a*, 102*b*, the downlink transmitters 104, or the receiver 105. In some embodiments, one or more of the uplink transmitters 102*a*, 102*b*, the downlink transmitters 104, or the receiver 105 can comprise the computing device 200, or vice versa. In some embodiments, the computing device 200 can be configured to carry out all or part of any of the methods, algorithms, processes, or approaches described herein, according to a set of instructions or according to computer program code. In general, the terms computing entity, computer, entity, device, system, and/or similar words used herein interchangeably may refer to, for example, one or more computers, sound boards, audio mixers, audio signal transmission systems, in-ear-monitoring systems, audio engineering racks, computing entities, desktops, mobile phones, tablets, phablets, notebooks, laptops, distributed systems, kiosks, input terminals, servers or server networks, blades, gateways, switches, processing devices, processing entities, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in at least one embodiment, the computing device 200 may include may include or be in communication with one or more processing elements 205 (also referred to as processors, processing circuitry, and/or similar terms used herein interchangeably) that communicate with other elements within the computing device 200 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), digital signal processors (DSPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the computing device 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the computing device 200 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the computing device 200 with the assistance of the processing element 205 and operating system.

In at least one embodiment, the computing device 200 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing device 200 may be configured to communicate via wireless external communication networks using any of a variety of protocols, such as ultra-high frequency analog signal transmission, frequency modulation, radio frequency transmission, or other such protocols or approaches.

Although not shown, the computing device 200 may include or be in communication with one or more input elements (not shown), such as a keyboard input, a mouse input, a touch screen/display input, motion input, movement input, audio input, pointing device input, joystick input, keypad input, and/or the like. The computing device 200 may also include or be in communication with one or more output elements (not shown), such as audio output, video output, screen/display output, motion output, movement output, and/or the like. Such an output element may comprise, for example, one or more in-ear-monitors (IEMs) in wired or wireless communication with the computing device 200 or a component thereof, such as the processing element 205, and/or the like.

Figure 14:
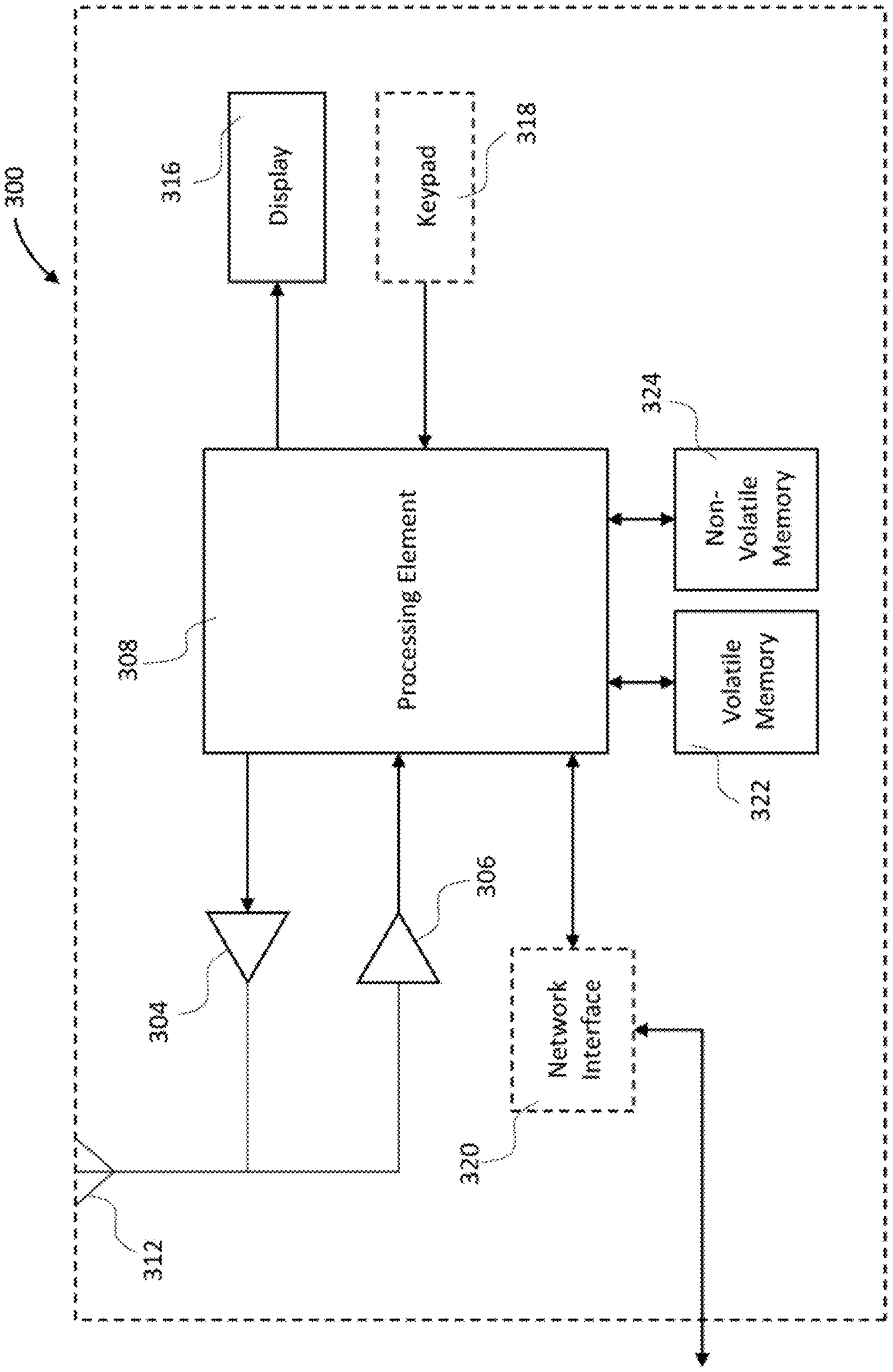
FIG. 14 illustrates a schematic of an example external computing device capable of supporting and facilitating one or more aspects described herein.

FIG. 14 provides an illustrative schematic representative of an external computing entity 300 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 300 can be operated by various parties. As shown in FIG. 14, the external computing entity 300 can comprise an antenna 312, a transmitter 304 (e.g., radio), a receiver 306 (e.g., radio), and a processing element 308 (e.g., CPLDs, microprocessors, multi-core processors, DSP, ADC, coprocessing entities, ASIPs, microcontrollers, controllers, and/or the like) that provides signals to and receives signals from the transmitter 304 and receiver 306, correspondingly. In some embodiments, the external computing entity 300 may comprise the receiver 306 but not the transmitter 304.

The signals provided to and received from the transmitter 304 and the receiver 306, correspondingly, may include signaling information/audio data in an air interface and/or via other suitable wireless means. In this regard, the external computing entity 300 may be capable of operating over one or more air interfaces, with any suitable modulation approach, and with one or a plurality of other such devices.

According to one embodiment, the external computing entity 300 may include location determining aspects, devices, modules, functionalities, and/or similar words used herein interchangeably. For example, the external computing entity 300 may include outdoor positioning aspects, such as a location module adapted to acquire, for example, latitude, longitude, altitude, geocode, course, direction, heading, speed, universal time (UTC), date, and/or various other information/data. In some embodiments, the external computing entity 300 may include ambient weather determining aspects, such as a thermometer or the like. In some embodiments, the location module can acquire data, sometimes known as ephemeris data, by identifying the number of satellites in view and the relative positions of those satellites (e.g., using global positioning systems (GPS)). In some embodiments, the location information/data can be determined by triangulating the external computing entity's 300 position in connection with a variety of other systems, including cellular towers, an antenna of the computing device 200 or the like, Wi-Fi access points, and/or the like. Similarly, the external computing entity 300 may include indoor positioning aspects, such as a location module adapted to acquire, for example, latitude, longitude, altitude, geocode, course, direction, heading, speed, time, date, and/or various other information/data. Some of the indoor systems may use various position or location technologies including radio-frequency identification (RFID) tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 300 may also comprise a user interface (that can comprise a display 316 coupled to a processing element 308) and/or a user input interface (coupled to a processing element 308). For example, the user interface may be a user application, user interface, and/or similar words used herein interchangeably executing on and/or accessible via the external computing entity 300 to interact with and/or cause display of information/data from the computing device 200, as described herein. The user input interface can comprise any of a number of devices or interfaces allowing the external computing entity 300 to receive data, such as an optional keypad 318 (hard or soft), a touch display, voice/speech or motion interfaces, or other input device. In embodiments including a keypad 318, the keypad 318 can comprise (or cause display of) the conventional numeric (0-9) and related keys (#, *), and other keys used for operating the external computing entity 300 and may include a full set of alphabetic keys or set of keys that may be activated to provide a full set of alphanumeric keys. In some embodiments including a keypad 318, the keypad 318 can be caused to be presented temporarily when appropriate on the display 316. In addition to providing input, the user input interface can be used, for example, to activate or deactivate certain functions, such as sleep modes.

The external computing entity 300 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 300. As indicated, this may include a user application that is resident on the entity or accessible through a browser or other user interface for communicating with the computing device 200 and/or various other computing entities.

In another embodiment, the external computing entity 300 may include one or more components or functionality that are the same or similar to those of the computing device 200, as described in greater detail above. As will be recognized, these architectures and descriptions are provided for exemplary purposes only and are not limiting to the various embodiments.

Figure 15:
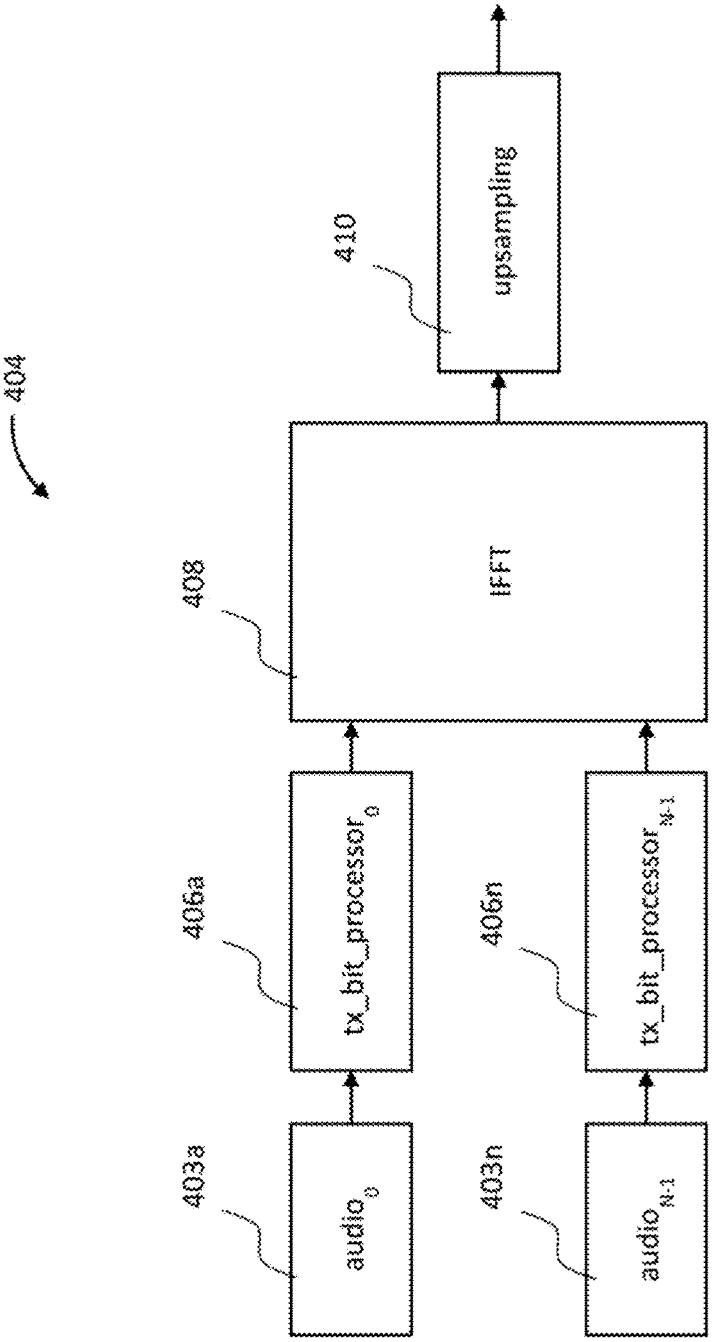
FIG. 15 illustrates a simplified block diagram of an example audio transmission device capable of supporting and facilitating one or more aspects described herein.
Figure 16:
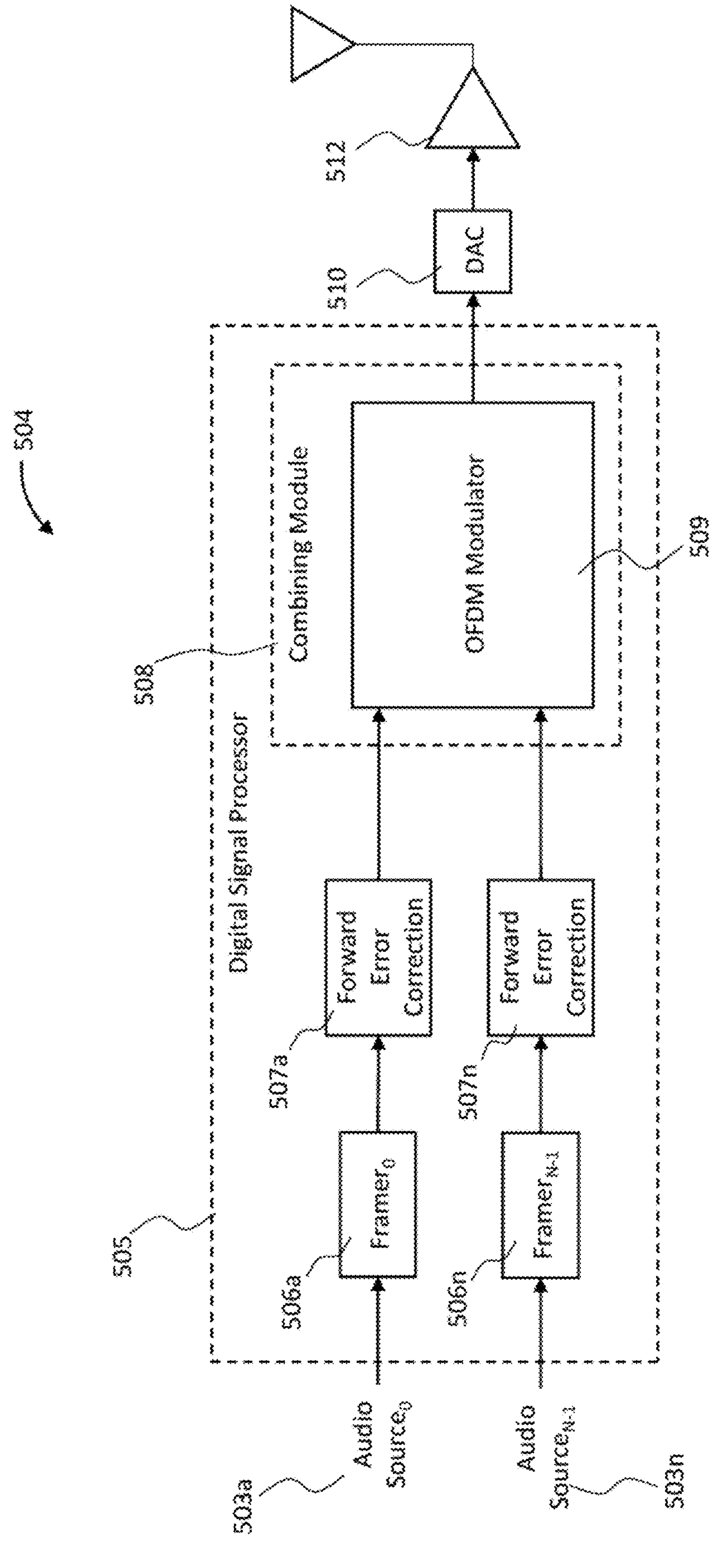
FIG. 16 illustrates a simplified block diagram of an example audio transmission device capable of supporting and facilitating one or more aspects described herein.

Referring now to FIGS. 15 and 16, simplified block flow diagrams are provided illustrating example transmitters 404, 504, which may be at least similar to the downlink transmitter 104.

In FIG. 15, the transmitter 404 is configured to receive audio 403*a* (digital or analog) for a first user and other audio 403*n* (digital or analog) for one or more other users. In some embodiments, the transmitter 404 may comprise a transmission bit processor 406*a* for processing the audio 403*a* and one or more other transmission bit processors 406*n* for processing the other audio 403*n*. In some embodiments, the transmitter 404 can be configured to combine at least a portion of the audio 403*a* with at least a portion of the other audio 403*n* for forming channels of sub-carriers in the signal that are allocated to respective receivers. In some embodiments, the transmitter 404 can be configured to scramble the signal, e.g., by applying an inverse fast Fourier transform 408 algorithm to determine the inverse discrete Fourier transform of the signal. In some embodiments, the transmitter 404 can be configured to modulate 410 the signal, e.g., by upsampling, peak windowing, or the like. In some embodiments, the transmitter 404 can be configured to transmit 412 the scrambled, modulated signal, e.g., by digital to analog (DAC) conversion to an analog signal, and transmission of the analog FM signal towards the receivers (e.g., 105). In some embodiments, the transmitter 404 can alternatively or additionally be configured to transmit an analog frequency modulated (FM) signal towards the receivers (e.g., 105).

In FIG. 16, the transmitter 504 is configured to receive audio 503*a* (digital or analog) for a first user and other audio 503*n* (digital or analog) for one or more other users. In some embodiments, the transmitter 504 may comprise a digital signal processor 505 (DSP 505). In some embodiments, the DSP 505 may be configured to frame 506*a* the audio 503*a* and frame 506*n* the other audio signals 503*n*. In some embodiments, the DSP 505 may be configured to carry out forward error correction 507*a* and 507*n* for the audio 503*a* and the other audio 503*n*, respectively. In some embodiments, the DSP 505 can comprise a combining module 508 configured to combine the audio 503*a* and the other audio 503*n* into orthogonal sub-carriers of a carrier wave. In some embodiments, the combining module 508 can comprise an orthogonal frequency-division multiplexing (OFDM) modulator 509 configured to carry out sub-carrier allocation within the frequency domain of the signal. In some embodiments, the transmitter 504 can further comprise a DAC 510 configured to receive the modulated and scrambled digital signal and convert it to an analog signal. The transmitter 504 can further comprise an antenna 512 (e.g., single antenna or an antenna array) that is configured for transmitting the analog FM signal (e.g., an ultra-high frequency (UHF) signal towards the receivers, e.g., 105).

Figure 17:
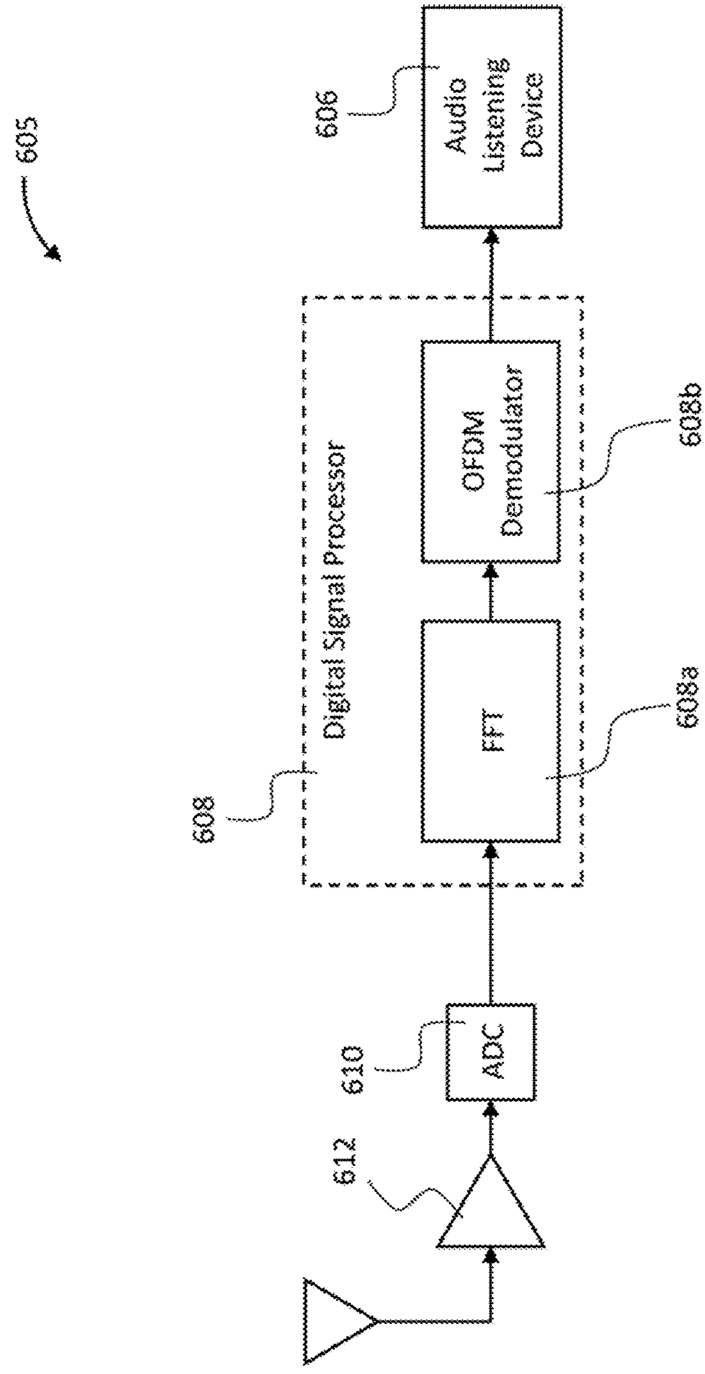
FIG. 17 illustrates a simplified block diagram of an example audio receiving device capable of supporting and facilitating one or more aspects described herein.

FIG. 17 is a simplified block flow diagram of a receiver 605, which may be at least similar to the receiver 105 described elsewhere. In some embodiments, the receiver 605 may be configured to receive, from a transmitter (e.g., 104, 404, 504), an analog signal, such as a narrowband analog signal comprising plural sub-carriers that are orthogonal in the frequency domain. In some embodiments, the receiver 605 can comprise a receiving transducer 612 configured to receive the signal, and an analog-to-digital converter 610 (ADC 610) to which the receiving transducer 612 can relay the signal. In some embodiments, the receiver 605 can further comprise a digital signal processor 608 (DSP 608) configured to descramble, demodulate, normalize, and sample the digital signal received from the ADC 610. In some embodiments, the DSP 608 can comprise an ODFM demodulator 609*a* configured to demodulate the digital signal. In some embodiments, the DSP 608 can further comprise a synchronization and normalization module 609*b* configured to apply non-data-aided and/or data-aided synchronization techniques for correcting for noise and distortion in a signal that was received in an interferer laden environment. In some embodiments, the receiver 605 can be a body worn IEM receiver and may comprise or be in communication with one or more audio listening devices 606 such as in-ear-monitors.

Synchronization can be carried out by the receiver 605 using various non-data-aided methods. The receiver 605 may, for example, be synchronized to the transmitter 404, 504 with respect to the time domain and the frequency domain through interpretation of the carrier wave itself. In other embodiments, the transmitter 404, 504 may include synchronization information as overhead in the transmission frame structure such that the receiver 605 can carry out data-aided synchronization methods.

An example of a synchronization approach includes frame synchronization in which the receiver 605 samples the time domain of the signal at the appropriate time in order for the orthogonality of the sub-carriers to be preserved. In some embodiments, the receiver 605 can be configured to carry out frame synchronization as an initial synchronization upon initial receipt of the carrier wave. In some embodiments, the receiver 605 can be configured to also or alternatively carry out frame synchronization during ongoing reception of the carrier wave. Said otherwise, frame synchronization establishes the point in the time domain where the receiver 605 needs to sample the signal for fast Fourier transform (FFT). In some embodiments, the transmitter may include, iteratively, symbols, frames, signals, or values in the time domain of the carrier wave that facilitates synchronization of the receiver 605 with the transmitter 404, 504. During frame synchronization, or following frame synchronization, the receiver 605 can synchronize the remove the CPs from the signal and carry out FFT.

In some embodiments, after frame synchronization within the time domain, the receiver 605 may be configured for carrying out carrier frequency offset estimation and correction for the offset in the frequency domain. By way of example only, if sub-carrier spacing is estimated to be, for example, 10 kHz, the coarse carrier frequency offset may be an increment of the sub-carrier spacing and the receiver 605 can shift up or down in the frequency domain by said increment to shift the audio channel data in the FFT.

In some embodiments, as part of coarse carrier frequency offset estimation and correction, the receiver 605 may also be configured to look for beacon symbols associated with a particular sub-carrier. If the receiver 605 is expecting to receive audio payload on a particular sub-carrier, the receiver 605 can identify the beacon symbol associated with the particular sub-carrier, determine a frequency or time domain offset based upon where in the time or frequency domain the beacon symbol is expected to be and where it is found, and then correct by shifting the sub-carriers in the time domain and/or the frequency domain.

In some embodiments, after frame synchronization in the time domain, based upon CPs, and carrier offset synchronization in the frequency domain, the receiver 605 can sample the signal to look into the bins of the FFT and see that the sub-carrier are what the receiver 605 is expected. For example, the transmitter 404, 504 may provide one or more pilots, pilot sub-carriers, pilot signals, or pilot frames in or with particular pre-determined sub-carrier(s)s and the receiver 605 may know to expect a pilot, pilot sub-carrier, pilot signal, or pilot frame at or in the particular pre-determined sub-carrier(s), in which case the receiver 605 can sample the signal at the portion of the time and frequency domain associated with that pre-determined sub-carrier to identify whether the pilot, pilot sub-carrier, pilot signal, or pilot frame is found. In an instance in which the receiver 605 does not see the expected pilot, pilot sub-carrier, pilot signal, or pilot frame at the point in the time and frequency domains where the particular pre-determined sub-carrier(s) is/are expected to be, the receiver 605 can carry out further sub-carrier offset correction, e.g., based upon sub-carrier spacing, and continue determining presence or absent of the expected pilot, pilot sub-carrier, pilot signal, or pilot frame until the receiver completes pilot-aided synchronization. After initial synchronization, temperature changes, movements of the user wearing the receiver, interference from interferers in the environment, and the like may contribute to fine frequency or timing offsets. As such, the receiver 605 may be configured to carry out fine timing offset correction by tracking the timing offset to confirm that the receiver 605 is sampling the time domain waveform at the correct time. In some embodiments, the receiver 605 can be configured to carry out fine timing offset correction using the pilots, pilot sub-carriers, pilot signals, or pilot frames in the sub-carriers associated to the receiver 605.

In some embodiments, the receiver 605 may be configured to, after coarse and/or fine offset correction in the time domain and frequency domain, whether non-data aided or aided by beacons/beacon symbols and/or pilot signals/pilot frames, carry out channel estimation according to pre-determined carrier and sub-carrier frequencies. Said otherwise, the receiver 605 may initially be set up in the IEM system to expect a carrier frequency for the carrier wave and then, relative to that carrier frequency, the receiver 605 is configured to know the sub-carriers to which it should listen (sample). The receiver 605 can then start sampling the sub-carriers to interpret the audio payloads from the synchronization information and guard intervals.

In some embodiments, as a user is moving around in the environment, the amplitude of the signal can change with signal path distance change and there can be multi-path propagation, so different frequencies are being attenuated. As such, in some embodiments, the receiver 605 may be configured to carry out channel estimation to correct for those time varying impairments, so that the receiver 605 can subsequently demodulate the sub-carriers successfully without distortions to the sub-carrier data information or issues arising from that data having the incorrect phase.

In some embodiments, channel estimation may use beacon symbols in the sub-carriers that are sent somewhat infrequently, such as every five milliseconds or the like, to normalize the signal in each sub-carrier. In some embodiments, by transmitting the beacon symbols relatively infrequently, overhead in the signal can be saved and latency reduced. In some embodiments, the receiver 605 can be configured to, based on the beacon symbols associated with each sub-carrier transmitted, estimate for each sub-carrier the audio channel associated with the audio channel at that particular point in the frequency domain and time domain. In some embodiments, based upon this channel estimation approach, the receiver 605 can determine a shape and a phase of the channel across sub-carriers.

In some embodiments, the receiver 605 may be configured to carry out channel estimation based upon one or more data-aided approaches. For example, in some embodiments the receiver 605 may be configured to carry out channel estimation based upon beacon symbols, pilots, pilot signals, pilot frames, pilot sub-carriers, and/or the like. In some embodiments, the receiver 605 can, based on the channel estimation, determine attributes of the signal or sub-bands of the signal at various points in the time domain and/or frequency domain, which can aid in correcting for one or more offsets or deformations, such as an amplitude offset, a phase offset, a timing offset, a time domain waveform deformation, a frequency domain waveform deformation, and/or the like. In some embodiments, the receiver 605 can be configured to correct for the one or more offsets or deformations of the signal before sampling the signal for audio payload sub carriers.

In some embodiments, the receiver 605 may be configured to be associated with a particular number of sub-carriers, such as between about 1 to about 100 sub-carriers, about 5 and about 90 sub-carriers, between about 5 and about 80 sub-carriers, between about 5 and about 70 sub-carriers, between about 5 and about 60 sub-carriers, between about 5 and about 50 sub-carriers, between about 5 and about 40 sub-carriers, between about 5 and about 30 sub-carriers, between about 5 and about 20 sub-carriers, greater than about greater than about 10 sub-carriers, greater than about 15 sub-carriers, greater than about 20 sub-carriers, greater than about 25 sub-carriers, greater than about 30 sub-carriers, greater than about 35 sub-carriers, greater than about 40 sub-carriers, greater than about 45 sub-carriers, greater than about 50 sub-carriers, greater than about 55 sub-carriers, greater than about 60 sub-carriers, greater than about 65 sub-carriers, greater than about 70 sub-carriers, greater than about 75 sub-carriers, greater than about 80 sub-carriers, greater than about 85 sub-carriers, greater than about 90 sub-carriers, greater than about 95 sub-carriers, or greater than about 100 sub-carriers, inclusive of all values and ranges therebetween.

In some embodiments, a portion of the sub-carriers associated with the receiver 605 may be or comprise beacons or beacon symbols. In some embodiments, a portion of the sub-carriers may be payload sub-carriers and may comprise payload symbols. In some embodiments, a beacon symbol my precede a payload symbol, followed by a subsequent beacon symbol in the bitstream. In some embodiments, a portion of the sub-carriers can be pilots, pilot signals, pilot sub-carriers, or pilot frames. In some embodiments, pilot signals/frames may comprise beacon symbols. In some embodiments, payload sub-carriers may comprise a beacon symbol. By way of example, a bitstream may comprise a number of sub-carriers comprising beacon symbols, a number of sub-carriers comprising payload symbols and carrying audio payloads, and a number of sub-carriers comprising one or more pilot signals/frames.

In some embodiments, the bitstream may comprise sub-carriers disposed orthogonal to other sub-carrier(s) in the frequency domain but with sub-carrier spacing therebetween in the time domain. In some embodiments, the bitstream may comprise sub-carriers disposed orthogonal to other sub-carrier(s) in the time domain but with sub-carrier spacing therebetween in the frequency domain. In some embodiments, the bitstream may comprise sub-carriers having sub-carrier spacing therebetween in both the time domain and the frequency domain. In some embodiments, the bitstream may comprise certain types of sub-carriers that are orthogonal to other sub-carrier(s), such as audio payload sub-carriers that are orthogonal to preceding or subsequent beacon sub-carrier(s), while other types of sub-carriers may be spaced in the time domain and/or frequency domain. In some embodiments, sub-carriers of a particular type may be orthogonal to other sub-carriers of the same type but spaced in the time domain and/or frequency domain from sub-carriers of different types.

In some embodiments, an audio bitstream such as described above for a plurality of sub-carriers of the carrier wave can result in a narrow signal bandwidth of between about 20 kHz and about 500 kHz, between about 30 kHz and about 450 kHz, between about 35 kHz and about 400 kHz, between about 40 kHz and about 375 kHz, between about 45 kHz and about 350 kHz, between about 50 kHz and about 325 kHz, between about 55 kHz and about 300 kHz, between about 60 kHz and about 275 kHz, between about 65 kHz and about 250 kHz, between about 70 kHz and about 225 kHz, between about 75 kHz and about 200 kHz, between about 80 kHz and about 175 kHz, between about 85 kHz and about 170 kHz, between about 90 kHz and about 165 kHz, between about 95 kHz and about 170 kHz, between about 100 kHz and about 165 kHz, between about 105 kHz and about 160 kHz, between about 110 kHz and about 155 kHz, between about 115 kHz and about 150 kHz, less than about 500 kHz, less than about 450 kHz, less than about 400 kHz, less than about 375 kHz, less than about 350 kHz, less than about 325 kHz, less than about 300 kHz, less than about 275 kHz, less than about 250 kHz, less than about 225 kHz, less than about 200 kHz, less than about 190 kHz, less than about 180 kHz, less than about 170 kHz, less than about 160 kHz, less than about 150 kHz, less than about 140 kHz, less than about 130 kHz, less than about 120 kHz, less than about 110 kHz, less than about 100 kHz, or less than about 50 kHz, inclusive of all values and ranges therebetween.

In some embodiments, the signal bandwidth of the portion of the audio bitstream associated with the receiver 605 may depend, at least in part, upon sub-carrier spacing, e.g., in the frequency domain. In some embodiments, the sub-carrier spacing can be between about 1 kHz and about 50 kHz, between about 2 kHz and about 50 kHz, between about 5 kHz and about 50 kHz, between about 10 kHz and about 50 kHz, between about 15 kHz and about 50 kHz, between about 20 kHz and about 50 kHz, between about 30 kHz and about 50 kHz, between about 1 kHz and about 45 kHz, between about 1 kHz and about 40 kHz, between about 1 kHz and about 35 kHz, between about 1 kHz and about 30 kHz, between about 1 kHz and about 25 kHz, between about 1 kHz and about 20 kHz, between about 1 kHz and about 15 kHz, between about 1 kHz and about 10 kHz, between about 1 kHz and about 5 kHz, greater than about 1 kHz, greater than about 5 kHz, greater than about 10 kHz, less than about 100 kHz, less than about 75 kHz, less than about 50 kHz, less than about 45 kHz, less than about 40 kHz, less than about 35 kHz, less than about 30 kHz, less than about 25 kHz, less than about 20 kHz, less than about 15 kHz, less than about 10 kHz, or less than about 5 kHz, inclusive of all values and ranges therebetween.

In some embodiments, the signal bandwidth of the portion of the audio bitstream associated with the receiver 605 may depend, at least in part, upon sub-carrier spacing, e.g., in the time domain. In some embodiments, the sub-carrier spacing between sub-carriers in the time domain can be between about 1 μs and about 100 ms, between about 1 μs and about 75 ms, between about 1 μs and about 50 ms, between about 1 μs and about 25 ms, between about 1 μs and about 1 ms, between about 1 μs and about 750 μs, between about 1 μs and about 500 μs, between about 1 μs and about 250 μs, between about 1 μs and about 100 μs, between about 1 μs and about 95 μs, between about 1 μs and about 90 μs, between about 1 μs and about 85 μs, between about 1 μs and about 80 μs, between about 1 μs and about 75 μs, between about 1 μs and about 70 μs, between about 1 μs and about 65 μs, between about 1 μs and about 60 μs, between about 1 μs and about 55 μs, between about 1 μs and about 50 μs, between about 1 μs and about 45 μs, between about 1 μs and about 40 μs, between about 1 μs and about 35 μs, between about 1 μs and about 30 μs, between about 1 μs and about 25 μs, between about 1 μs and about 20 μs, between about 1 μs and about 15 μs, between about 1 μs and about 10 μs, between about 1 μs and about 5 μs, greater than about 1 μs, greater than about 5 μs, greater than about 10 μs, greater than about 50 μs, greater than about 100 μs, greater than about 250 μs, greater than about 500 μs, greater than about 750 μs, greater than about 1 ms, greater than about 10 ms, greater than about 25 ms, greater than about 50 ms, greater than about 75 ms, greater than about 100 ms, less than about 100 ms, less than about 75 ms, less than about 50 ms, less than about 25 ms, less than about 10 ms, less than about 1 ms, less than about 750 μs, less than about 500 μs, less than about 250 μs, less than about 100 μs, less than about 90 μs, less than about 80 μs, less than about 70 μs, less than about 60 μs, less than about 50 μs, less than about 40 μs, less than about 30 μs, less than about 20 μs, less than about 10 μs, or less than about 5 μs, inclusive of all values and ranges therebetween.

As mentioned earlier, the bitstream may comprise sub-carriers that comprise beacon symbols. These beacon symbols may be iterative and regularly spaced in the time domain such as appearing at a particular portion of the frequency domain, at a regular interval in the time domain. In some embodiments, the beacon symbols may be provided to the receiver in the time domain between about every 50 μs and about every 100 ms, between about every 100 μs and about every 75 ms, between about every 200 μs and about every 50 ms, between about every 300 μs and about every 45 ms, between about every 400 μs and about every 40 ms, between about every 500 μs and about every 35 ms, between about every 600 μs and about every 30 ms, between about every 700 μs and about every 25 ms, between about every 800 μs and about every 20 ms, between about every 900 μs and about every 15 ms, between about every 1 ms and about every 15 ms, between about every 1 ms and about every 10 ms, between about every 2 ms and about every 9 ms, between about every 3 ms and about every 8 ms, between about every 4 ms and about every 7 ms, between about every 5 ms and about every 6 ms, greater than about every 50 μs, greater than about every 100 μs, greater than about every 200 μs, greater than about every 300 μs, greater than about every 400 μs, greater than about every 500 μs, greater than about every 600 μs, greater than about every 700 μs, greater than about every 800 μs, greater than about every 900 μs, greater than about every 1 ms, greater than about every 2 ms, greater than about every 3 ms, greater than about every 4 ms, greater than about every 5 ms, greater than about every 6 ms, greater than about every 7 ms, greater than about every 8 ms, greater than about every 9 ms, greater than about every 10 ms, greater than about every 15 ms, greater than about every 20 ms, greater than about every 25 ms, greater than about every 30 ms, greater than about every 40 ms, or greater than about every 50 ms, inclusive of all values and ranges therebetween.

In some embodiments, the receiver 605 may be configured to look at beacon symbols in the bitstream across the frequency domain and/or across the time domain to accumulate a sufficient amount of beacon information to facilitate various data-aided synchronization techniques, such as those described elsewhere herein. In some embodiments, by keeping the beacons sparse across the time domain, such as by using the time domain beacon symbol frequency described above, the proportion of overhead (synchronization information such as beacon symbols, pilot signals/frames, etc.) can be kept lower than systems that operate using an allocation approach as shown in FIG. 6, for example. Correlatively, the proportion of audio payload in the bitstream will be increased and there will be a proportional reduction in latency without sacrificing the receiver's ability to conduct channel estimation.

In addition to the described configurations and capabilities of the receiver 605 that may lead to increased spectral efficiency, user scalability, decreased noise, and reduced latency, described herein are various configurations and capabilities of the transmitter 404, 504 that lead to increased spectral efficiency, user scalability, decreased noise, and reduced latency.

In addition, combining one sub-carrier into plural channels in digital form (at a mixing board or the like) typically results in a relatively high PAPR, and therefore it can reduce PAPR to combine the sub-carrier into plural channels for plural receivers 605 by combining analog signal portions after the PA and before signal transmission to the plural receivers 605, e.g., using a lossy RF combiner or the like. However, by combining analog signal portions after the PA, separate equipment is often required and the transmission and combining process leads to increased end-to-end latency. By combining sub-carriers for channel formation in the digital signal, various analog components can be eliminated, there is no need for a cavity or hybrid combiner. However, in order to make digital combining of sub-carriers for channel formation efficient in terms of PAPR reduction, the signal may need to be clipped. In some embodiments, the transmitter 404, 504 may be configured to carry out peak windowing to limit the time-domain waveform, which can reduce PAPR and make digital combining for channel formation more efficient from the PAPR perspective for IEM systems, such as those described herein. In some embodiments, the sub-carriers may be combined for channel formation at a digital intermediate frequency (IF) domain or high frequency (HF) domain. In some embodiments, the clipping process, e.g., peak windowing, can be carried out after digital sub-carrier combining. In some embodiments, peak windowing may be carried out to achieve signal distortion by introducing self-interference. In some embodiments, to carry out peak windowing, the transmitter 404, 504 may multiply relatively large signal peaks with a specific window function, such as a Gaussian shaped window, a cosine window, a Kaiser window, a Hamming window, etc. In some embodiments, the signal is then multiplied with these windows, and the resulting spectrum will be a convolution of the original spectrum with the spectrum of the applied window.

In some embodiments, audio payload sub-carriers can comprise a plurality of bits mapped to a complex constellation of points for the sub-carrier. In some embodiments, the transmitter 404, 504 may carry out forward error correction using a block code, convolutional code, or the like to scramble the modulated sub-carriers. In some embodiments, this modulation by the transmitter 404, 504 may constrain the sequences of bits that are transmitted. In some embodiments, during demodulation of the audio payload sub-carrier then, the receiver 605 may reverse the bit scrambling using one or more pre-determined sets of scrambling sequences.

In order to facilitate data-aided time and frequency synchronization between the transmitter 404, 504 and the receiver 605, or vice versa in the case of a bidirectional system, a portion of the time domain can be allocated to synchronization. In some embodiments, these synchronization sub-carriers can be separated from audio payload sub-carriers in the time domain by guard intervals. In some embodiments, the synchronization sub-carriers can comprise uplink synchronization sub-carriers and/or downlink synchronization sub-carriers.

Figure 18:
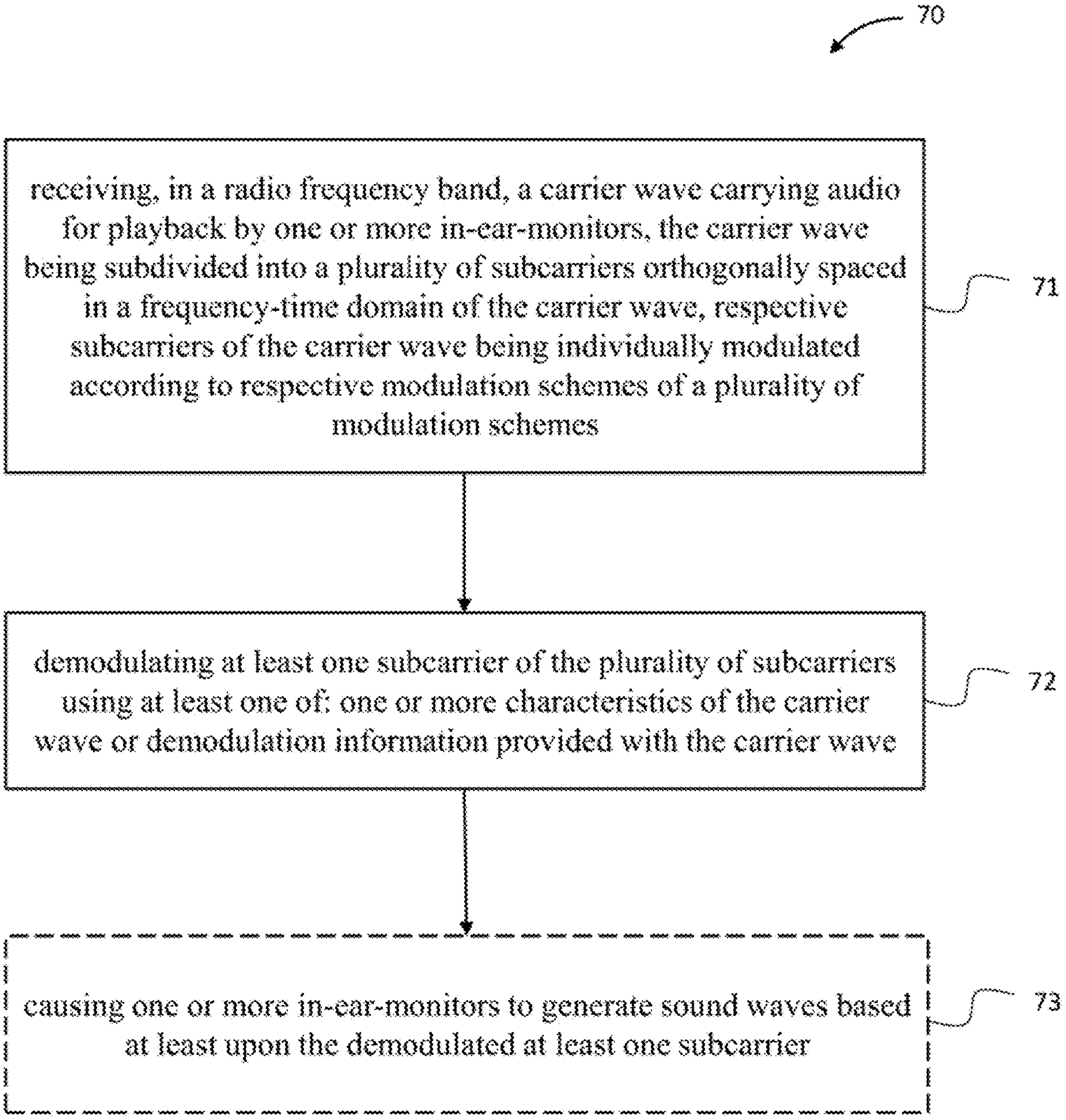
FIG. 18 illustrates a simplified block diagram of a method for facilitating low latency audio playback in an in-ear-monitoring system, according to an embodiment of the present disclosure.

Referring now to FIG. 18, a simplified block flow diagram illustrates an example method 70 that can be carried out by means, such as the receiver 105, the computing device 200, the external computing entity 300, the receiver 605, or an apparatus comprising a processor and a memory storing computer program instructions. In some embodiments, the method 70 can comprise receiving, in a radio frequency band, a carrier wave carrying audio for playback by one or more in-ear-monitors, the carrier wave being subdivided into a plurality of sub-carriers orthogonally spaced in a frequency-time domain of the carrier wave, respective sub-carriers of the carrier wave being individually modulated according to respective modulation schemes of a plurality of modulation schemes, at block 71. In some embodiments, the method 70 can further comprise demodulating at least one sub-carrier of the plurality of sub-carriers using at least one of: one or more characteristics of the carrier wave or demodulation information provided with the carrier wave, at block 72. In some embodiments, the method 70 can, optionally, further comprise causing one or more in-ear-monitors to generate sound waves based at least upon the demodulated at least one sub-carrier, at block 73. Some or all elements of the method 70 can be carried out or caused to be carried out by circuitry, such as the computing device 200, the external computing entity 300, or the like.

Figure 19:
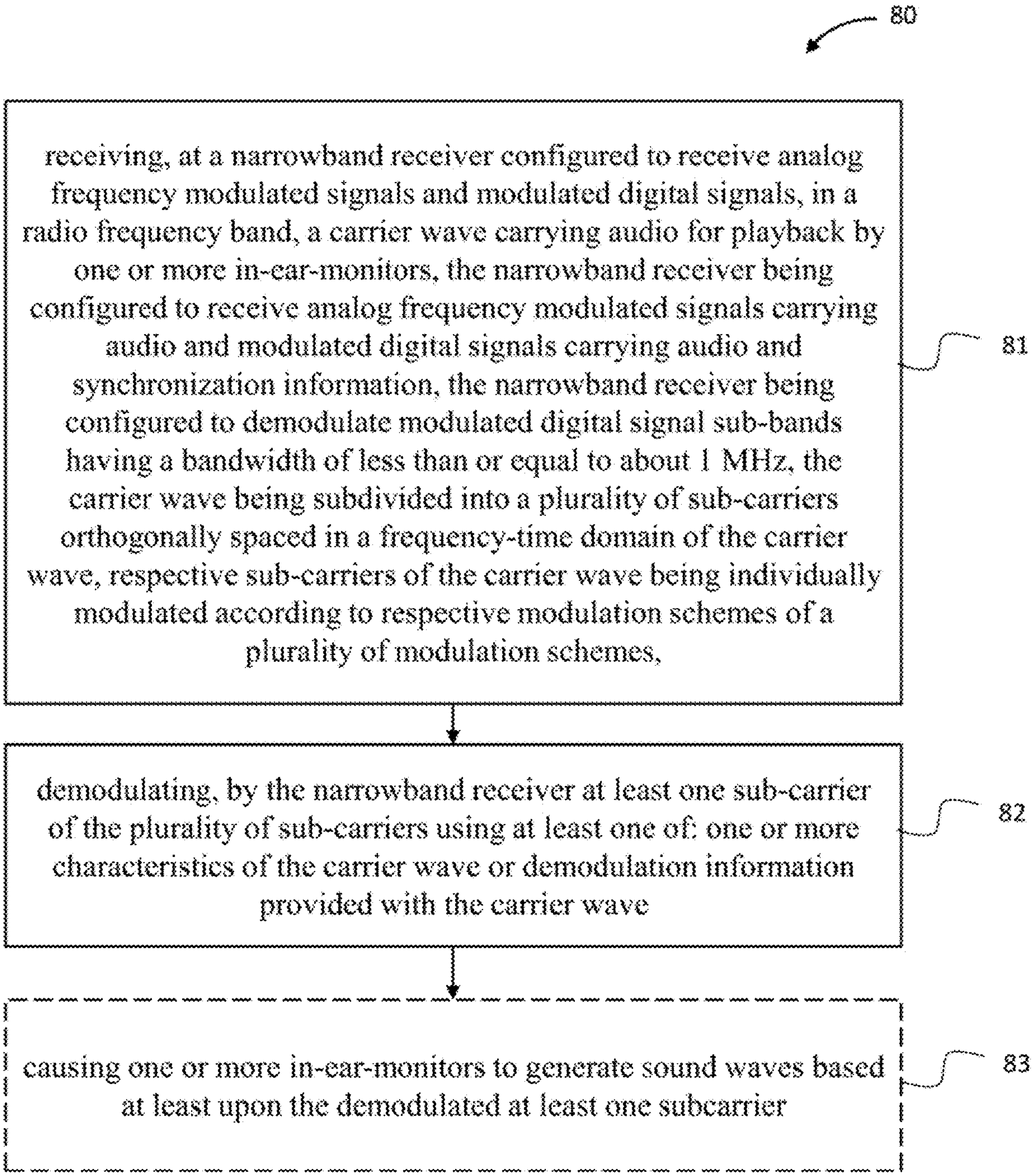
FIG. 19 illustrates a simplified block diagram of a method for facilitating low latency audio playback in an in-ear-monitoring system, according to an embodiment of the present disclosure.

Referring now to FIG. 19, a simplified block flow diagram illustrates an example method 80 that can be carried out by means, such as the receiver 105, the computing device 200, the external computing entity 300, the receiver 605, or an apparatus comprising a processor and a memory storing computer program instructions. In some embodiments, the method 80 can comprise receiving, at a narrowband receiver configured to receive analog frequency modulated signals and modulated digital signals, in a radio frequency band, a carrier wave carrying audio for playback by one or more in-ear-monitors, the narrowband receiver being configured to receive analog frequency modulated signals carrying audio and modulated digital signals carrying audio and synchronization information, the narrowband receiver being configured to demodulate modulated digital signal sub-bands having a bandwidth of less than or equal to about 1 MHz, the carrier wave being subdivided into a plurality of sub-carriers orthogonally spaced in a frequency-time domain of the carrier wave, respective sub-carriers of the carrier wave being individually modulated according to respective modulation schemes of a plurality of modulation schemes, at block 81. In some embodiments, the method 80 can further comprise demodulating, by the narrowband receiver at least one sub-carrier of the plurality of sub-carriers using at least one of: one or more characteristics of the carrier wave or demodulation information provided with the carrier wave, at block 82. In some embodiments, the method 80 can, optionally, further comprise causing one or more in-ear-monitors to generate sound waves based at least upon the demodulated at least one sub-carrier, at block 83. Some or all elements of the method 80 can be carried out or caused to be carried out by circuitry, such as the computing device 200, the external computing entity 300, or the like.

Figure 20:
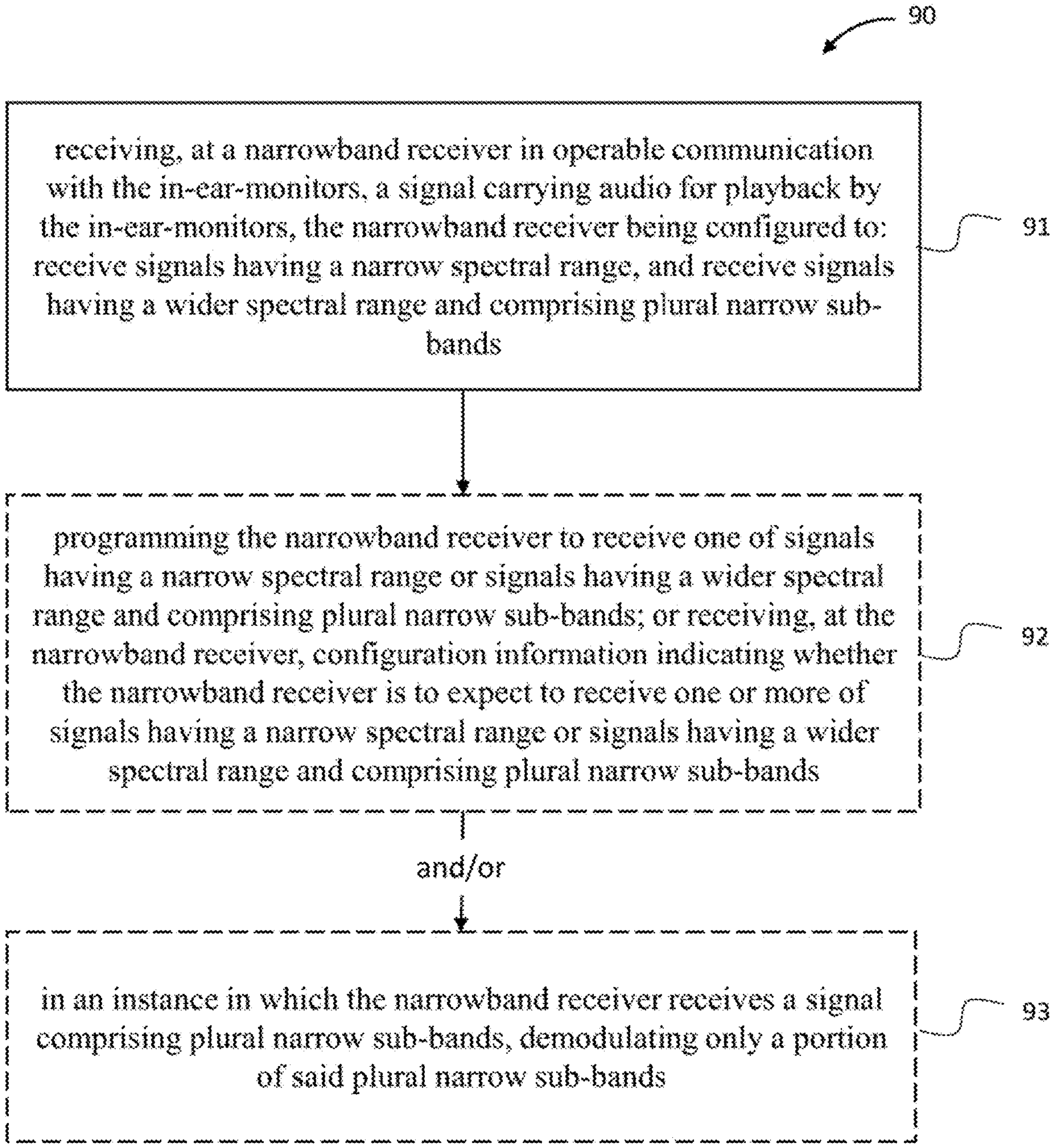
FIG. 20 illustrates a simplified block diagram of a method for facilitating low latency audio playback in an in-ear-monitoring system, according to an embodiment of the present disclosure.

Referring now to FIG. 20, a simplified block flow diagram illustrates an example method 90 that can be carried out by means, such as the receiver 105, the computing device 200, the external computing entity 300, the receiver 605, or an apparatus comprising a processor and a memory storing computer program instructions. In some embodiments, the method 90 can comprise receiving, at a narrowband receiver in operable communication with the in-ear-monitors, a signal carrying audio for playback by the in-ear-monitors, the narrowband receiver being configured to: receive signals having a narrow spectral range, such as a signal having only a single sub-band, and receive signals having a wider spectral range and comprising plural narrow sub-bands, at block 91. In some embodiments, the method 90 can, optionally, further comprise programming the narrowband receiver to receive one of signals having a narrow spectral range or signals having a wider spectral range and comprising plural narrow sub-bands; or receiving, at the narrowband receiver, configuration information indicating whether the narrowband receiver is to expect to receive one or more of signals having a narrow spectral range or signals having a wider spectral range and comprising plural narrow sub-bands, at block 92. In some embodiments, the method 90 can, optionally, alternatively or additionally comprise in an instance in which the narrowband receiver receives a signal comprising plural narrow sub-bands, demodulating only a portion of said plural narrow sub-bands, at block 93. Some or all elements of the method 90 can be carried out or caused to be carried out by circuitry, such as the computing device 200, the external computing entity 300, or the like.

Various embodiments illustrated herein disclose wireless audio monitoring systems, receivers, transmitters, and associated methods for achieving increased efficiency of spectrum use and bandwidth utilization that scales in proportion to the number of unique audio channels in the system. In some embodiments, a system can include one or more transmitters and one or more receivers configured to receive audio signals from the one or more transmitters. In some embodiments, the one or more receivers can be in communication with one or more in-ear-monitors (IEMs). The IEMs can be configured to be disposed about, within, or partially within an ear of a user and configured to generate audio waves based on information received form the receiver.

According to some embodiments, a transceiver, such as a transmitting transceiver (e.g., the transmitter 404, 504), can be provided that is configured to enable low latency audio playback by in-ear monitors positioned in an interferer laden environment. In some embodiments, a transmitter can be configured to transmit a signal, carrier wave, or the like towards one or more receivers. In some embodiments, the signal or carrier wave may be an ultra-high frequency signal in a narrow bandwidth of spectrum. In some embodiments, the carrier wave comprises a time domain and a frequency domain, or a time-frequency domain, that can be subdivided across the time domain and across the frequency domain. Receivers (e.g., the receiver 605) can be assigned one or more sub-carriers of the carrier wave across the time domain and/or the frequency domain. Sub-carriers in the time-frequency domain can be orthogonal such that content of each audio channel is collocated in a narrow bandwidth of spectrum with a signal so that it can be decoded using a narrowband receiver.

In some embodiments, the transmitter can be configured to co-locate audio channels in a narrow bandwidth of spectrum with a signal designated so that it can be decoded using a receiver, such as a narrowband receiver, without interference from adjacent signal energy. In some embodiments, the transmitter may be configured for mono-directional communication or bi-directional communication. In some embodiments, the transmitter may be configured for downlink communication with receiver(s) only. In some embodiments, the transmitter may be configured for downlink communication with receiver(s) and also configured for receiving communications, such as raw audio from a microphone or instrument, from receiver(s).

In some embodiments, the transmitter may receive audio information, such as analog audio signals, digital audio, an audio bitstream, audio packets, or the like. In some embodiments, the transmitter can be configured to receive raw audio from one or more microphones and/or one or more instruments and associated with one or more in-ear-monitor users. In some embodiments, the transmitter may comprise means, such as a processor, a memory storing computer program instructions, a digital-to-analog converter (DAC), a combining module, a modulator, an antenna, a digital signal processor, and/or the like. In some embodiments, the transmitter may be configured to transmit a carrier wave towards one or more receivers in an interferer laden environment. In some embodiments, the transmitter may be configured to associate one or more sub-carriers of the carrier wave to receivers in the interferer laden environment. In some embodiments, the transmitter may be configured to generate a user-customized audio mix based upon user preferences, such as a loudness of audio from the user's microphone and/or the user's instrument(s) relative to a loudness of audio from other microphone(s) and/or other instrument(s) in the interferer laden environment. Said otherwise, the user may prefer to hear only the audio from their own microphone and/or instrument(s) or may prefer to hear all captured audio, e.g., with a slight emphasis on the audio from their microphone and/or instrument(s).

The transmitter may receive user-customized audio or may generate the user-customized audio based upon raw audio from the various microphones and/or instruments in the interferer laden environment. In some embodiments, the transmitter may generate the user-customized audio based upon known and/or pre-set user preferences. The transmitter may therefore comprise an audio mixing system, such as a mixing board or the like. In some embodiments, the transmitter can be configured to generate user-customized audio that is specific for each in-ear-monitor of a pair of in-ear-monitors associated with (used by) the user. For example, a user may prefer to hear only their vocals, captured by the user's microphone, in a first ear, and a mixture of the user's instrumental audio, captured by a microphone positioned near the user's instrument or an audio pickup coupled to or integrated into the user's instrument, in a second ear. Continuing this example of a user preference for in-ear-monitor audio playback, the transmitter may transmit two streams of audio associated with the user's two in-ear-monitors. In some embodiments, the transmitter may transmit both streams of audio to a single receiver worn by the user and coupled to the user's two in-ear-monitors. In some embodiments, the user may need to wear a first receiver coupled to the first in-ear-monitor and a second receiver coupled to the second in-ear-monitor. In some embodiments, the transmitter may be configured to allocate a portion of the carrier wave to respective receivers associated with the respective in-ear-monitors such that each receiver can demodulate and playback the correct audio based upon the distinct sub-carrier allocation of each receiver.

In some embodiments, the transmitter may be configured to associate various portions (sub-carriers) of the carrier wave to different receivers worn by different users. In some embodiments, one or more sub-carriers may be allocated to, or associated with, a single receiver at any one point in a time domain and/or a frequency domain of the carrier wave. In some embodiments, the sub-carrier allocations may be known by the receivers and/or communicated with the carrier wave to the receivers. In some embodiments, the sub-carriers may be allocated orthogonally within the frequency and time domain in order to reduce sub-carrier spacing and improve spectral efficiency.

According to another embodiment, an apparatus is provided for facilitating multi-user audio monitoring. In some embodiments, the apparatus can comprise means, such as a processor and a memory storing computer program instructions, for causing the apparatus at least to subdivide a frequency-time domain of a carrier wave in a radio frequency band into a plurality of sub-carrier allocations associated with a plurality of in-ear-monitors, wherein respective sub-carrier allocations are orthogonal in the frequency-time domain to other sub-carrier allocations of the plurality of sub-carrier allocations. In some embodiments, the apparatus can further comprise means for causing the apparatus at least to modulate the plurality of sub-carrier allocations according to a plurality of modulation schemes such that respective sub-carrier allocations are individually modulated. In some embodiments, the apparatus can further comprise means for causing the apparatus at least to generate, based at least on the plurality of modulation schemes, demodulation information for demodulating the plurality of sub-carrier allocations of the frequency-domain spectrum. In some embodiments, the apparatus can further comprise means for causing the apparatus at least to cause transmission of the carrier wave, the carrier wave comprising the demodulation information.

In some embodiments, the apparatus can further comprise means, such as the processor and memory storing computer program instructions, for causing the apparatus at least to scramble the carrier wave using one or more of: block coding, block coding with error correction, selected mapping, convolutional encoding, selected list mapping, partial transmit sequence, interleaving, tone reservation, or tone injection.

In some embodiments, the apparatus can further comprise means, such as the processor and memory storing computer program instructions, for causing the apparatus at least to modulate the carrier wave using one or more of: inverse fast Fourier transform conversion, upsampling, peak windowing, envelope scaling, or clipping and filtering.

According to another embodiment, a method can be carried out, such as by an apparatus described herein, to facilitate multi-user audio monitoring. In some embodiments, the method can comprise subdividing a frequency-time domain of a carrier wave in a radio frequency band into a plurality of sub-carrier allocations associated with a plurality of in-ear-monitors, wherein respective sub-carrier allocations are orthogonal in the frequency-time domain to other sub-carrier allocations of the plurality of sub-carrier allocations. In some embodiments, the method can further comprise modulating the plurality of sub-carrier allocations according to a plurality of modulation schemes such that respective sub-carrier allocations are individually modulated. In some embodiments, the method can further comprise generating, based at least on the plurality of modulation schemes, demodulation information for demodulating the plurality of sub-carrier allocations of the frequency-domain spectrum. In some embodiments, the method can further comprise causing transmission of the carrier wave, the carrier wave comprising the demodulation information.

In some embodiments, the method can further comprise scrambling the carrier wave using one or more of: block coding, block coding with error correction, selected mapping, convolutional encoding, selected list mapping, partial transmit sequence, interleaving, tone reservation, or tone injection.

In some embodiments, the method can further comprise modulating the carrier wave using one or more of: inverse fast Fourier transform conversion, upsampling, peak windowing, envelope scaling, or clipping and filtering.

In some embodiments, the interferer laden environment may be a concert venue, a stadium, a recording studio, or the like. However, the described transmitter and the described receiver may be used in many other environments.

According to some embodiments, an audio managing device can be provided that is configured to enable low latency audio playback by in-ear monitors positioned in an interferer laden environment. In some embodiments, the audio monitoring device can comprise a transceiver, such as a receiving transceiver ("receiver"), configured to be in short-range wireless communication with one or more external transmitters, the receiver being configured to be in operable communication with in-ear-monitors. In some embodiments, the receiver is configured to receive, in a radio frequency band, a carrier wave carrying audio for playback by the in-ear-monitors, the carrier wave being subdivided into a plurality of sub-carriers orthogonally spaced in a frequency-time domain of the carrier wave, respective sub-carriers of the carrier wave being individually modulated according to respective modulation schemes of a plurality of modulation schemes. In some embodiments, the receiver is configured to demodulate at least one sub-carrier of the plurality of sub-carriers using at least one of: one or more characteristics of the carrier wave or demodulation information received with the carrier wave. In some embodiments, the one or more characteristics of the carrier wave comprises one or more cyclic prefixes operable to identify a first or last point of the carrier wave. In some embodiments, the one or more characteristics of the carrier wave comprise a framing bit, a time slot within a frame of the carrier wave, a syncword, a phase, a waveform shape, a frequency, or an amplitude. In some embodiments, the receiver is further configured to cause one or more in-ear-monitors to generate sound waves based at least upon the demodulated at least one sub-carrier. In some embodiments, an audio playback latency of the sound waves generated by the one or more in-ear-monitors is a difference between a capture time when original sound waves are captured by an audio capture device, the original sound waves being encoded within the at least one sub-carrier, and a playback time when the one or more in-ear-monitors are caused to generate the sound waves. In some embodiments, the audio playback latency is less than or equal to about 20 ms, about 19 ms, about 18 ms, about 17 ms, about 16 ms, about 15 ms, about 14 ms, about 13 ms, about 12 ms, about 11 ms, about 10 ms, about 9 ms, about 8 ms, about 7 ms, about 6 ms, or about 5 ms, inclusive of all values and ranges therebetween.

In some embodiments, the audio playback latency can comprise an air interface latency defined as the time between transmission of the carrier wave towards the receiver and playback of the audio by one or more associated in-ear-monitors or the like. In some embodiments, the air interface latency can be less than or equal to about 15 ms, about 14 ms, about 13 ms, about 12 ms, about 11 ms, about 10 ms, about 9 ms, about 8 ms, about 7 ms, about 6 ms, about 5 ms, about 4 ms, about 3 ms, about 2 ms, or about 1 ms, inclusive of all values and ranges therebetween.

In some embodiments, the carrier wave further comprises the demodulation information, the demodulation information being operable for demodulation of the plurality of sub-carriers. In some embodiments, the demodulation information comprises one or more pilots, pilot signals, pilot sub-carriers, or pilot frames at known positions in the frequency-time domain of the carrier wave, wherein said receiver is configured to determine waveform deformation based upon at least the one or more pilots, pilot signals, pilot sub-carriers, or pilot frames. In some embodiments, the demodulation information comprises one or more beacon frames carrying waveform shape information, beacon interval information, or a contention window value, wherein said receiver is configured to determine frequency distortion based upon at least the one or more beacon frames. In some embodiments, said demodulation that the receiver is configured to carry out on the at least one sub-carrier comprises at least one of: least squares (LS) based frequency domain pilot aided channel estimation, minimum mean square error (MMSE) based frequency domain pilot aided channel estimation, channel frequency response channel estimation, or parametric model-based channel estimation. In some embodiments, the receiver is configured to correct the carrier wave to compensate for one or more of: sampling clock offsets, imbalances due to mismatches between an in-phase signal path of the carrier wave and a quadrature signal path of the carrier wave, power fluctuations, phase noise, an integer-sub-carrier frequency offset, a fractional-sub-carrier frequency offset, or carrier frequency offset nonlinearities.

In some embodiments, the carrier wave received by the receiver is signal scrambled using one or more of: block coding, block coding with error correction, selected mapping, convolutional encoding, selected list mapping, partial transmit sequence, interleaving, tone reservation, or tone injection. In some embodiments, the carrier wave is modulated, before receipt by the receiver, using one or more of: inverse fast Fourier transform conversion, upsampling, peak windowing, envelope scaling, or clipping and filtering.

According to another embodiment, a method can be carried out by a device, such as those described herein, for enabling low latency audio playback by in-ear monitors positioned in an interferer laden environment. In some embodiments, the method comprises receiving, in a radio frequency band, a carrier wave carrying audio for playback by one or more in-ear-monitors, the carrier wave being subdivided into a plurality of sub-carriers orthogonally spaced in a frequency-time domain of the carrier wave, respective sub-carriers of the carrier wave being individually modulated according to respective modulation schemes of a plurality of modulation schemes. In some embodiments, the method can further comprise demodulating at least one sub-carrier of the plurality of sub-carriers using at least one of: one or more characteristics of the carrier wave or demodulation information provided with the carrier wave. In some embodiments, the one or more characteristics of the carrier wave comprises one or more cyclic prefixes operable to identify a first or last point of the carrier wave. In some embodiments, the one or more characteristics of the carrier wave comprise a framing bit, a time slot within a frame of the carrier wave, a syncword, a phase, a waveform shape, a frequency, or an amplitude.

In some embodiments, the method can further comprise causing one or more in-ear-monitors to generate sound waves based at least upon the demodulated at least one sub-carrier.

In some embodiments, an audio playback latency of the sound waves generated by the one or more in-ear-monitors is a difference between a capture time when original sound waves are captured by an audio capture device, the original sound waves being encoded within the at least one sub-carrier, and a playback time when the one or more in-ear-monitors are caused to generate the sound waves. In some embodiments, the audio playback latency is less than or equal to about 20 ms, about 19 ms, about 18 ms, about 17 ms, about 16 ms, about 15 ms, about 14 ms, about 13 ms, about 12 ms, about 11 ms, about 10 ms, about 9 ms, about 8 ms, about 7 ms, about 6 ms, or about 5 ms, inclusive of all values and ranges therebetween.

In some embodiments, the audio playback latency can comprise an air interface latency defined as the time between transmission of the carrier wave towards the receiver and playback of the audio by one or more associated in-ear-monitors or the like. In some embodiments, the air interface latency can be less than or equal to about 15 ms, about 14 ms, about 13 ms, about 12 ms, about 11 ms, about 10 ms, about 9 ms, about 8 ms, about 7 ms, about 6 ms, about 5 ms, about 4 ms, about 3 ms, about 2 ms, or about 1 ms, inclusive of all values and ranges therebetween.

In some embodiments, the carrier wave further comprises the demodulation information, the demodulation information being operable for demodulation of the plurality of sub-carriers. In some embodiments, the demodulation information comprises one or more pilots, pilot signals, pilot sub-carriers, or pilot frames at known positions in the frequency-time domain of the carrier wave, wherein said receiver is configured to determine waveform deformation based upon at least the one or more pilots, pilot signals, pilot sub-carriers, or pilot frames. In some embodiments, the demodulation information comprises one or more beacon frames carrying waveform shape information, beacon interval information, or a contention window value, wherein said receiver is configured to determine frequency distortion based upon at least the one or more beacon frames. In some embodiments, said demodulating comprises one or more of: least squares (LS) based frequency domain pilot aided channel estimation, minimum mean square error (MMSE) based frequency domain pilot aided channel estimation, channel frequency response channel estimation, or parametric model-based channel estimation.

According to some embodiments, an audio managing device can be provided that is configured to enable low latency audio playback by in-ear monitors positioned in an interferer laden environment. In some embodiments, the audio monitoring device comprises a narrowband receiver configured to be in short-range wireless communication with one or more external transmitters, the narrowband receiver being configured to be in operable communication with in-ear-monitors, wherein the narrowband receiver is configured to demodulate sub-bands having a bandwidth of less than or equal to about 1 MHz. In some embodiments, the narrowband receiver is configured to receive a frequency modulated analog signal comprising audio information, receive, in a radio frequency band, a carrier wave carrying audio for playback by the in-ear-monitors, the carrier wave being subdivided into a plurality of sub-carriers orthogonally spaced in a frequency-time domain of the carrier wave, respective sub-carriers of the carrier wave being individually modulated according respective modulation schemes of a plurality of modulation schemes, and demodulate at least one sub-carrier of the plurality of sub-carriers using at least one of: one or more characteristics of the carrier wave or demodulation information received with the carrier wave.

In some embodiments, the one or more characteristics of the carrier wave comprises one or more cyclic prefixes operable to identify a first or last point of the carrier wave. In some embodiments, the one or more characteristics of the carrier wave comprise a framing bit, a time slot within a frame of the carrier wave, a syncword, a phase, a waveform shape, a frequency, or an amplitude. In some embodiments, the narrowband receiver is further configured to cause one or more in-ear-monitors to generate sound waves based at least upon the demodulated at least one sub-carrier. In some embodiments, an audio playback latency of the sound waves generated by the one or more in-ear-monitors is a difference between a capture time when original sound waves are captured by an audio capture device, the original sound waves being encoded within the at least one sub-carrier, and a playback time when the one or more in-ear-monitors are caused to generate the sound waves. In some embodiments, the audio playback latency is less than or equal to about 15 ms, less than or equal to about 10 ms, or less than or equal to about 5 ms. In some embodiments, the carrier wave further comprises the demodulation information, the demodulation information being operable for demodulation of the plurality of sub-carriers. In some embodiments, the demodulation information comprises one or more pilot signals at known positions in the frequency-time domain of the carrier wave, wherein said narrowband receiver is configured to determine waveform deformation based upon at least the one or more pilot signals. In some embodiments, the demodulation information comprises one or more beacon frames carrying waveform shape information, beacon interval information, or a contention window value, wherein said narrowband receiver is configured to determine frequency distortion based upon at least the one or more beacon frames. In some embodiments, the demodulation that the narrowband receiver is configured to carry out on the at least one sub-carrier comprises at least one of: least squares (LS) based frequency domain pilot aided channel estimation, minimum mean square error (MMSE) based frequency domain pilot aided channel estimation, channel frequency response channel estimation, or parametric model-based channel estimation. In some embodiments, the narrowband receiver is configured to correct the carrier wave to compensate for one or more of: sampling clock offsets, imbalances due to mismatches between an in-phase signal path of the carrier wave and a quadrature signal path of the carrier wave, power fluctuations, phase noise, an integer-sub-carrier frequency offset, a fractional-sub-carrier frequency offset, or carrier frequency offset nonlinearities. In some embodiments, the carrier wave received by the narrowband receiver is signal scrambled using one or more of: block coding, block coding with error correction, selected mapping, convolutional encoding, selected list mapping, partial transmit sequence, interleaving, tone reservation, or tone injection. In some embodiments, the carrier wave is modulated, before receipt by the narrowband receiver, using one or more of: inverse fast Fourier transform conversion, upsampling, peak windowing, envelope scaling, or clipping and filtering.

According to another embodiment, a method can be carried out to facilitate or enable low latency audio playback by in-ear monitors positioned in an interferer laden environment. In some embodiments, the method can comprise receiving, at a narrowband receiver configured to receive analog frequency modulated signals and modulated digital signals, in a radio frequency band, a carrier wave carrying audio for playback by one or more in-ear-monitors, the narrowband receiver being configured to receive analog frequency modulated signals carrying audio and modulated digital signals carrying audio and synchronization information, the narrowband receiver being configured to demodulate modulated digital signal sub-bands having a bandwidth of less than or equal to about 1 MHz, the carrier wave being subdivided into a plurality of sub-carriers orthogonally spaced in a frequency-time domain of the carrier wave, respective sub-carriers of the carrier wave being individually modulated according to respective modulation schemes of a plurality of modulation schemes, and demodulating, by the narrowband receiver at least one sub-carrier of the plurality of sub-carriers using at least one of: one or more characteristics of the carrier wave or demodulation information provided with the carrier wave.

In some embodiments, the one or more characteristics of the carrier wave comprises one or more cyclic prefixes operable to identify a first or last point of the carrier wave. In some embodiments, the one or more characteristics of the carrier wave comprise a framing bit, a time slot within a frame of the carrier wave, a syncword, a phase, a waveform shape, a frequency, or an amplitude. In some embodiments, the method can further comprise causing one or more in-ear-monitors to generate sound waves based at least upon the demodulated at least one sub-carrier. In some embodiments, an audio playback latency of the sound waves generated by the one or more in-ear-monitors is a difference between a capture time when original sound waves are captured by an audio capture device, the original sound waves being encoded within the at least one sub-carrier, and a playback time when the one or more in-ear-monitors are caused to generate the sound waves. In some embodiments, the latency is less than or equal to about 15 ms, less than or equal to about 10 ms, or less than or equal to about 5 ms. In some embodiments, the carrier wave further comprises the demodulation information, the demodulation information being operable for demodulation of the plurality of sub-carriers. In some embodiments, the demodulation information comprises one or more pilot signals at known positions in the frequency-time domain of the carrier wave, wherein said receiver is configured to determine waveform deformation based upon at least the one or more pilot signals. In some embodiments, the demodulation information comprises one or more beacon frames carrying waveform shape information, beacon interval information, or a contention window value, wherein said receiver is configured to determine frequency distortion based upon at least the one or more beacon frames. In some embodiments, the demodulating comprises one or more of: least squares (LS) based frequency domain pilot aided channel estimation, minimum mean square error (MMSE) based frequency domain pilot aided channel estimation, channel frequency response channel estimation, or parametric model-based channel estimation.

According to another embodiment, an apparatus can be provided for multi-user audio monitoring. In some embodiments, the apparatus can comprise a processor and a memory storing computer program instructions. In some embodiments, the memory and the computer program instructions are configured to, along with the processor, cause the apparatus at least to subdivide a frequency-time domain of a carrier wave in a radio frequency band into a plurality of sub-carrier allocations associated with a plurality of in-ear-monitors, wherein respective sub-carrier allocations are orthogonal in the frequency-time domain to other sub-carrier allocations of the plurality of sub-carrier allocations, modulate the plurality of sub-carrier allocations according to a plurality of modulation schemes such that respective sub-carrier allocations are individually modulated, generate, based at least on the plurality of modulation schemes, demodulation information for demodulating the plurality of sub-carrier allocations of the frequency-domain spectrum, and cause transmission of the carrier wave towards one or more narrowband receivers, the carrier wave carrying the demodulation information and audio for the one or more narrowband receivers associated with one or more of the plurality of in-ear-monitors.

In some embodiments, the memory and the computer program instructions are configured to, along with the processor, cause the apparatus at least to scramble the carrier wave using one or more of: block coding, block coding with error correction, selected mapping, convolutional encoding, selected list mapping, partial transmit sequence, interleaving, tone reservation, or tone injection. In some embodiments, the memory and the computer program instructions are configured to, along with the processor, cause the apparatus at least to modulate the carrier wave using one or more of: inverse fast Fourier transform conversion, upsampling, peak windowing, envelope scaling, or clipping and filtering.

According to another embodiment, an audio managing device can be provided that is configured to enable low latency audio playback by in-ear-monitors positioned in an interferer laden environment. In some embodiments, the audio monitoring device may comprise: a narrowband receiver configured to: receive one or more of: digital signals having a narrow spectral range, analog signals having a narrow spectral range, digital signals having a wider spectral range and comprising plural narrow sub-bands, or analog signals having a wider spectral range and comprising plural narrow sub-bands. In some embodiments, the narrowband receiver may be configured to receive digital signals having a narrow spectral range, analog signals having a narrow spectral range, and digital signals having a wider spectral range and comprising plural narrow sub-bands. In some embodiments, the narrowband receiver may be configured to receive digital signals having a narrow spectral range, analog signals having a narrow spectral range, digital signals having a wider spectral range and comprising plural narrow sub-bands, and analog signals having a wider spectral range and comprising plural narrow sub-bands. In some embodiments, signals, whether occupying a narrow spectral range or a wider spectral range, whether digital or analog, may be received in parallel or in series, and may be stored, sampled, frequency demodulated, amplitude demodulated, offset corrected, phase shifted, descrambled, or otherwise processed by the narrowband receiver. In some embodiments, digital signals and analog signals may be processed in parallel or in series, by one or plural processing circuitry of the narrowband receiver. In some embodiments, the narrowband receiver may comprise processing circuitry configured to process modulated digital signals comprising sub-carriers positioned orthogonally in a frequency domain of the modulated digital signal. In some embodiments, the narrowband receiver may comprise processing circuitry configured to process or frequency demodulate analog signals, such as frequency modulated (FM) analog signals. In some embodiments, analog signals may comprise audio information. In some embodiments, modulated digital signals may comprise audio payload subcarriers and one or more of: demodulation information, synchronization information, or the like.

In some embodiments, the narrow spectral range is less than or equal to about 1 MHz, less than or equal to about 800 kHz, less than or equal to about 600 kHz, less than or equal to about 400 kHz, or less than or equal to about 200 kHz. In some embodiments, the wider spectral range is greater than or equal to about 600 kHz, greater than or equal to about 800 kHz, greater than or equal to about 1 MHz, greater than or equal to about 2 MHz, greater than or equal to about 3 MHz, greater than or equal to about 4 MHz, or greater than or equal to about 5 MHz. In some embodiments, the narrowband receiver is configured to be programmed during each instance of use for receiving one or more of the digital signals having a narrow spectral range, the analog signals having a narrow spectral range, the digital signals having a wider spectral range and comprising plural narrow sub-bands, or the analog signals having a wider spectral range and comprising plural narrow sub-bands. In some embodiments, the narrowband receiver is configured to receive configuration information indicating whether the narrowband receiver is to expect to receive one or more of the digital signals having a narrow spectral range, the analog signals having a narrow spectral range, the digital signals having a wider spectral range and comprising plural narrow sub-bands, or the analog signals having a wider spectral range and comprising plural narrow sub-bands. In some embodiments, the narrowband receiver is configured to, in an instance in which the narrowband receiver receives a digital signals comprising plural narrow sub-bands, demodulate only a portion of said plural narrow sub-bands. In some embodiments, the portion of said plural narrow sub-bands occupy a total spectral range of less than or equal to about 1 MHz, less than or equal to about 800 kHz, less than or equal to about 600 kHz, less than or equal to about 400 kHz, or less than or equal to about 200 kHz. In some embodiments, the portion of said plural narrow sub-bands are positioned orthogonally in a frequency domain of the digital signal. In some embodiments, the digital signal comprises demodulation information, and the narrowband receiver is configured to demodulate the portion of said plural narrow sub-bands using at least said demodulation information. In some embodiments, said demodulation information comprises one or more beacon signals or one or more pilot sub-carriers.

According to another embodiment, a method can be carried out for enabling low latency audio playback by in-ear monitors positioned in an interferer laden environment, the method comprising: receiving, at a narrowband receiver in operable communication with the in-ear-monitors, a signal carrying audio for playback by the in-ear-monitors. In some embodiments, the narrowband receiver is configured to receive one or more of: digital signals having a narrow spectral range, analog signals having a narrow spectral range, digital signals having a wider spectral range and comprising plural narrow sub-bands, or analog signals having a wider spectral range and comprising plural narrow sub-bands. In some embodiments, the narrowband receiver may be configured to receive digital signals having a narrow spectral range, analog signals having a narrow spectral range, and digital signals having a wider spectral range and comprising plural narrow sub-bands. In some embodiments, the narrowband receiver may be configured to receive digital signals having a narrow spectral range, analog signals having a narrow spectral range, digital signals having a wider spectral range and comprising plural narrow sub-bands, and analog signals having a wider spectral range and comprising plural narrow sub-bands. In some embodiments, signals, whether occupying a narrow spectral range or a wider spectral range, whether digital or analog, may be received in parallel or in series, and may be stored, sampled, frequency demodulated, amplitude demodulated, offset corrected, phase shifted, descrambled, or otherwise processed by the narrowband receiver. In some embodiments, digital signals and analog signals may be processed in parallel or in series, by one or plural processing circuitry of the narrowband receiver. In some embodiments, the narrowband receiver may comprise processing circuitry configured to process modulated digital signals comprising sub-carriers positioned orthogonally in a frequency domain of the modulated digital signal. In some embodiments, the narrowband receiver may comprise processing circuitry configured to process or frequency demodulate analog signals, such as frequency modulated (FM) analog signals. In some embodiments, analog signals may comprise audio information. In some embodiments, modulated digital signals may comprise audio payload subcarriers and one or more of: demodulation information, synchronization information, or the like.

In some embodiments, the narrow spectral range is less than or equal to about 1 MHz, less than or equal to about 800 kHz, less than or equal to about 600 kHz, less than or equal to about 400 kHz, or less than or equal to about 200 kHz. In some embodiments, the wider spectral range is greater than or equal to about 600 kHz, greater than or equal to about 800 kHz, greater than or equal to about 1 MHz, greater than or equal to about 2 MHz, greater than or equal to about 3 MHz, greater than or equal to about 4 MHz, or greater than or equal to about 5 MHz. In some embodiments, the method can further comprise programming the narrowband receiver to receive one or more of the digital signals having a narrow spectral range, the analog signals having a narrow spectral range, the digital signals having a wider spectral range and comprising plural narrow sub-bands, or the analog signals having a wider spectral range and comprising plural narrow sub-bands. In some embodiments, the method can further comprise receiving, at the narrowband receiver, configuration information indicating whether the narrowband receiver is to expect to receive one or more of the digital signals having a narrow spectral range, the analog signals having a narrow spectral range, the digital signals having a wider spectral range and comprising plural narrow sub-bands, or the analog signals having a wider spectral range and comprising plural narrow sub-bands. In some embodiments, the method can further comprise, in an instance in which the narrowband receiver receives a digital signals comprising plural narrow sub-bands, demodulating only a portion of said plural narrow sub-bands. In some embodiments, the portion of said plural narrow sub-bands occupy a total spectral range of less than or equal to about 1 MHz, less than or equal to about 800 kHz, less than or equal to about 600 kHz, less than or equal to about 400 kHz, or less than or equal to about 200 kHz. In some embodiments, the portion of said plural narrow sub-bands are positioned orthogonally in a frequency domain of the digital signal. In some embodiments, the digital signal comprises demodulation information. In some embodiments, said method can further comprise: demodulating, using the narrowband receiver, the portion of said plural narrow sub-bands using at least said demodulation information. In some embodiments, said demodulation information comprises one or more beacon signals or one or more pilot sub-carriers.

According to another embodiment, an audio managing device can be provided that is configured to enable low latency audio playback by in-ear monitors positioned in an interferer laden environment. In some embodiments, the audio monitoring device may comprise: a narrowband receiver configured to be in short-range wireless communication with one or more external transmitters, the narrowband receiver being configured to be in operable communication with in-ear-monitors, wherein the narrowband receiver is configured to demodulate sub-bands having an aggregate bandwidth of less than or equal to about 1 MHz, and wherein the narrowband receiver is configured to: receive, in a radio frequency band, a carrier wave carrying audio for playback by the in-ear-monitors, the carrier wave being subdivided into a plurality of sub-carriers orthogonally spaced in a frequency-time domain of the carrier wave, respective sub-carriers of the carrier wave being individually modulated according respective modulation schemes of a plurality of modulation schemes, and demodulate at least one sub-carrier of the plurality of sub-carriers using at least one of: one or more characteristics of the carrier wave or demodulation information received with the carrier wave.

In some embodiments, the narrowband receiver is further configured to receive a frequency modulated analog signal comprising audio information. In some embodiments, the one or more characteristics of the carrier wave comprises one or more cyclic prefixes operable to identify a first or last point of the carrier wave. In some embodiments, the one or more characteristics of the carrier wave comprise a framing bit, a time slot within a frame of the carrier wave, a syncword, a phase, a waveform shape, a frequency, or an amplitude. In some embodiments, the narrowband receiver is further configured to cause one or more in-ear-monitors to generate sound waves based at least upon the demodulated at least one sub-carrier. In some embodiments, an audio playback latency of the sound waves generated by the one or more in-ear-monitors is a difference between a capture time when original sound waves are captured by an audio capture device, the original sound waves being encoded within the at least one sub-carrier, and a playback time when the one or more in-ear-monitors are caused to generate the sound waves. In some embodiments, the audio playback latency is less than or equal to about 15 ms, less than or equal to about 10 ms, or less than or equal to about 5 ms. In some embodiments, the carrier wave further comprises the demodulation information, the demodulation information being operable for demodulation of the plurality of sub-carriers. In some embodiments, the demodulation information comprises one or more pilot signals at known positions in the frequency-time domain of the carrier wave, wherein said narrowband receiver is configured to determine waveform deformation based upon at least the one or more pilot signals. In some embodiments, the demodulation information comprises one or more beacon frames carrying waveform shape information, beacon interval information, or a contention window value, wherein said narrowband receiver is configured to determine frequency distortion based upon at least the one or more beacon frames. In some embodiments, the demodulation that the narrowband receiver is configured to carry out on the at least one sub-carrier comprises at least one of: least squares (LS) based frequency domain pilot aided channel estimation, minimum mean square error (MMSE) based frequency domain pilot aided channel estimation, channel frequency response channel estimation, or parametric model-based channel estimation. In some embodiments, the narrowband receiver is configured to correct the carrier wave to compensate for one or more of: sampling clock offsets, imbalances due to mismatches between an in-phase signal path of the carrier wave and a quadrature signal path of the carrier wave, power fluctuations, phase noise, an integer-sub-carrier frequency offset, a fractional-sub-carrier frequency offset, or carrier frequency offset nonlinearities. In some embodiments, the carrier wave received by the narrowband receiver is signal scrambled using one or more of: block coding, block coding with error correction, selected mapping, convolutional encoding, selected list mapping, partial transmit sequence, interleaving, tone reservation, or tone injection. In some embodiments, the carrier wave is modulated, before receipt by the narrowband receiver, using one or more of: inverse fast Fourier transform conversion, upsampling, peak windowing, envelope scaling, or clipping and filtering.

According to another embodiment, a method can be carried out for enabling low latency audio playback by in-ear monitors positioned in an interferer laden environment. In some embodiments, the method may comprise: receiving, at a narrowband receiver, in a radio frequency band, a carrier wave carrying audio for playback by one or more in-ear-monitors, the narrowband receiver being configured to demodulate modulated digital signal sub-bands having an aggregate bandwidth of less than or equal to about 1 MHz, the carrier wave being subdivided into a plurality of sub-carriers orthogonally spaced in a frequency-time domain of the carrier wave, respective sub-carriers of the carrier wave being individually modulated according to respective modulation schemes of a plurality of modulation schemes, and demodulating, by the narrowband receiver at least one sub-carrier of the plurality of sub-carriers using at least one of: one or more characteristics of the carrier wave or demodulation information provided with the carrier wave.

In some embodiments, the narrowband receiver is configured to receive analog frequency modulated signals and further configured to receive modulated digital signals. In some embodiments, the one or more characteristics of the carrier wave comprises one or more cyclic prefixes operable to identify a first or last point of the carrier wave. In some embodiments, the one or more characteristics of the carrier wave comprise a framing bit, a time slot within a frame of the carrier wave, a syncword, a phase, a waveform shape, a frequency, or an amplitude. In some embodiments, the method may further comprise: causing one or more in-ear-monitors to generate sound waves based at least upon the demodulated at least one sub-carrier. In some embodiments, an audio playback latency of the sound waves generated by the one or more in-ear-monitors is a difference between a capture time when original sound waves are captured by an audio capture device, the original sound waves being encoded within the at least one sub-carrier, and a playback time when the one or more in-ear-monitors are caused to generate the sound waves. In some embodiments, the latency is less than or equal to about 15 ms, less than or equal to about 10 ms, or less than or equal to about 5 ms. In some embodiments, the carrier wave further comprises the demodulation information, the demodulation information being operable for demodulation of the plurality of sub-carriers. In some embodiments, the demodulation information comprises one or more pilot signals at known positions in the frequency-time domain of the carrier wave, wherein said receiver is configured to determine waveform deformation based upon at least the one or more pilot signals. In some embodiments, the demodulation information comprises one or more beacon frames carrying waveform shape information, beacon interval information, or a contention window value, wherein said receiver is configured to determine frequency distortion based upon at least the one or more beacon frames. In some embodiments, the demodulating comprises one or more of: least squares (LS) based frequency domain pilot aided channel estimation, minimum mean square error (MMSE) based frequency domain pilot aided channel estimation, channel frequency response channel estimation, or parametric model-based channel estimation.

According to another embodiment, an apparatus can be provided for multi-user audio monitoring, the apparatus comprising: a processor; and a memory storing computer program instructions. In some embodiments, the memory and the computer program instructions are configured to, along with the processor, cause the apparatus at least to: subdivide a frequency-time domain of a carrier wave in a radio frequency band into a plurality of sub-carrier allocations associated with a plurality of in-ear-monitors, wherein respective sub-carrier allocations are orthogonal in the frequency-time domain to other sub-carrier allocations of the plurality of sub-carrier allocations, modulate the plurality of sub-carrier allocations according to a plurality of modulation schemes such that respective sub-carrier allocations are individually modulated, generate, based at least on the plurality of modulation schemes, demodulation information for demodulating the plurality of sub-carrier allocations of the frequency-domain spectrum, and cause transmission of the carrier wave towards one or more narrowband receivers, the carrier wave carrying the demodulation information and audio for the one or more narrowband receivers associated with one or more of the plurality of in-ear-monitors.

In some embodiments, the memory and the computer program instructions are configured to, along with the processor, cause the apparatus at least to: scramble the carrier wave using one or more of: block coding, block coding with error correction, selected mapping, convolutional encoding, selected list mapping, partial transmit sequence, interleaving, tone reservation, or tone injection. In some embodiments, the memory and the computer program instructions are configured to, along with the processor, cause the apparatus at least to: modulate the carrier wave using one or more of: inverse fast Fourier transform conversion, upsampling, peak windowing, envelope scaling, or clipping and filtering.

Hereinafter, various characteristics will be highlighted in a set of numbered clauses or paragraphs. These characteristics are not to be interpreted as being limiting on the invention or inventive concept, but are provided merely as a highlighting of some characteristics as described herein, without suggesting a particular order of importance or relevancy of such characteristics.

Clause 1. An audio managing device configured to enable low latency audio playback by in-ear monitors positioned in an interferer laden environment, the audio monitoring device comprising: a receiver configured to be in short-range wireless communication with one or more external transmitters, the receiver being configured to be in operable communication with in-ear-monitors, wherein the receiver is configured to: receive, in a radio frequency band, a carrier wave carrying audio for playback by the in-ear-monitors, the carrier wave being subdivided into a plurality of sub-carriers orthogonally spaced in a frequency-time domain of the carrier wave, respective sub-carriers of the carrier wave being individually modulated according respective modulation schemes of a plurality of modulation schemes, and demodulate at least one sub-carrier of the plurality of sub-carriers using at least one of: one or more characteristics of the carrier wave or demodulation information received with the carrier wave.

Clause 2. The device of clause 1, wherein the receiver comprises a narrowband receiver configured to demodulate sub-bands having an aggregate bandwidth of less than or equal to about 1 MHz.

Clause 3. The device of clause 2, wherein the narrowband receiver is configured to receive and demodulate a single narrowband signal carrying the audio for playback by the in-ear-monitors.

Clause 4. The device of any one of clauses 1-3, wherein the receiver is further configured to receive a frequency modulated analog signal comprising audio information.

Clause 5. The device of any one of clauses 1-4, wherein the one or more characteristics of the carrier wave comprises one or more cyclic prefixes operable to identify a first or last point of the carrier wave.

Clause 6. The device of any one of clauses 1-5, wherein the one or more characteristics of the carrier wave comprise a framing bit, a time slot within a frame of the carrier wave, a syncword, a phase, a waveform shape, a frequency, or an amplitude.

Clause 7. The device of any one of clauses 1-6, wherein the receiver is further configured to cause one or more in-ear-monitors to generate sound waves based at least upon the demodulated at least one sub-carrier.

Clause 8. The device of clause 7, wherein an audio playback latency of the sound waves generated by the one or more in-ear-monitors is a difference between a capture time when original sound waves are captured by an audio capture device, the original sound waves being encoded within the at least one sub-carrier, and a playback time when the one or more in-ear-monitors are caused to generate the sound waves.

Clause 9. The device of clause 8, wherein the audio playback latency is less than or equal to about 15 ms, less than or equal to about 10 ms, or less than or equal to about 5 ms.

Clause 10. The device of any one of clauses 1-9, wherein the carrier wave further comprises the demodulation information, the demodulation information being operable for demodulation of the plurality of sub-carriers.

Clause 11. The device of any one of clauses 1-10, wherein the demodulation information comprises one or more pilot signals at known positions in the frequency-time domain of the carrier wave, wherein said receiver is configured to determine waveform deformation based upon at least the one or more pilot signals.

Clause 12. The device of any one of clauses 1-11, wherein the demodulation information comprises one or more beacon frames carrying waveform shape information, beacon interval information, or a contention window value, wherein said receiver is configured to determine frequency distortion based upon at least the one or more beacon frames.

Clause 13. The device of any of clauses 1-12, wherein the demodulation that the receiver is configured to carry out on the at least one sub-carrier comprises at least one of: least squares (LS) based frequency domain pilot aided channel estimation, minimum mean square error (MMSE) based frequency domain pilot aided channel estimation, channel frequency response channel estimation, or parametric model-based channel estimation.

Clause 14. The device of any one of clauses 1-13, wherein the receiver is configured to correct the carrier wave to compensate for one or more of: sampling clock offsets, imbalances due to mismatches between an in-phase signal path of the carrier wave and a quadrature signal path of the carrier wave, power fluctuations, phase noise, an integer-sub-carrier frequency offset, a fractional-sub-carrier frequency offset, or carrier frequency offset nonlinearities.

Clause 15. The device of any one of clauses 1-14, wherein the carrier wave received by the receiver is signal scrambled using one or more of: block coding, block coding with error correction, selected mapping, convolutional encoding, selected list mapping, partial transmit sequence, interleaving, tone reservation, or tone injection.

Clause 16. The device of any one of clauses 1-15, wherein the carrier wave is modulated, before receipt by the receiver, using one or more of: inverse fast Fourier transform conversion, upsampling, peak windowing, envelope scaling, or clipping and filtering.

Clause 17. An audio managing device configured to enable low latency audio playback by in-ear monitors positioned in an interferer laden environment, the audio monitoring device comprising: means for receiving, in a radio frequency band, a carrier wave carrying audio for playback by in-ear-monitors, the carrier wave being subdivided into a plurality of sub-carriers orthogonally spaced in a frequency-time domain of the carrier wave, respective sub-carriers of the carrier wave being individually modulated according respective modulation schemes of a plurality of modulation schemes; and means for demodulating at least one sub-carrier of the plurality of sub-carriers using at least one of: one or more characteristics of the carrier wave or demodulation information received with the carrier wave.

Clause 18. The device of clause 17, further comprising: means for demodulating sub-bands having an aggregate bandwidth of less than or equal to about 1 MHz.

Clause 19. The device of clause 18, further comprising: means for receiving a single narrowband signal carrying the audio for playback by the in-ear-monitors.

Clause 20. The device of clause 18 or 19, further comprising: means for demodulating a single narrowband signal carrying the audio for playback by the in-ear-monitors.

Clause 21. The device of any one of clauses 17-20, further comprising: means for receiving a frequency modulated analog signal comprising audio information.

Clause 22. The device of any one of clauses 17-21, wherein the one or more characteristics of the carrier wave comprises one or more cyclic prefixes operable to identify a first or last point of the carrier wave.

Clause 23. The device of any one of clauses 17-22, wherein the one or more characteristics of the carrier wave comprise a framing bit, a time slot within a frame of the carrier wave, a syncword, a phase, a waveform shape, a frequency, or an amplitude.

Clause 24. The device of any one of clauses 17-23, further comprising: means for causing one or more in-ear-monitors to generate sound waves based at least upon the demodulated at least one sub-carrier.

Clause 25. The device of clause 24, wherein an audio playback latency of the sound waves generated by the one or more in-ear-monitors is a difference between a capture time when original sound waves are captured by an audio capture device, the original sound waves being encoded within the at least one sub-carrier, and a playback time when the one or more in-ear-monitors are caused to generate the sound waves.

Clause 26. The device of clause 25, wherein the audio playback latency is less than or equal to about 15 ms, less than or equal to about 10 ms, or less than or equal to about 5 ms.

Clause 27. The device of any one of clauses 17-26, wherein the carrier wave further comprises the demodulation information, the demodulation information being operable for demodulation of the plurality of sub-carriers.

Clause 28. The device of any one of clauses 17-27, wherein the demodulation information comprises one or more pilot signals at known positions in the frequency-time domain of the carrier wave, wherein said receiver is configured to determine waveform deformation based upon at least the one or more pilot signals.

Clause 29. The device of any one of clauses 17-28, wherein the demodulation information comprises one or more beacon frames carrying waveform shape information, beacon interval information, or a contention window value, wherein said receiver is configured to determine frequency distortion based upon at least the one or more beacon frames.

Clause 30. The device of any of clauses 17-29, further comprising: means for demodulating the at least one sub-carrier by at least one of: least squares (LS) based frequency domain pilot aided channel estimation, minimum mean square error (MMSE) based frequency domain pilot aided channel estimation, channel frequency response channel estimation, or parametric model-based channel estimation.

Clause 31. The device of any one of clauses 17-30, further comprising: means for correcting the carrier wave to compensate for one or more of: sampling clock offsets, imbalances due to mismatches between an in-phase signal path of the carrier wave and a quadrature signal path of the carrier wave, power fluctuations, phase noise, an integer-sub-carrier frequency offset, a fractional-sub-carrier frequency offset, or carrier frequency offset nonlinearities.

Clause 32. The device of any one of clauses 17-31, wherein the carrier wave is signal scrambled using one or more of: block coding, block coding with error correction, selected mapping, convolutional encoding, selected list mapping, partial transmit sequence, interleaving, tone reservation, or tone injection.

Clause 33. The device of any one of clauses 17-32, wherein the carrier wave is modulated, before receipt by the device, using one or more of: inverse fast Fourier transform conversion, upsampling, peak windowing, envelope scaling, or clipping and filtering.

Clause 34. A method for enabling low latency audio playback by in-ear monitors positioned in an interferer laden environment, the method comprising: receiving, at a receiver, in a radio frequency band, a carrier wave carrying audio for playback by one or more in-ear-monitors, the carrier wave being subdivided into a plurality of sub-carriers orthogonally spaced in a frequency-time domain of the carrier wave, respective sub-carriers of the carrier wave being individually modulated according to respective modulation schemes of a plurality of modulation schemes; and demodulating, by the receiver, at least one sub-carrier of the plurality of sub-carriers using at least one of: one or more characteristics of the carrier wave or demodulation information provided with the carrier wave.

Clause 35. The method of clause 34, wherein the receiver comprises a narrowband receiver configured to demodulate sub-bands having an aggregate bandwidth of less than or equal to about 1 MHz.

Clause 36. The method of any one of clauses 34 or 35, wherein the receiver is configured to receive analog frequency modulated signals and further configured to receive modulated digital signals.

Clause 37. The method of any one of clauses 34-36, wherein the one or more characteristics of the carrier wave comprises one or more cyclic prefixes operable to identify a first or last point of the carrier wave.

Clause 38. The method of any one of clauses 34-37, wherein the one or more characteristics of the carrier wave comprise a framing bit, a time slot within a frame of the carrier wave, a syncword, a phase, a waveform shape, a frequency, or an amplitude.

Clause 39. The method of any one of clauses 34-38, further comprising: causing one or more in-ear-monitors to generate sound waves based at least upon the demodulated at least one sub-carrier.

Clause 40. The method of clause 39, wherein an audio playback latency of the sound waves generated by the one or more in-ear-monitors is a difference between a capture time when original sound waves are captured by an audio capture device, the original sound waves being encoded within the at least one sub-carrier, and a playback time when the one or more in-ear-monitors are caused to generate the sound waves.

Clause 41. The method of clause 40, wherein the latency is less than or equal to about 15 ms, less than or equal to about 10 ms, or less than or equal to about 5 ms.

Clause 42. The method of any one of clauses 34-41, wherein the carrier wave further comprises the demodulation information, the demodulation information being operable for demodulation of the plurality of sub-carriers.

Clause 43. The method of any one of clauses 34-42, wherein the demodulation information comprises one or more pilot signals at known positions in the frequency-time domain of the carrier wave, wherein said receiver is configured to determine waveform deformation based upon at least the one or more pilot signals.

Clause 44. The method of any one of clauses 34-43, wherein the demodulation information comprises one or more beacon frames carrying waveform shape information, beacon interval information, or a contention window value, wherein said receiver is configured to determine frequency distortion based upon at least the one or more beacon frames.

Clause 45. The method of any one of clauses 34-44, wherein the demodulating comprises one or more of: least squares (LS) based frequency domain pilot aided channel estimation, minimum mean square error (MMSE) based frequency domain pilot aided channel estimation, channel frequency response channel estimation, or parametric model-based channel estimation.

Clause 46. An apparatus for multi-user audio monitoring, the apparatus comprising: a processor; and a memory storing computer program instructions, wherein the memory and the computer program instructions are configured to, along with the processor, cause the apparatus at least to: subdivide a frequency-time domain of a carrier wave in a radio frequency band into a plurality of sub-carrier allocations associated with a plurality of in-ear-monitors, wherein respective sub-carrier allocations are orthogonal in the frequency-time domain to other sub-carrier allocations of the plurality of sub-carrier allocations, modulate the plurality of sub-carrier allocations according to a plurality of modulation schemes such that respective sub-carrier allocations are individually modulated, generate, based at least on the plurality of modulation schemes, demodulation information for demodulating the plurality of sub-carrier allocations of the frequency-domain spectrum, and cause transmission of the carrier wave towards one or more receivers, the carrier wave carrying the demodulation information and audio for the one or more receivers associated with one or more of the plurality of in-ear-monitors.

Clause 47. The apparatus of clause 46, wherein the memory and the computer program instructions are configured to, along with the processor, cause the apparatus at least to: scramble the carrier wave using one or more of: block coding, block coding with error correction, selected mapping, convolutional encoding, selected list mapping, partial transmit sequence, interleaving, tone reservation, or tone injection.

Clause 48. The apparatus of any one of clauses 46-47, wherein the memory and the computer program instructions are configured to, along with the processor, cause the apparatus at least to: modulate the carrier wave using one or more of: inverse fast Fourier transform conversion, upsampling, peak windowing, envelope scaling, or clipping and filtering.

Clause 49. An apparatus for multi-user audio monitoring, the apparatus comprising: means for subdividing a frequency-time domain of a carrier wave in a radio frequency band into a plurality of sub-carrier allocations associated with a plurality of in-ear-monitors, wherein respective sub-carrier allocations are orthogonal in the frequency-time domain to other sub-carrier allocations of the plurality of sub-carrier allocations; means for modulating the plurality of sub-carrier allocations according to a plurality of modulation schemes such that respective sub-carrier allocations are individually modulated; means for generating, based at least on the plurality of modulation schemes, demodulation information for demodulating the plurality of sub-carrier allocations of the frequency-domain spectrum; and means for causing transmission of the carrier wave towards one or more receivers, the carrier wave carrying the demodulation information and audio for the one or more receivers associated with one or more of the plurality of in-ear-monitors.

Clause 50. The apparatus of clause 49, further comprising: means for scrambling the carrier wave using one or more of: block coding, block coding with error correction, selected mapping, convolutional encoding, selected list mapping, partial transmit sequence, interleaving, tone reservation, or tone injection.

Clause 51. The apparatus of any one of clauses 49-50, further comprising: means for modulating the carrier wave using one or more of: inverse fast Fourier transform conversion, upsampling, peak windowing, envelope scaling, or clipping and filtering.

Clause 52. An audio monitoring device configured to enable low latency audio playback by in-ear-monitors positioned in an interferer laden environment, the audio monitoring device comprising: a narrowband receiver configured to: receive signals having a narrow spectral range; and receive signals having a wider spectral range and comprising plural narrow sub-bands.

Clause 53. The audio monitoring device of clause 52, wherein the narrow spectral range is less than or equal to about 1 MHz, less than or equal to about 800 kHz, less than or equal to about 600 kHz, less than or equal to about 400 kHz, or less than or equal to about 200 kHz.

Clause 54. The audio monitoring device of clause 53, wherein the wider spectral range is greater than or equal to about 600 kHz, greater than or equal to about 800 kHz, greater than or equal to about 1 MHz, greater than or equal to about 2 MHz, greater than or equal to about 3 MHz, greater than or equal to about 4 MHz, or greater than or equal to about 5 MHz.

Clause 55. The audio monitoring device of any one of clauses 52-54, wherein the narrowband receiver is configured to be programmed during each instance of use for receiving one of signals having a narrow spectral range or signals having a wider spectral range and comprising plural narrow sub-bands.

Clause 56. The audio monitoring device of any one of clauses 52-55, wherein the narrowband receiver is configured to receive configuration information indicating the narrowband receiver is to expect to receive one of signals having a narrow spectral range or signals having a wider spectral range and comprising plural narrow sub-bands.

Clause 57. The audio monitoring device of any one of clauses 52-56, wherein the narrowband receiver is configured to, in an instance in which the narrowband receiver receives a signal comprising plural narrow sub-bands, demodulate only a portion of said plural narrow sub-bands.

Clause 58. The audio monitoring device of clause 57, wherein the portion of said plural narrow sub-bands occupy a total spectral range of less than or equal to about 1 MHz, less than or equal to about 800 kHz, less than or equal to about 600 kHz, less than or equal to about 400 kHz, or less than or equal to about 200 kHz.

Clause 59. The audio monitoring device of clause 57, wherein the portion of said plural narrow sub-bands are positioned orthogonally in a frequency domain of the signal.

Clause 60. The audio monitoring device of clause 59, wherein the signal comprises demodulation information, and the narrowband receiver is configured to demodulate the portion of said plural narrow sub-bands using at least said demodulation information.

Clause 61. The audio monitoring device of clause 60, wherein said demodulation information comprises one or more beacon signals or one or more pilot sub-carriers.

Clause 62. The audio monitoring device of any one of clauses 52-61, wherein the signals having a narrow spectral range are digital signals and the signals having a wider spectral range and comprising plural narrow sub-bands are digital signals.

Clause 63. The audio monitoring device of any one of clauses 52-62, wherein the signals having a narrow spectral range are analog signals and the signals having a wider spectral range and comprising plural narrow sub-bands are digital signals.

Clause 64. An audio monitoring device configured to enable low latency audio playback by in-ear-monitors positioned in an interferer laden environment, the audio monitoring device comprising: a narrowband receiver configured to: receive signals having a narrow spectral range; and receive signals having a wider spectral range and comprising plural narrow sub-bands.

Clause 65. The audio monitoring device of clause 64, wherein the narrow spectral range is less than or equal to about 1 MHz, less than or equal to about 800 kHz, less than or equal to about 600 kHz, less than or equal to about 400 kHz, or less than or equal to about 200 kHz.

Clause 66. The audio monitoring device of clause 65, wherein the wider spectral range is greater than or equal to about 600 kHz, greater than or equal to about 800 kHz, greater than or equal to about 1 MHz, greater than or equal to about 2 MHz, greater than or equal to about 3 MHz, greater than or equal to about 4 MHz, or greater than or equal to about 5 MHz.

Clause 67. The audio monitoring device of any one of clauses 64-66, wherein the narrowband receiver is configured to be programmed during each instance of use for receiving one of signals having a narrow spectral range or signals having a wider spectral range and comprising plural narrow sub-bands.

Clause 68. The audio monitoring device of any one of clauses 64-67, wherein the narrowband receiver is configured to receive configuration information indicating the narrowband receiver is to expect to receive one of signals having a narrow spectral range or signals having a wider spectral range and comprising plural narrow sub-bands.

Clause 69. The audio monitoring device of any one of clauses 64-68, wherein the narrowband receiver is configured to, in an instance in which the narrowband receiver receives a signal comprising plural narrow sub-bands, demodulate only a portion of said plural narrow sub-bands.

Clause 70. The audio monitoring device of clause 69, wherein the portion of said plural narrow sub-bands occupy a total spectral range of less than or equal to about 1 MHz, less than or equal to about 800 kHz, less than or equal to about 600 kHz, less than or equal to about 400 kHz, or less than or equal to about 200 kHz.

Clause 71. The audio monitoring device of clause 69, wherein the portion of said plural narrow sub-bands are positioned orthogonally in a frequency domain of the signal.

Clause 72. The audio monitoring device of clause 71, wherein the signal comprises demodulation information, and the narrowband receiver is configured to demodulate the portion of said plural narrow sub-bands using at least said demodulation information.

Clause 73. The audio monitoring device of clause 72, wherein said demodulation information comprises one or more beacon signals or one or more pilot sub-carriers.

Clause 74. The audio monitoring device of any one of clauses 64-73, wherein the signals having a narrow spectral range are digital signals and the signals having a wider spectral range and comprising plural narrow sub-bands are digital signals.

Clause 75. The audio monitoring device of any one of clauses 64-74, wherein the signals having a narrow spectral range are analog signals and the signals having a wider spectral range and comprising plural narrow sub-bands are digital signals.

Clause 76. A method for enabling low latency audio playback by in-ear monitors positioned in an interferer laden environment, the method comprising: receiving, at a narrowband receiver in operable communication with the in-ear-monitors, a signal carrying audio for playback by the in-ear-monitors, the narrowband receiver being configured to: receive signals having a narrow spectral range, and receive signals having a wider spectral range and comprising plural narrow sub-bands.

Clause 77. The method of clause 76, wherein the narrow spectral range is less than or equal to about 1 MHz, less than or equal to about 800 kHz, less than or equal to about 600 kHz, less than or equal to about 400 kHz, or less than or equal to about 200 kHz.

Clause 78. The method of clause 77, wherein the wider spectral range is greater than or equal to about 600 kHz, greater than or equal to about 800 kHz, greater than or equal to about 1 MHz, greater than or equal to about 2 MHz, greater than or equal to about 3 MHz, greater than or equal to about 4 MHz, or greater than or equal to about 5 MHz.

Clause 79. The method of any one of clauses 76-78, further comprising: programming the narrowband receiver to receive one of signals having a narrow spectral range or signals having a wider spectral range and comprising plural narrow sub-bands.

Clause 80. The method of any one of clauses 76-79, further comprising: receiving, at the narrowband receiver, configuration information indicating whether the narrowband receiver is to expect to receive one or more of signals having a narrow spectral range or signals having a wider spectral range and comprising plural narrow sub-bands.

Clause 81. The method of any one of clauses 76-80, further comprising: in an instance in which the narrowband receiver receives a signal comprising plural narrow sub-bands, demodulating only a portion of said plural narrow sub-bands.

Clause 82. The method of clause 81, wherein the portion of said plural narrow sub-bands occupy a total spectral range of less than or equal to about 1 MHz, less than or equal to about 800 kHz, less than or equal to about 600 kHz, less than or equal to about 400 kHz, or less than or equal to about 200 kHz.

Clause 83. The method of clause 81 or 82, wherein the portion of said plural narrow sub-bands are positioned orthogonally in a frequency domain of the signal.

Clause 84. The method of clause 83, wherein the signal comprises demodulation information, said method further comprising: demodulating, using the narrowband receiver, the portion of said plural narrow sub-bands using at least said demodulation information.

Clause 85. The method of clause 84, wherein said demodulation information comprises one or more beacon signals or one or more pilot sub-carriers.

Clause 86. The method of any one of clauses 76-85, wherein the signals having a narrow spectral range are digital signals and the signals having a wider spectral range and comprising plural narrow sub-bands are digital signals.

Clause 87. The method of any one of clauses 76-86, wherein the signals having a narrow spectral range are analog signals and the signals having a wider spectral range and comprising plural narrow sub-bands are digital signals.

Clause 88. An audio monitoring device configured to enable low latency audio communication by audio devices positioned in an interferer laden environment, the audio monitoring device comprising: a transmitter configured to be in operable communication with one or more audio capture devices and one or more external receivers, the transmitter being configured to: provide, to the one or more external receivers, a first audio signal carrying audio captured by the one or more audio capture devices and synchronization information; and a receiver configured to be in operable communication with one or more external transmitters and one or more audio devices, wherein the receiver is configured to: receive, in a radio frequency band, a second audio signal carrying audio for communication by the one or more audio devices, the second audio signal being subdivided into a plurality of sub-carriers orthogonally spaced in a frequency-time domain of the carrier wave, respective sub-carriers of the second audio signal being individually modulated according respective modulation schemes of a plurality of modulation schemes, and demodulate at least one sub-carrier of the plurality of sub-carriers using at least one of: one or more characteristics of the second audio signal or demodulation information received with the second audio signal.

Clause 89. An audio monitoring device configured to enable low latency audio communication by audio devices positioned in an interferer laden environment, the audio monitoring device comprising: means for providing, to one or more external receivers, a first audio signal carrying audio captured by the one or more audio capture devices and synchronization information; and means for receiving, in a radio frequency band, a second audio signal carrying audio for communication by one or more audio devices, the second audio signal being subdivided into a plurality of sub-carriers orthogonally spaced in a frequency-time domain of the carrier wave, respective sub-carriers of the second audio signal being individually modulated according respective modulation schemes of a plurality of modulation schemes; and means for demodulating at least one sub-carrier of the plurality of sub-carriers using at least one of: one or more characteristics of the second audio signal or demodulation information received with the second audio signal.

Clause 90. A method for enabling low latency audio communication by audio devices positioned in an interferer laden environment, the method comprising: providing, via a transmitter configured to be in operable communication with one or more audio capture devices and one or more external receivers, to the one or more external receivers, a first audio signal carrying audio captured by the one or more audio capture devices and synchronization information; receiving, in a radio frequency band, a second audio signal carrying audio for communication by the one or more audio devices, the second audio signal being subdivided into a plurality of sub-carriers orthogonally spaced in a frequency-time domain of the carrier wave, respective sub-carriers of the second audio signal being individually modulated according to respective modulation schemes of a plurality of modulation schemes, and demodulating at least one sub-carrier of the plurality of sub-carriers using at least one of: one or more characteristics of the second audio signal or demodulation information received with the second audio signal.

In some embodiments, one or more of the operations, steps, or processes described herein may be modified or further amplified as described below. Moreover, in some embodiments, additional optional operations may also be included, e.g., in the method of flowchart 70. It should be appreciated that each of the modifications, optional additions, and/or amplifications described herein may be included with the operations previously described herein, either alone or in combination, with any others from among the features described herein.

The provided method description, illustrations, and process flow diagrams are provided merely as illustrative examples and are not intended to require or imply that the steps of the various embodiments must each or all be performed and/or should be performed in the order presented or described. As will be appreciated by one of skill in the art, the order of steps in some or all of the embodiments described may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of" and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An apparatus for multi-user audio monitoring, the apparatus comprising:
- a processor; and
- a memory storing instructions that, when executed by the processor, cause the apparatus to:
  - subdivide a frequency-time domain of a carrier wave in a radio frequency band into a plurality of sub-carrier allocations associated with a plurality of in-ear monitors (IEMs), wherein respective sub-carrier allocations are orthogonal in a frequency-time domain to other sub-carrier allocations of the plurality of sub-carrier allocations;
  - modulate the plurality of sub-carrier allocations according to a plurality of modulation schemes such that respective sub-carrier allocations are individually modulated;
  - generate, based at least on the plurality of modulation schemes, demodulation information for demodulating the plurality of sub-carrier allocations;
  - scramble the carrier wave using one or more of: block coding, block coding with error correction, selected mapping, convolutional encoding, selected list mapping, partial transmit sequence, interleaving, tone reservation, or tone injection; and
  - cause transmission of the carrier wave towards one or more receivers, the carrier wave carrying the demodulation information and audio for the one or more receivers associated with one or more of the plurality of IEMs.

2. The apparatus of claim 1, wherein respective of the plurality of sub-carrier allocations in the frequency-time domain are mapped to respective audio channels for the plurality of IEMs.

3. The apparatus of claim 2, wherein the carrier wave carrying the audio for the one or more receivers associated with the one or more of the plurality of IEMs includes different audio mixes for different IEMs of the plurality of IEMs.

4. The apparatus of claim 1, wherein the demodulation information comprises one or more pilot signals at known positions in the frequency-time domain of the carrier wave, wherein the receiver is configured to determine waveform deformation based upon at least the one or more pilot signals.

5. The apparatus of claim 1, wherein the demodulation information comprises one or more beacon frames carrying waveform shape information, beacon interval information, or a contention window value, wherein the receiver is configured to determine frequency distortion based upon at least the one or more beacon frames.

6. The apparatus of claim 1, wherein the instructions, when executed by the processor, further cause the apparatus to:
- modulate the carrier wave using one or more of: inverse fast Fourier transform conversion, upsampling, peak windowing, envelope scaling, or clipping and filtering.

7. The apparatus of claim 1, wherein the carrier wave is scrambled using block coding or convolutional encoding.

8. The apparatus of claim 1, wherein the plurality of sub-carrier allocations are allocated to respective of a plurality of narrow sub-bands, and wherein the carrier wave transmitted towards the one or more receivers has a bandwidth that comprises the plurality of narrow sub-bands.

9. The apparatus of claim 8, wherein the plurality of narrow sub-bands have a sub-band bandwidth of less than or equal to about 1 MHz, less than or equal to about 800 kHz, less than or equal to about 600 kHz, less than or equal to about 400 kHz, or less than or equal to about 200 kHz.

10. The apparatus of claim 1, further comprising one of: an audio channel allocation module, an audio encoder, a digital audio modulator, an audio transmitter, an audio transceiver, an antenna, an antenna combiner, a baseband device, an access point, a base station, a rack mount, a mixing board, an analog-to-digital converter, a digital-to-analog converter, or a digital audio filtering unit.

11. A method for multi-user audio monitoring, the method comprising:

subdividing a frequency-time domain of a carrier wave in a radio frequency band into a plurality of sub-carrier allocations associated with a plurality of in-ear-monitors, wherein respective sub-carrier allocations are orthogonal in a frequency-time domain to other sub-carrier allocations of the plurality of sub-carrier allocations;

modulating the plurality of sub-carrier allocations according to a plurality of modulation schemes such that respective sub-carrier allocations are individually modulated;

generating, based at least on the plurality of modulation schemes, demodulation information for demodulating the plurality of sub-carrier allocations;

scrambling the carrier wave using one or more of: block coding, block coding with error correction, selected mapping, convolutional encoding, selected list mapping, partial transmit sequence, interleaving, tone reservation, or tone injection; and causing transmission of the carrier wave towards one or more receivers, the carrier wave carrying the demodulation information and audio for the one or more receivers associated with one or more of the plurality of in-ear-monitors.

12. The method of claim 11, wherein respective of the plurality of sub-carrier allocations in the frequency-time domain are mapped to respective audio channels for the plurality of IEMs.

13. The method of claim 12, wherein the carrier wave carrying the audio for the one or more receivers associated with the one or more of the plurality of IEMs includes different audio mixes for different IEMs of the plurality of IEMs.

14. The method of claim 13, wherein the demodulation information comprises one or more pilot signals at known positions in the frequency-time domain of the carrier wave, wherein the receiver is configured to determine waveform deformation based upon at least the one or more pilot signals.

15. The method of claim 11, wherein the demodulation information comprises one or more beacon frames carrying waveform shape information, beacon interval information, or a contention window value, wherein the receiver is configured to determine frequency distortion based upon at least the one or more beacon frames.

16. The method of claim 11, further comprising:

modulating the carrier wave using one or more of: inverse fast Fourier transform conversion, upsampling, peak windowing, envelope scaling, or clipping and filtering.

17. The method of claim 11, wherein the carrier wave is scrambled using block coding or convolutional encoding.

18. The method of claim 11, wherein the plurality of sub-carrier allocations are allocated to respective of a plurality of narrow sub-bands, and wherein the carrier wave transmitted towards the one or more receivers has a bandwidth that comprises the plurality of narrow sub-bands.

19. The method of claim 18, wherein the plurality of narrow sub-bands have a sub-band bandwidth of less than or equal to about 1 MHz, less than or equal to about 800 kHz, less than or equal to about 600 kHz, less than or equal to about 400 kHz, or less than or equal to about 200 kHz.

20. The method of claim 11, wherein the method is carried out by an audio monitoring device comprising one of: an audio channel allocation module, an audio encoder, a digital audio modulator, an audio transmitter, an audio transceiver, an antenna, an antenna combiner, a baseband device, an access point, a base station, a rack mount, a mixing board, an analog-to-digital converter, a digital-to-analog converter, or a digital audio filtering unit.

* * * * *